(12) United States Patent
Norman

(10) Patent No.: US 8,905,490 B2
(45) Date of Patent: Dec. 9, 2014

(54) WHEEL AND WHEEL ASSEMBLY

(75) Inventor: Philip Norman, La Borde (FR)

(73) Assignee: Robosynthesis Limited (GB)

( * ) Notice: Subject to any disclaimer, the term of this patent is extended or adjusted under 35 U.S.C. 154(b) by 819 days.

(21) Appl. No.: 12/749,386

(22) Filed: Mar. 29, 2010

(65) Prior Publication Data

US 2011/0233991 A1   Sep. 29, 2011

(51) Int. Cl.
*B60B 11/00* (2006.01)
*B60B 11/02* (2006.01)

(52) U.S. Cl.
CPC ...................................... *B60B 11/02* (2013.01)
USPC .............. 301/36.2; 180/8.2; 180/218; 301/45

(58) Field of Classification Search
USPC .................. 180/7.1, 194, 195; 464/51, 68.51; 301/36.1, 36.2, 38.1, 39.1, 40.1, 40.2, 301/40.3, 41.1; 305/1, 60
See application file for complete search history.

(56) References Cited

U.S. PATENT DOCUMENTS

| | | | |
|---|---|---|---|
| 1,408,885 A * | 3/1922 | Humphrey | 301/46 |
| 3,346,268 A | 10/1967 | Richman | |
| 3,580,344 A | 5/1971 | Floyd | |
| 4,648,853 A * | 3/1987 | Siegfried | 446/448 |
| 4,674,757 A | 6/1987 | Martin | |
| 4,919,489 A | 4/1990 | Kopsco | |
| 6,357,765 B1 | 3/2002 | Heien | |
| 6,394,203 B1 * | 5/2002 | Harris | 180/7.1 |
| 6,431,664 B1 | 8/2002 | Sawada | |
| 6,481,513 B2 | 11/2002 | Buehler | |
| 6,502,657 B2 | 1/2003 | Kerrebrock et al. | |
| 6,662,889 B2 | 12/2003 | De Fazio | |
| 6,860,346 B2 * | 3/2005 | Burt et al. | 180/8.2 |
| 7,165,637 B2 | 1/2007 | Tanielian | |
| 7,380,618 B2 | 6/2008 | Gunderson | |
| 7,402,108 B2 * | 7/2008 | Miyakawa et al. | 464/65.1 |
| 2005/0133280 A1 | 6/2005 | Horchler | |
| 2007/0210540 A1 * | 9/2007 | Moll et al. | 280/30 |
| 2008/0265529 A1 | 10/2008 | Kamara | |
| 2009/0101261 A1 * | 4/2009 | Collet et al. | 152/417 |
| 2010/0076598 A1 | 3/2010 | Herbert et al. | |
| 2010/0144235 A1 | 6/2010 | Norman | |

FOREIGN PATENT DOCUMENTS

| | | | |
|---|---|---|---|
| GB | 2293973 A | * | 4/1996 |
| GB | 2349123 A | | 10/2000 |
| WO | WO2008093028 | | 8/2008 |

OTHER PUBLICATIONS

GB Search Report for Application No. GB1105154.7 dated Jul. 8, 2011.
"Robosynthesis: An Investment Opportunity as yet Unheard at TVIN", TVIN Newsletter, Mar. 30, 2009.

* cited by examiner

*Primary Examiner* — Joseph M Rocca
*Assistant Examiner* — Jacob Knutson
(74) *Attorney, Agent, or Firm* — Tumey L.L.P.

(57) ABSTRACT

A wheel assembly and a wheel are suitable for use with a mobile platform. The wheel assembly comprising a first wheel and a second wheel, each wheel comprising a hub having a central axis of rotation, and at least two wheel lobes coupled to the hub, the wheel lobes extending radially from the hub and spaced around the central axis of the hub, where the first wheel is rotatably mounted to the second wheel on a common axis, and a control mechanism rotates the first wheel with respect to the second wheel.

16 Claims, 32 Drawing Sheets

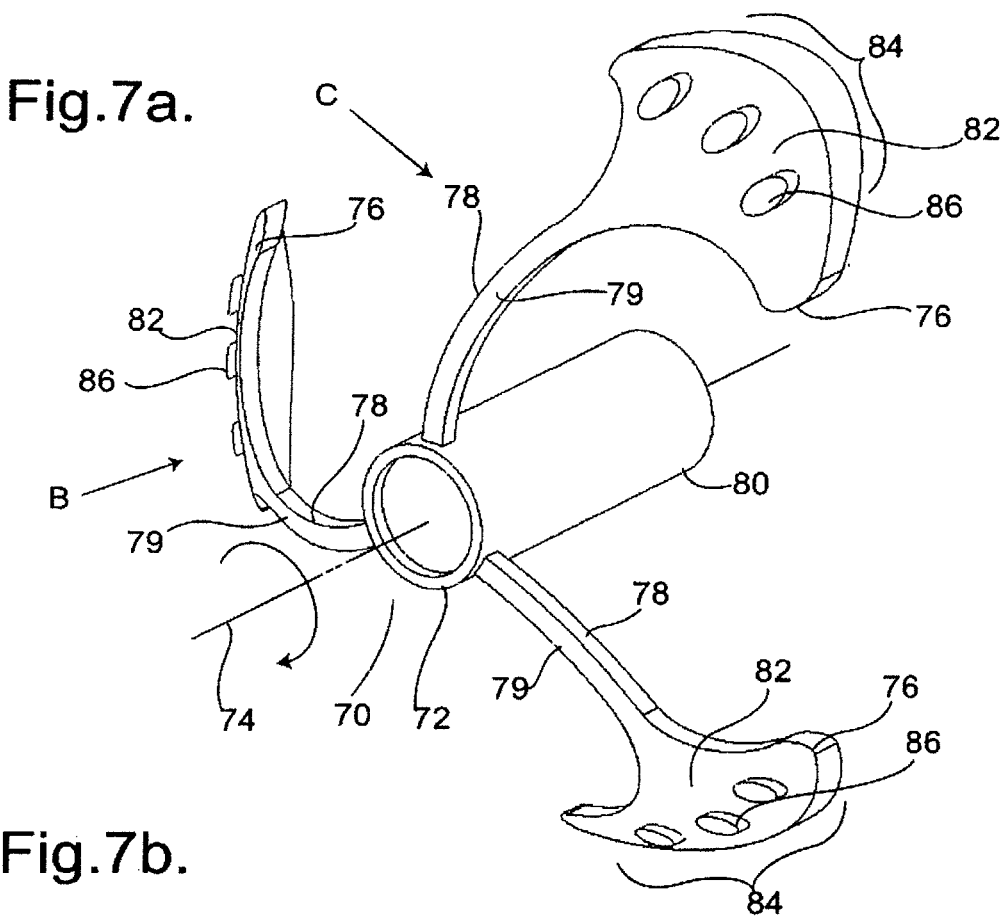
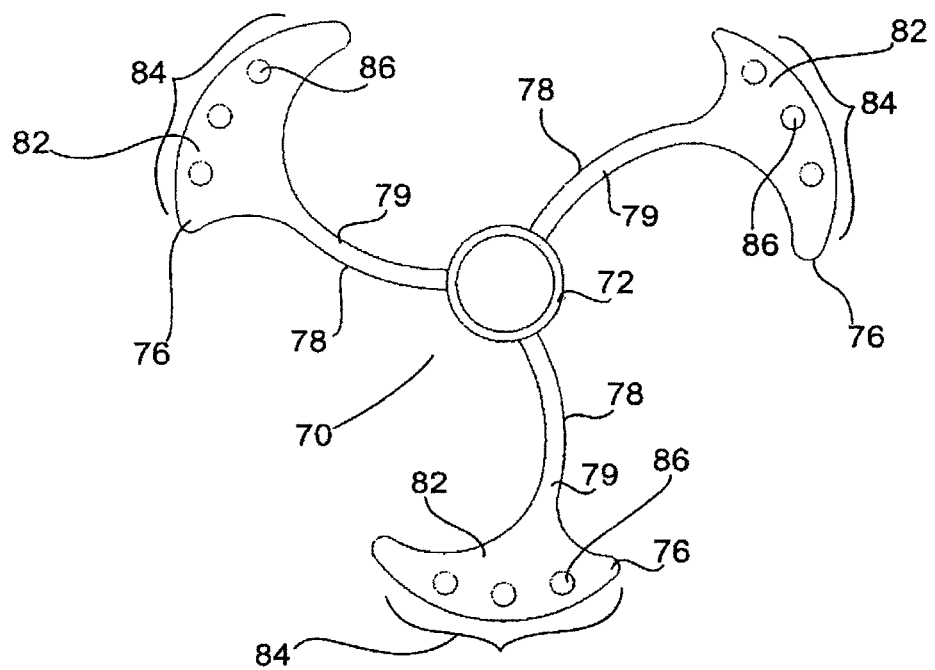

WHEEL AND WHEEL ASSEMBLY

INTRODUCTION

The present invention relates to a wheel and wheel assembly for a mobile platform such as a robot or vehicle for use over varying terrain types and/or bodies of water.

Wheels are used for many different purposes that require the efficient movement of an object across a surface where there is a force such as gravity pressing the object to the surface. Common examples are found in transport applications such as a cart pulled by a horse, hand trucks or trolleys for shifting loads, other vehicles such as cars and trucks, or the landing gear of an aircraft.

The terms mobile platform or vehicle are used interchangeably to refer to any movable frame or chassis having at least one wheel for moving the frame across, through, or over a surface. Examples of mobile platforms include, but are not limited to, toys, toy robots, wheel barrows, hand trucks, trolleys, trailers, robots, cars, trucks, or amphibious vehicles.

Most wheels are typically circular, cylindrical or disk shaped devices that are capable of rotating on an axis. Wheels are used in conjunction with axles, where either the wheel turns on the axle with the axle coupled to an object or vehicle, or the axle turns in the object or vehicle body. In order for wheels to rotate, a moment needs to be applied to the wheel about its axis, either by way of gravity, or by application of another external force.

Conventional wheels typically have tyres with a tread providing the wheel with additional grip (frictional force) to allow rotation over most smooth surfaces, e.g. cars on a road or trolleys over a smooth concrete surface. A conventional wheel which presents an uninterrupted exterior cylindrical contact surface is optimal in terms of energy efficiency when applied to smooth and resilient terrain. However, in most applications, surfaces and terrain will vary from smooth to rough and/or from hard to soft e.g. from roads to muddy fields, or smooth concrete to gravel car parks. This leads to inefficient movement of the mobile platform because the wheels are adapted for movement across smooth surfaces and are badly adapted to traversing irregular or absorbent terrain types, e.g. a car with smooth road tyres is inefficient when traversing wet muddy fields, a trolley is difficult to push over gravel car parks. Although the tyres or even the entire wheel may be changed in advance to suit different terrain types, it is usually inconvenient or impossible to do so in the field and without specialist machinery.

U.S. Pat. No. 4,674,757 describes a wheel for use with a variety of devices for moving a load over rough but regular terrain, such as climbing stairs. The wheel comprises a flat three-point star shaped disk, with the edges of the three point star each describing involute curves of a circle with a certain radius (an involute curve cuts all tangents of another curve at right angles). The non-circular shape of the wheel allows the load to be moved up a staircase in a close approximation to a straight line parallel to the staircase incline. This wheel shape only allows efficient movement up a flight of stairs of a particular size depending on the wheel size. However, the load will move in a cycloidal motion over hard smooth ground such as shop and/or warehouse floors. This leads to an increase in energy expenditure when traversing smooth ground because the cycloidal motion requires the mass of the load to be repeatedly raised and lowered. In addition, the profile of this wheel, in particular the extremity points at which the involute curves intersect, may cause the wheel to snag in hard and/or irregular surfaces or to snag on debris such as branches or bushes, and on soft and/or absorbent surfaces the wheel will tend to sink. These issues will result in even more energy expenditure to move a load over variable terrain.

U.S. Pat. No. 6,502,657 describes a small portable lightweight cylindrical shaped transformable robot or toy comprising two wheels at the ends of a cylindrical body or chassis. Each wheel includes a plurality of thin arcuate tines or spines, which, when deployed, allow the robot or toy to clamber over varied terrain types from grass to sandy beaches. Although the thin arcuate spines are suitable for this type of robot due to its portability and lightweight nature, the spines may not be suitable for use on larger heavier mobile platforms or robots or for carrying heavier payloads over variable terrain. In addition, the thin spines will become snagged on debris or irregularities in rough terrain such as small cracks and crevices decreasing the efficiency of the robot or toy and even immobilising it.

With the increasing use of autonomous and semi-autonomous mobile platforms such as toys, vehicles, and/or robots there is a growing need for a mobile platform to have adjustable wheels allowing the mobile platform to carry a load while efficiently traversing varying terrain types, obstacles, debris, and/or bodies of water, while minimising the risk that the mobile platform is immobilised.

STATEMENT OF THE INVENTION

According to a first aspect of the present invention there is provided a wheel assembly for a mobile platform, the wheel assembly including a first wheel and a second wheel, each wheel comprising a hub having a central axis of rotation, and at least two wheel lobes coupled to the hub, the wheel lobes extending radially from the hub and spaced around the central axis of the hub, where the first wheel is rotatably mounted to the second wheel and the central axes of rotation of the first and second wheels are coaxial and so define a common axis, the wheel assembly further includes a control mechanism for adapting the wheel assembly by rotating the first wheel with respect to the second wheel around the common axis.

The wheel assembly allows the first and second wheels to be rotatably adjusted to a desired position with respect to each other enabling the mobile platform adjust its terrain negotiating capabilities. For example, when the wheel assembly is rotatably adjusted such that the wheel lobes of the first and second wheels are aligned, or in an aligned position or state, then rough terrain or climbing capability is provided. In another example, the wheel assembly can be rotatably adjusted such that the wheel lobes of the first and second wheels are substantially non-aligned, i.e. the lobes of the second wheel are midway between the lobes of the first wheel, to provide efficient smooth terrain or rolling capability. However, the position of the wheel lobes can be rotatably adjusted to be between these two extreme positions of alignment enabling the mobile platform to optimise its terrain negotiating capability and thus optimise its energy expenditure. Rotationally adjusting/adapting the wheel assembly improves energy consumption as the mobile platform is not lifted substantially when the first and second wheels are controllably rotated with respect to each other.

Preferably, the wheel lobes of the first and/or second wheels of the wheel assembly each have a curved edge around a region of the lobe edge furthest away from the hub. This enhances the energy efficiency of the mobile platform by providing a better rolling wheel-like motion. In addition, the rounded edge prevents the wheel from snagging on debris or immobilising the mobile platform in a crack or crevice in rough terrain.

Preferably, the wheel lobes of the first and/or second wheel of the wheel assembly, where the wheel lobes each define a convex curved surface at one side of the wheel assembly. A convex curved surface enhances the footprint of the wheels, providing enhanced support over soft or absorbent terrain while further enhancing the energy efficiency of the mobile platform due to an improved rolling wheel-like motion. In addition, the convex curved surfaces prevent the mobile platform from being immobilised due to cracks or crevices in rough terrain.

Preferably the convex curved surfaces of the first wheel lie substantially on a first common ellipsoidal surface and the convex curved surfaces of the second wheel lie substantially on a second common ellipsoidal surface. Preferably the wheel lobes are spaced symmetrically around the central axis and preferably the surfaces of the wheel lobes are each symmetrical.

The wheel lobes allow the mobile platform to traverse irregular rough terrain, while still providing an efficient wheel-like motion. The curved surfaces of the wheel lobes provide the mobile platform with a footprint that is large enough to support the mobile platform on varying terrain types such as smooth, rough, hard, and/or soft terrain. In particular, since the wheel lobe surfaces are curved or arcuate, the footprint is increased when the mobile platform traverses soft terrain, the increased footprint spreads the load of the mobile platform over the soft surface preventing the platform from becoming bogged down or immobilised and also minimising the power required to traverse the terrain. Upon returning to firm, resistant surfaces, the footprint is reduced to optimise efficiency.

Preferably the wheel assembly further comprises a stem member mounted to each wheel lobe, where the stem member couples the wheel lobe to the hub. Preferably each stem member has a profile that is narrower than the profile of the corresponding wheel lobe. Preferably each stem member is rotatably mounted to the hub, and is rotatable around an axis of rotation that is non-parallel to the central axis of rotation. Preferably each stem member comprises a resilient material.

The stem members can provide a means for attenuating mechanical shocks by flexing under load or when they or the wheel lobes contact the ground or an obstacle. This reduces mechanical degradation of the wheel, wheel assembly, and mobile platform. The stem members can enhance the climbing capability of a mobile platform because rocks, obstacles, and scattered debris can penetrate as far as the hub of the wheel. The rotation of the stem members around an axis of rotation non-parallel to the common axis allows the wheel lobes to be rotated, thus allowing the wheel lobes to "wriggle" free of any cracks, crevices, branches, or any other obstacle that may trap the wheel lobe or stem member.

In addition, rotating the stem members provides the advantage that the wheel lobes can be rotated to enable a mobile platform to negotiate bodies of water such as waterways, lakes, or the sea because the wheel lobes are adjusted into a from suitable for providing a "freestyle" or crawl type paddling stroke. The reduced profile of the stem members as compared with the wheel lobes further reduces the weight or mass of the wheel, which is useful for weight or mass constrained applications, and which also enhances the energy efficiency of driving the wheel over rough terrain, obstacles or bodies of water.

Preferably each of the wheel lobes further comprise a movable extension lobe such that the extension lobe is movable in a radial direction from the hub. In addition, each movable extension lobe is mounted to a corresponding wheel lobe. The wheel's diameter can hence be adjusted to allow the wheel to traverse rougher terrain and/or larger obstacles.

Preferably the wheel further comprises an extension mechanism for moving at least one of the wheel lobes from a first extended state to a second extended state. The wheel with extension lobes is reconfigurable in the field either by hand, or by automatic and/or electro-mechanical mechanisms such as servos or actuators and the like.

Preferably the wheel assembly further includes a revolute mechanism that is coaxially coupled to the hub of the first or second wheel, or is coaxially coupled to an axle connected to the first and/or second wheel, the revolute mechanism comprising an annular housing, one or more annular sections within the annular housing, and for each annular section a compliance member movably located therein, wherein the annular section and corresponding compliance member include a biasing mechanism that biases the compliance member from the end faces of the annular section. The revolute mechanism combined with the biasing mechanism can attenuate mechanical shocks transmitted to the wheel lobes, stem members, wheels, and/or a mobile platform when the wheel is driven, e.g. when the driving wheel's wheel lobes and/or stem members make contact with rough terrain or other obstacles.

Preferably the wheels of the wheel assembly are arranged such that the convex curved surface of the first wheel faces the concave curved surface of the second wheel, or in the direction of the convex curved surfaces of the second wheel. This produces a compact space saving wheel assembly. Alternatively, the wheel assembly is arranged such that the convex curved surfaces of the first wheel faces the convex curved surfaces of the second wheel. This provides the advantage of enlarging the footprint of a mobile platform, which decreases sinkage of the wheel or mobile platform when traversing soft, grainy, or absorbent terrain.

According to a second aspect of the invention there is provided a wheel for a mobile platform, the wheel comprising any of the above-mentioned features with reference to the first or second wheels.

The invention will now be further and more particularly described by way of example only and with reference to the accompanying drawings, in which:

FIGS. 1b and 1c show a side elevation and plan view of the wheel of FIG. 1a, on the arrows B and C, respectively, of FIG. 1a;

FIGS. 2b and 2c show a side elevation and a plan elevation of the wheel assembly of FIG. 2a, on the arrows B and C, respectively, of FIG. 2a;

FIGS. 3b and 3c show a side elevation and a plan elevation of the wheel assembly of FIG. 3a, on the arrows B and C, respectively, of FIG. 3a;

FIGS. 4b and 4c show a side elevation and plan view of the wheel of FIG. 4a, on the arrows B and C, respectively, of FIG. 4a;

FIG. 7a shows a perspective view of another alternative wheel;

FIGS. 7b and 7c shows a side elevation and a plan elevation of the wheel of FIG. 7a on arrows B and C, respectively, of FIG. 7a;

FIGS. 10b and 10c show a side elevation and a plan elevation of the wheel assembly on the arrows B and C, respectively, of FIG. 11a;

FIGS. 11b and 11c show a side elevation and a plan elevation of the wheel assembly on the arrows B and C, respectively, of FIG. 12a;

FIGS. 15b and 15c shows a side elevation and a plan elevation of the revolute compliance mechanism on arrows B and C, respectively, of FIG. 15a;

DETAILED DESCRIPTION

Figure 1A:
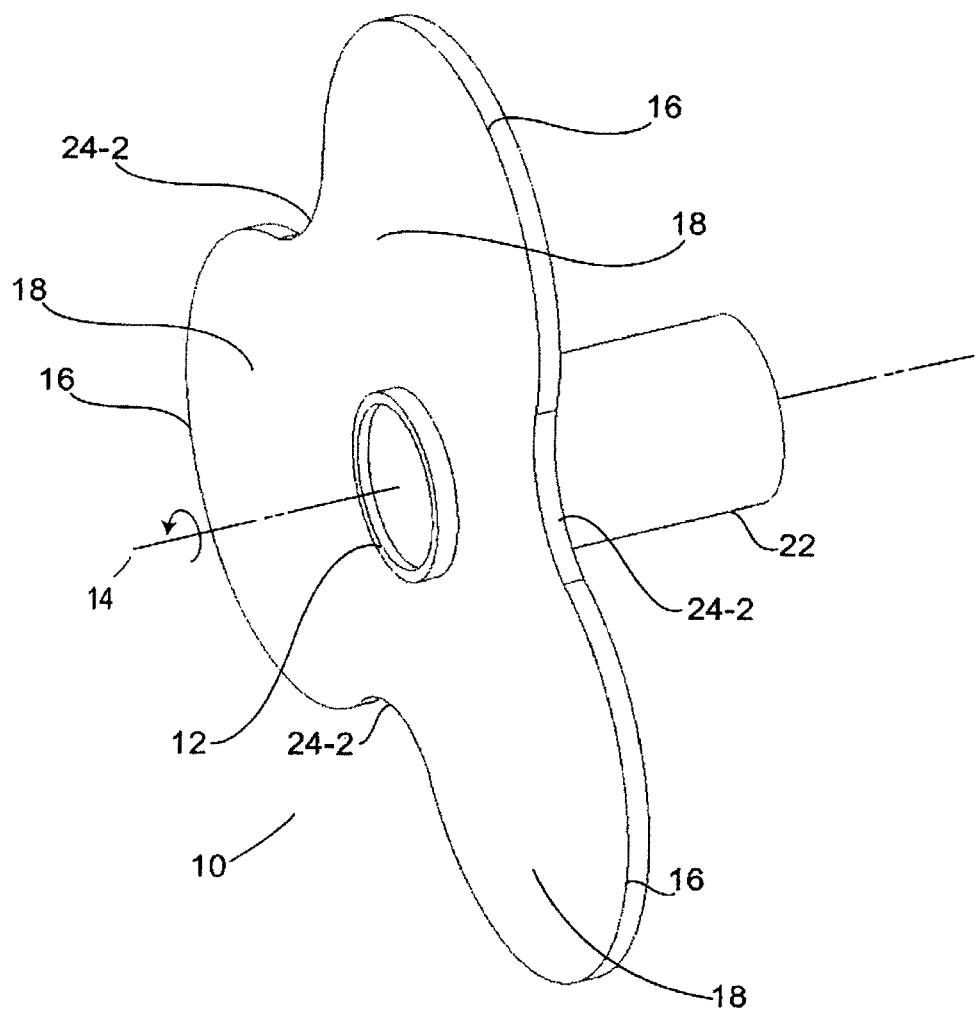
FIG. 1a shows a perspective view of a wheel for negotiating rough terrain while still being suitable for use on smooth terrain.
Figure 1B:
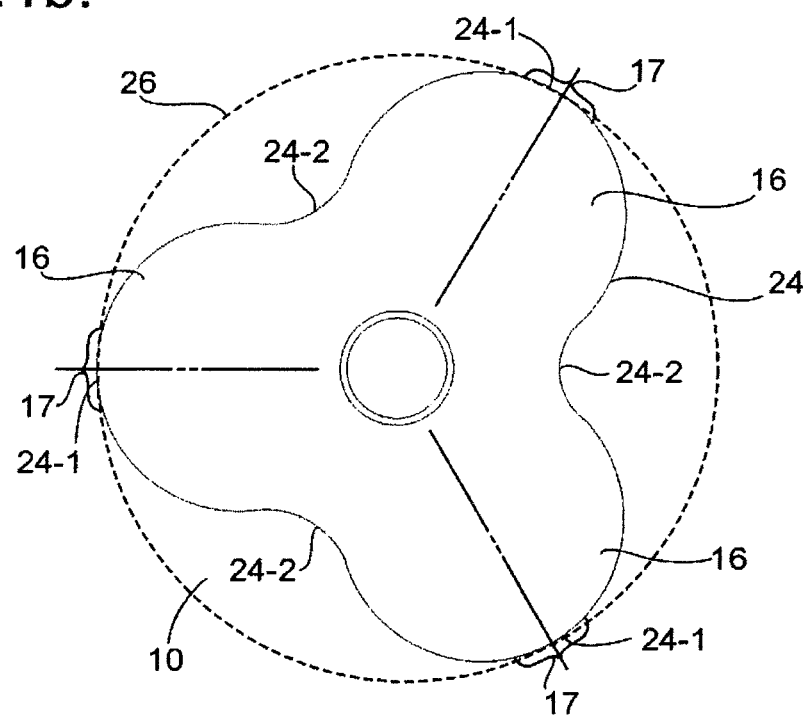
Figure 1C:
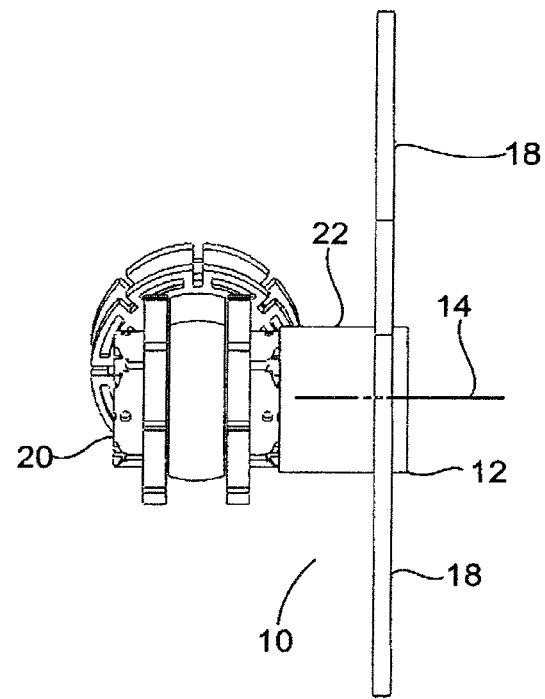

Referring to FIGS. 1a, 1b and 1c, a wheel 10 is shown in perspective, side elevation and plan views, respectively, for a mobile platform (not shown). The wheel 10 includes a hub 12 rotatable around a central axis 14, in which three wheel lobes 16 extend radially from the hub 12 and are spaced around the central axis 14 of the hub 12. The wheel lobes 16 each include a lobe surface 18 that is substantially flat.

The hub 12 of the wheel 10 connects with an axle 22 (or shaft), where either the wheel 10 rotates on the axle 22 around the central axis 14, and/or the wheel 10 and axle 22 are connected together such that the wheel 10 and axle 22 rotate around the central axis 14 in which the axle 22 is coupled to an actuator drive mechanism (not shown) or motor module (not shown).

As illustrated in FIGS. 1a, 1b and 1c, the shape of each wheel lobe 16 is symmetrical about its centreline and each wheel lobe 16 is joined to the hub 12 such that the exterior perimeter 24 of the wheel 10 describes a continuous curve, as shown in particular in FIG. 1b. Although the exterior perimeter 24 of the wheel 10 described as a continuous curve, it will be appreciated that the exterior perimeter 24 of the wheel 10 can alternatively describe a non-continuous curve, an example of which is shown in FIG. 3b. However, it is to be appreciated that the wheel lobes 16 and/or the lobe surfaces 18 can describe other shapes and forms.

In FIG. 1b, the extremities 17 (or extremity regions) of each of the wheel lobes 16 are shown to lie on a circle 26 of a particular radius. The wheel lobes 16 each have a rounded edge around a region of the lobe surface 18 furthest away from the hub 12. The rounded edge is in the vicinity of the extremity regions 17 and is illustrated in FIG. 1b as being tangential to the circle 26.

In FIG. 1b, the exterior perimeter 24 of the wheel 10 is shown to be a continuous curve that is formed from a first set of curves 24-1 on the exterior perimeter 24 in the extremity regions 17 that are convex and a second set of curves 24-2 located closer to hub 12 of the wheel 10 that are concave, relative to the curves 24-1. The exterior perimeter 24 is shaped such that the second set of curves 24-2 are far enough from the hub 12 to still provide the capability of negotiating rough terrain, but also to provide an enhanced anti-snagging capability. For example, the wheel 10 may rotate over a fallen branch, but instead of a wheel lobe 16 picking up the branch as the wheel 10 rotates over it, the continuous curve in the region of the second set of curves 24-2 on exterior perimeter 24 of the wheel 10 is such that there is no place for the branch to "rest on" the exterior perimeter 24, instead the branch merely slips off a wheel lobe 16 as it rotates instead of being picked up.

In FIGS. 1a, 1b, and 1c, the three wheel lobes 16 are illustrated to be equally spaced around the hub 12 at about 120 degree intervals. This produces a wheel-like and/or legged-walking action as the wheel 10 rotates around the central axis 14 of the hub 12. Alternatively, it is envisaged that two wheel lobes equally spaced about the hub 12 (e.g. 180 degrees apart)

are sufficient for enhanced climbing capabilities, or alternatively, four or more wheel lobes equally arranged about the hub 12 may be used for enhanced rolling capability across smoothly undulating terrain.

In operation, with the wheel 10 coupled to a mobile platform (not shown), FIG. 1c shows a portion of the mobile platform's chassis 20, it is the continuous curve of the exterior perimeter 24 of the wheel lobes, in particular the rounded edges in the extremity or distal regions 17, that provide a wheel-like motion to the mobile platform over smooth terrain, while the lobed periphery allows the mobile platform to traverse rough terrain or climb over obstacles.

In rough terrain, or terrain with debris such as branches and leaves, the rounded edges in the extremities 17 of the wheel lobes 16 and the continuous curve 24 of the exterior perimeter of the wheel 10 also prevents debris from becoming entangled on the wheel 10, while at the same time providing the wheel-like motion. In particular, the wheel lobes 16 have a length that allows the wheel 10 to rotate over obstacles and undulating or rough terrain, in which the obstacles or undulations are less than or equal to the length of the wheel lobes 16. This length can also allow the mobile platform to traverse stairs in a climbing fashion, and but to also traverse irregular terrain efficiently.

Figure 2A:
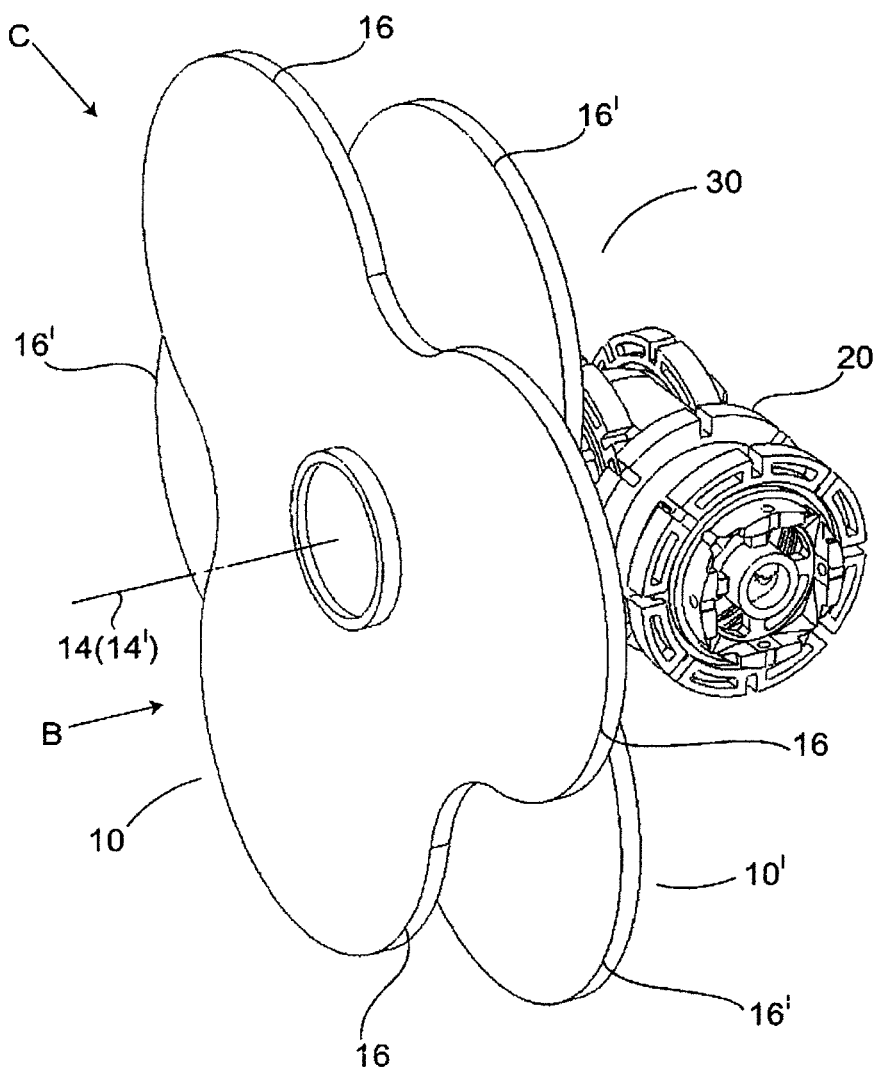
FIG. 2a shows a perspective view of a wheel assembly, using the wheel of FIG. 1a, in an unaligned configuration.
Figure 2B:
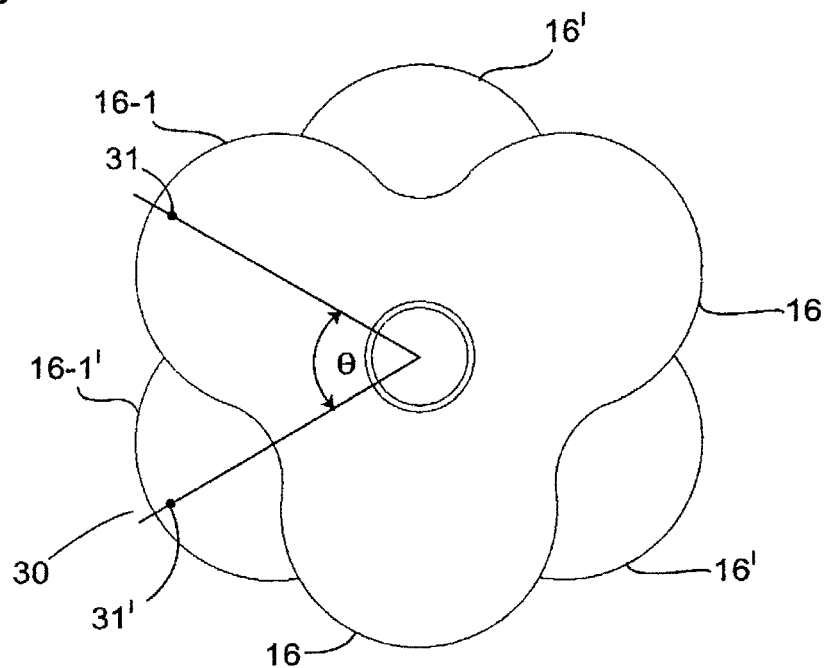
Figure 2C:
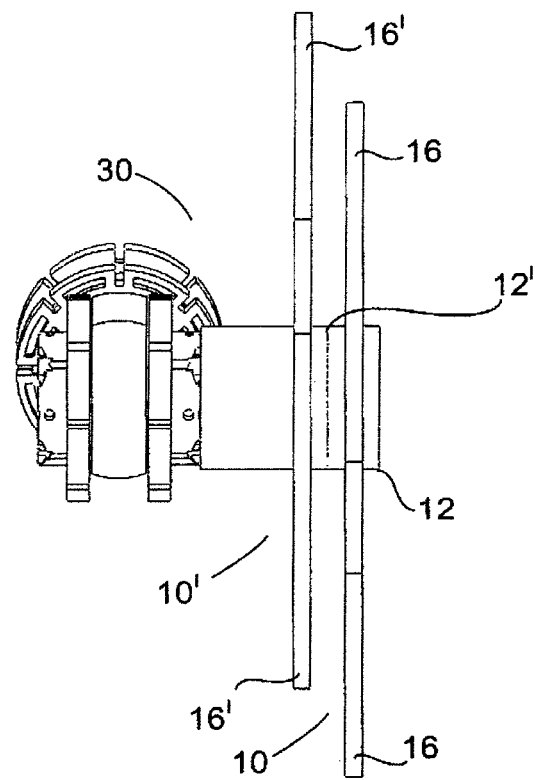

Referring to FIGS. 2a to 2c a perspective view, side elevation and a plan elevation of a wheel assembly 30 is shown that includes a pair of wheels 10 and 10' substantially as described with respect to FIGS. 1a to 1c. In these figures, the wheel assembly 30 is configured for negotiating smooth terrain. The numbering of FIGS. 1a to 1c will be used for features that have already been described with duplicate features of different wheels having the same numeral but differentiated with an apostrophe, e.g. a first wheel 10 and a second wheel 10'.

In FIGS. 2a to 2c, the wheel assembly 30 includes a first wheel 10 and a second wheel 10', in which the first wheel 10 is rotatably mounted to the second wheel 10' such that the central axes 14 and 14' of first wheel 10 and the second wheel 10', respectively, are coaxial and so define a common axis. The wheel assembly 30 further includes means (not shown) or a control or rotation mechanism (not shown) for rotatably adjusting or configuring the first wheel 10 with respect to the second wheel 10'. An example of a control or rotation mechanism is shown and described with reference to FIG. 8d.

The first and second wheels 10 and 10' can be rotatably adjusted in discrete or continuous increments such that corresponding wheel lobes 16 and 16' are in a desired position with respect to each other. For example, the wheel assembly 30 can be adjusted or configured by rotating the first wheel 10 with respect to the second wheel 10' (or a wheel lobe 16 of the first wheel 10 with respect to a wheel lobe 16' of the second wheel 10') around the common axis into the extreme alignment positions such as the non-aligned position of FIG. 2b or the aligned position of FIG. 3b. The wheels 10 and 10' can be rotatably adjusted with respect to each other to any angular displacement (or angle) around the common axis.

Referring to FIGS. 2b and 2c, the wheel assembly 30 is shown to be configured in an extreme non-aligned position, in which the wheel assembly 30 allows the mobile platform to efficiently traverse smooth terrain. In the non-aligned position, the first wheel 10 and the second wheel 10' are positioned such that corresponding wheel lobes 16 of the first wheel 10 are midway between the corresponding wheel lobes 16' of the second wheel 10'. In this case, with three lobes in each wheel, the second wheel 10' has been rotated with respect to the first wheel 10 such that wheel lobe 16-1 of the first wheel 10 has an angular displacement, $\theta$, of 60 degrees from wheel lobe 16-1' of the second wheel 10'.

Alternatively, for a wheel having N lobes, and assuming both the first and second wheels have N lobes, then an angular displacement of $\theta=360/2N$ degrees between the wheel lobes 16 and 16' puts the wheel assembly 30 in an extreme non-aligned position. Alternatively, the wheels 10 and 10' can be considered to be non-aligned when a fictitious point 31 on the first wheel 10 and a corresponding fictitious point 31' on the second wheel 10' do not substantially overlap, as shown in FIG. 2b.

Figure 3A:
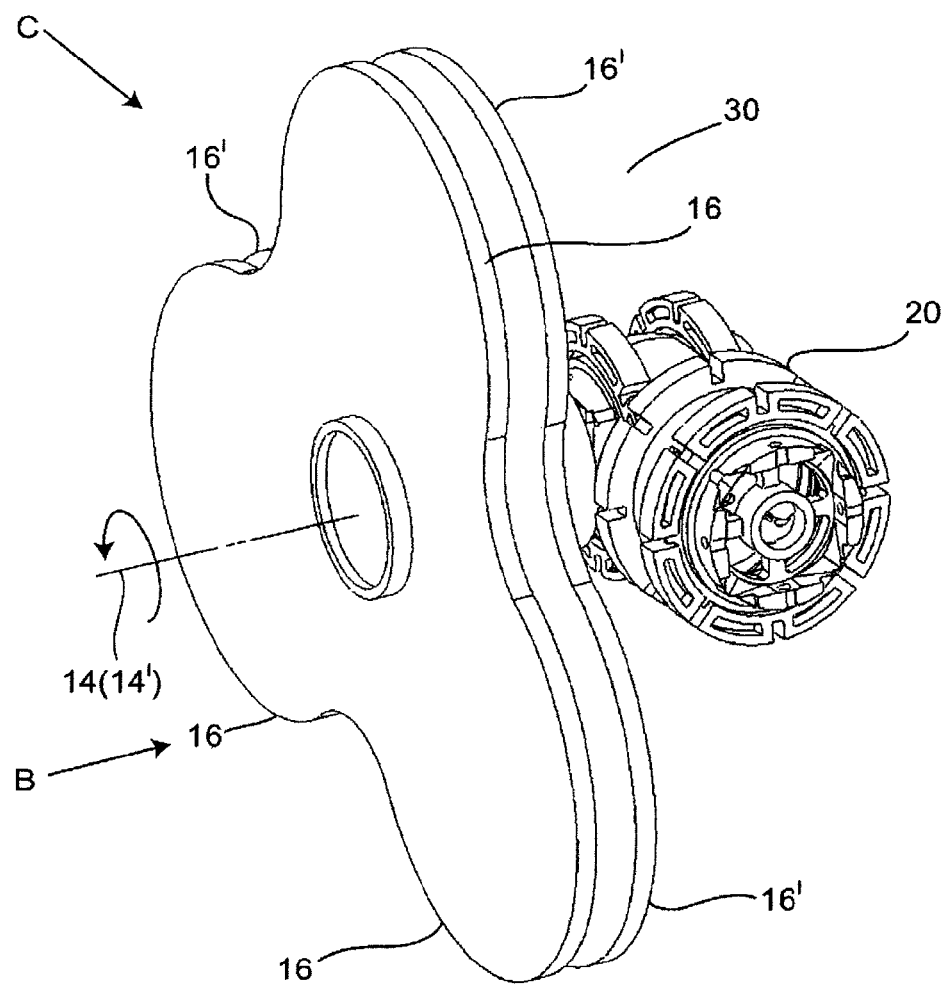
FIG. 3a shows a perspective view of the wheel assembly of FIG. 2a in an aligned configuration.
Figure 3B:
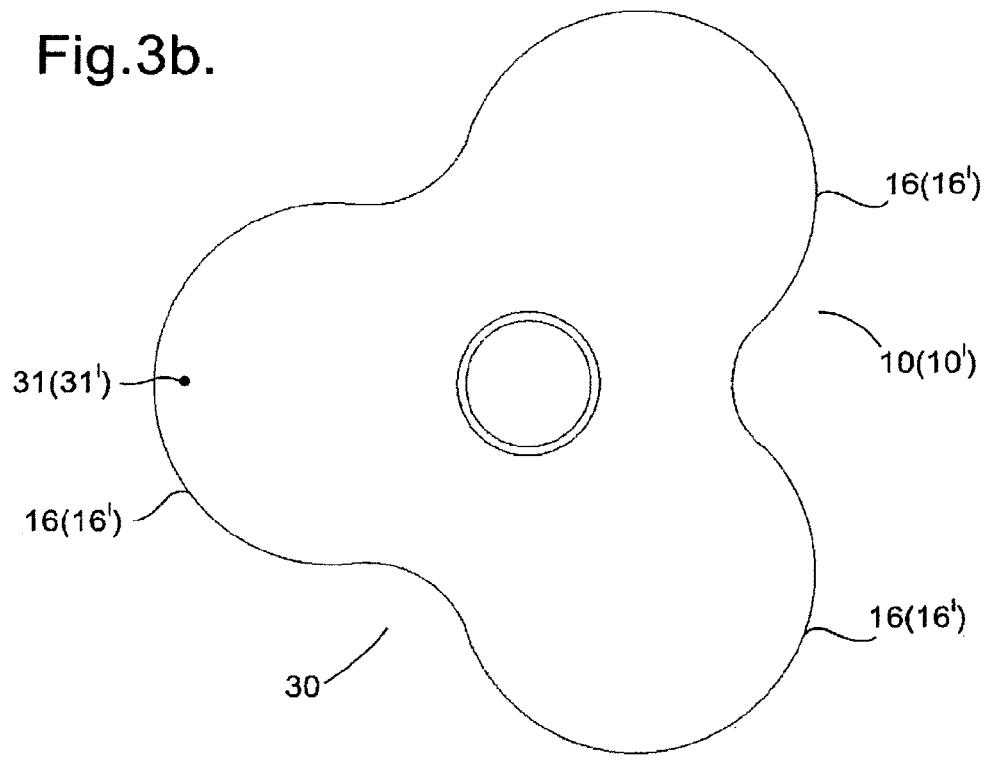
Figure 3C:
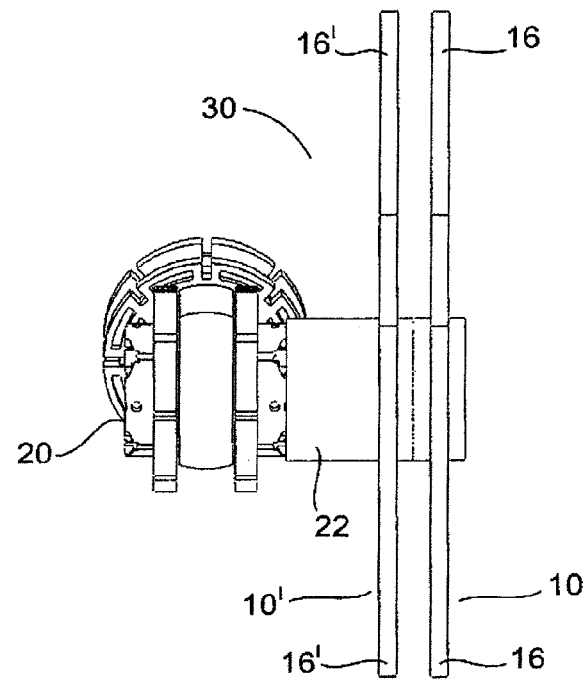

Referring to FIGS. 3a to 3c a perspective view, side elevation and a plan elevation of the wheel assembly 30 is shown in which the wheel assembly 30 is configured for negotiating rough terrain. In these figures, the wheel assembly 30 is configured in the extreme aligned position, in which the wheel assembly 30 allows the mobile platform to efficiently traverse rough terrain or clamber/climb over obstacles. In this aligned position, the first wheel 10 and second wheel 10' are positioned such that a wheel lobe 16 of the first wheel 10 is substantially aligned with a corresponding wheel lobe 16' of the second wheel 10', as shown in FIGS. 3a and 3b. Alternatively, the wheels 10 and 10' can be considered to be aligned when the fictitious point 31 on the first wheel 10 and the corresponding fictitious point 31' on the second wheel 10' do substantially overlap, as shown in FIG. 3b.

It is to be appreciated that the wheels 10 and 10' or wheel lobes 16 and 16' of the wheel assembly 30 can be rotatably adjusted or configured into any other desired angular displacement $\theta$ (or position) within 0 to 360 degrees (or 0 to ±180 degrees).

In operation, the wheel assembly 30 is coupled to a mobile platform (not shown) to allow it to traverse smooth and rough terrain depending on the configuration of the first wheel 10 with respect to the second wheel 10'. The angular displacement $\theta$ of the first wheel 10 with respect to the second wheel 10' is controlled either by hand or by the control or rotation mechanism (not shown), which enables the wheels 10 and 10' to rotate with respect to each other to any desired position of alignment, e.g. from an aligned position through to a non-aligned position and vice versa. The control mechanism locks or maintains the relative positions of wheels 10 and 10' once the alignment of the wheels 10 and 10' is in a desired state. This ensures that the wheel assembly 30 can be driven or turns freely while the alignment positions of the first and second wheels 10 and 10' are maintained at the desired angular displacement $\theta$ (position or state) around the common axis 14(14').

Figure 8A:
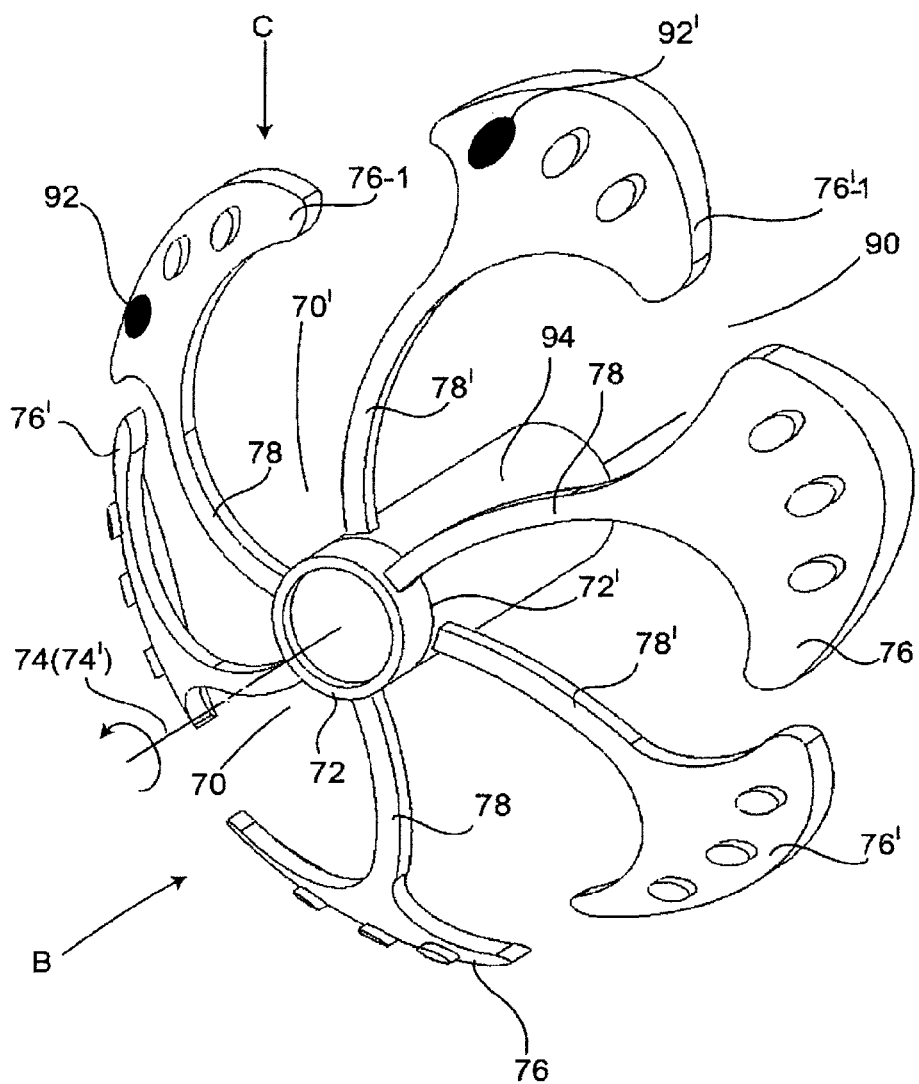
FIG. 8a shows a perspective view of a wheel assembly including the wheel of FIGS. 7a to 7c in a non-aligned configuration.
Figure 8B:
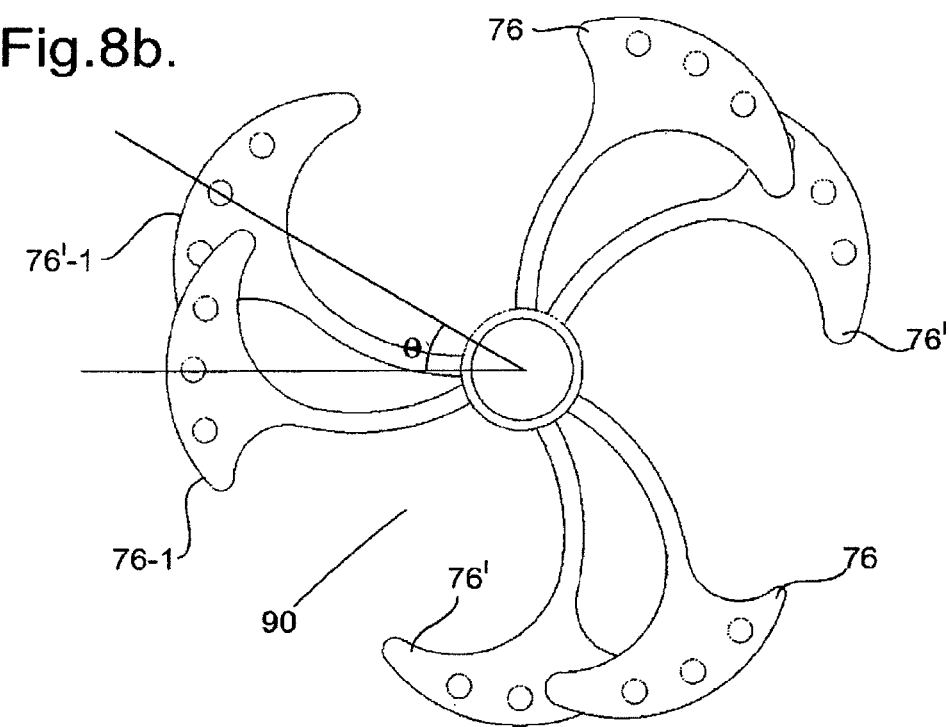
FIGS. 8b and 8c show side elevations of the wheel assembly on the arrow B of FIG. 8a in a semi-aligned and aligned configuration, respectively.
Figure 8C:
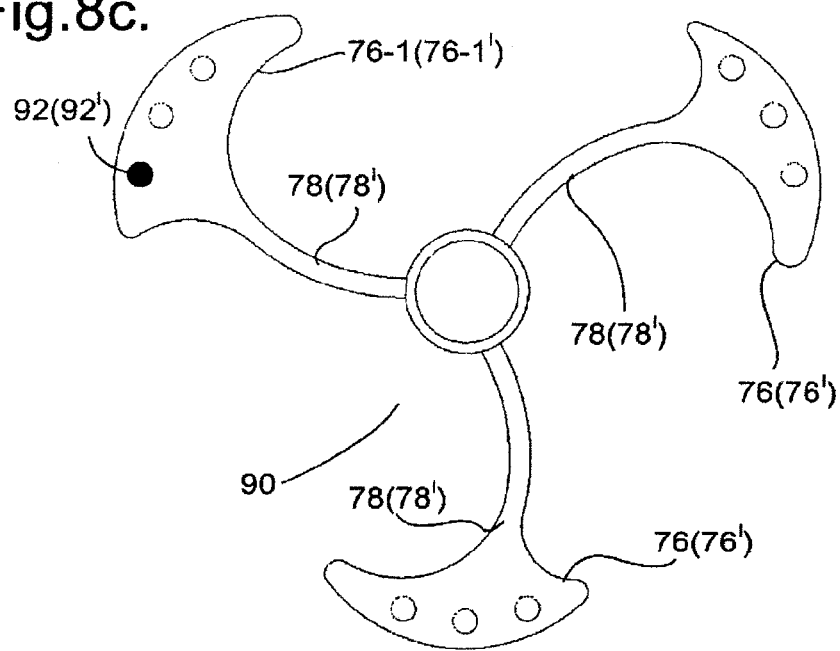
Figure 8D:
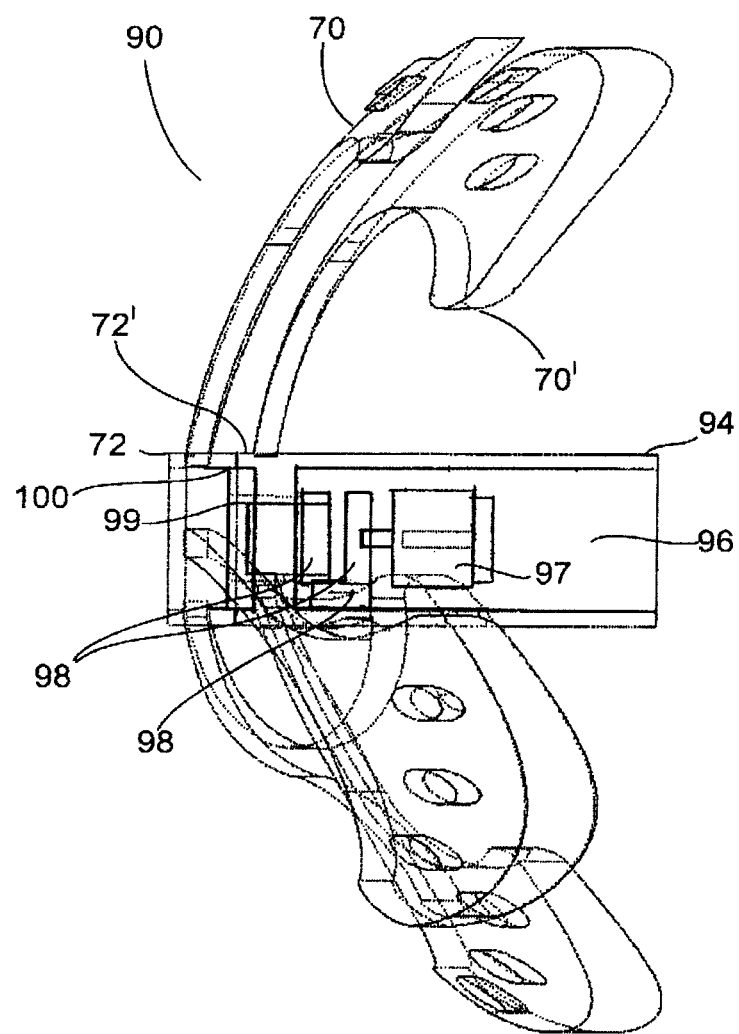
FIG. 8d shows a plan elevation of the wheel assembly on the arrow C of FIG. 8a in a semi-aligned configuration.

An example of a control mechanism is shown in FIG. 8d for rotating and/or locking the first wheel 10 with respect to the second wheel 10' such that the wheel lobes 16 and 16', respectively, are in any desired angular displacement $\theta$ with respect to each other, e.g. from an initial position through to the desired position, which could be an aligned position, a partially aligned position, a non-aligned position, or any angular position between the extreme alignment positions, and vice versa. The control mechanism can be located within the axle 22 coupled/attached to the wheel assembly 30. The control mechanism may include an actuator coupled to two coaxial shafts (not shown), where each shaft is coupled to one of the wheels 10 and 10'. The actuator enables the coaxial shafts to rotate with respect to the other such that the first wheel 10 rotates with respect to the second wheel 10' to a desired angular displacement $\theta$, e.g. from an aligned state to a non-aligned state or vice versa.

It is to be appreciated that the control mechanism for rotating and/or locking the first wheel 10 with respect to the second wheel 10' can include, for example, actuators or hydraulic actuators, servo motors, gears, screw-threads, threaded shafts, solenoid devices, and/or more than two coaxial shafts. For example, the rotation or control mechanism may include the actuator drive and small motor module arrangement as described in relation to the wheel assembly 70 with reference to FIGS. 8a to 8d.

Figure 4A:
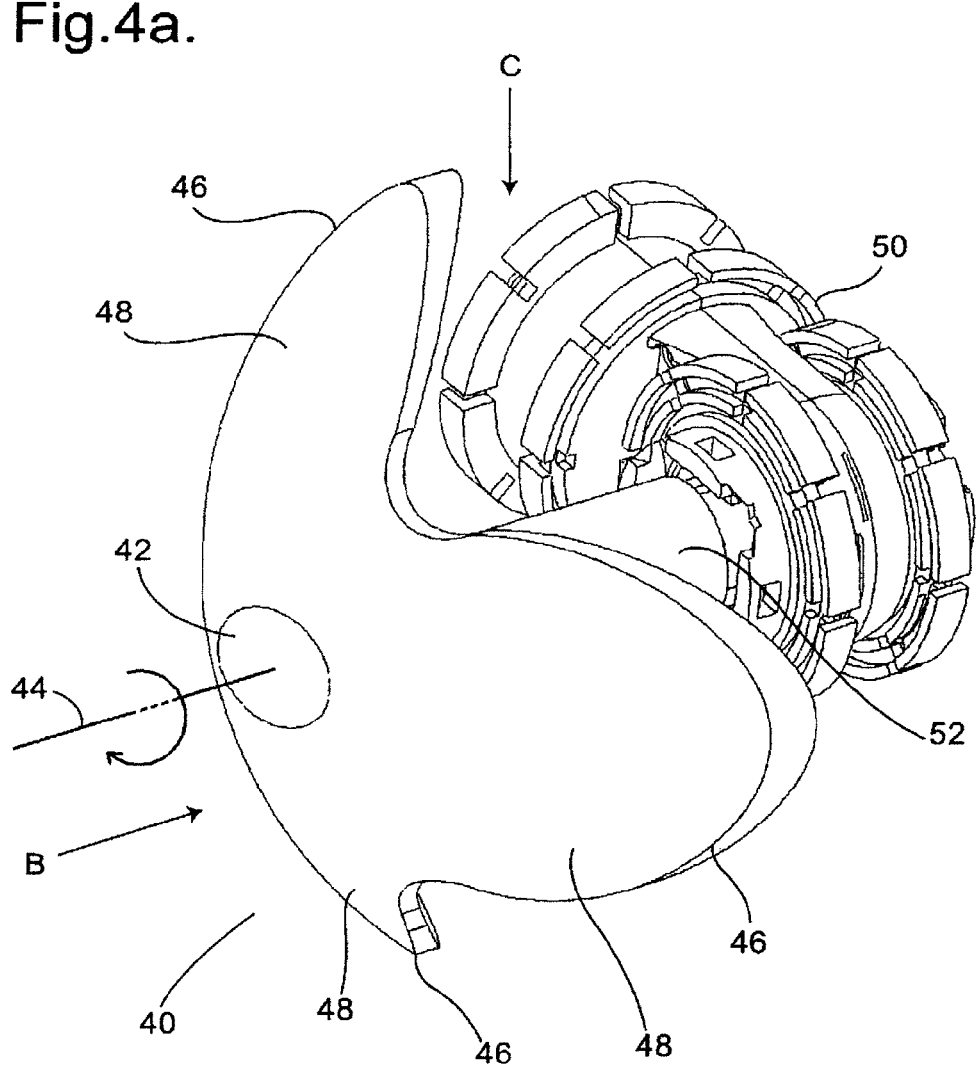
FIG. 4a shows a perspective view of a wheel for negotiating rough terrain while still being suitable for use on smooth terrain.
Figure 4B:
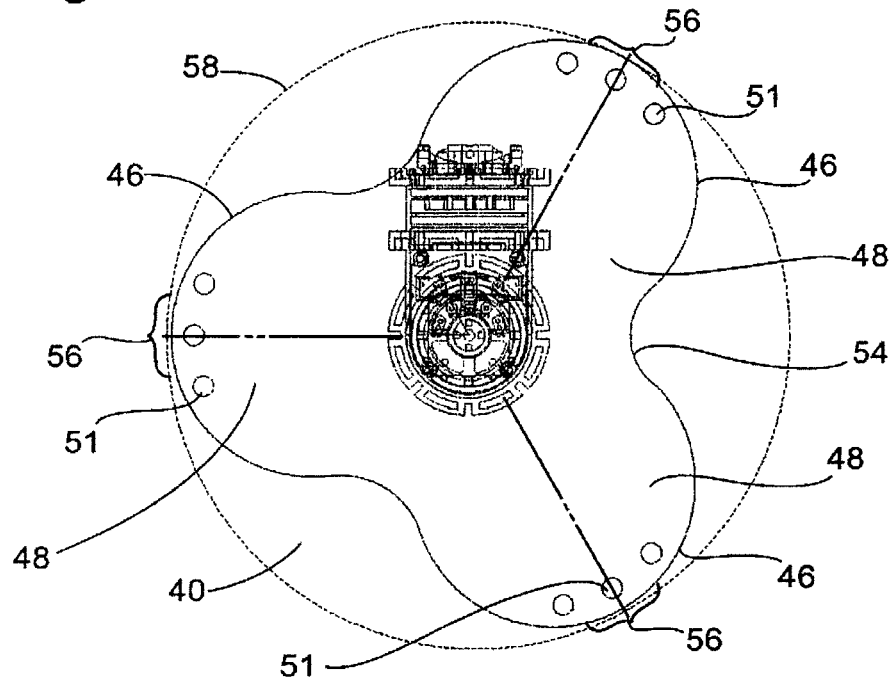
Figure 4C:
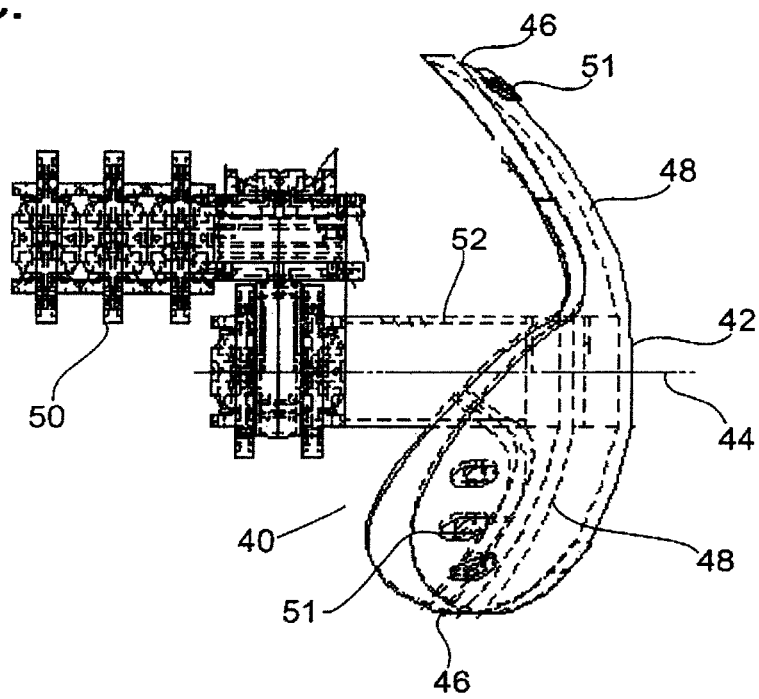

Referring to FIGS. 4a, 4b and 4c, a wheel 40 is shown in perspective, side elevation and plan views, respectively, for a mobile platform (not shown). The wheel 40 includes a hub 42 rotatable around a central axis 44, in which three wheel lobes 46 extend radially from the hub 42 and are spaced around the central axis 44 of the hub 42. The wheel lobes 46 each include a convex curved or arcuate surface 48, which are convex to one side of the wheel assembly 40, i.e. convex in the radial direction. In this case, the wheel lobes 46 curve towards a chassis portion 50 of the mobile platform.

The hub 42 of the wheel 40 connects with an axle 52 (or shaft), where either the wheel 40 rotates on the axle 52 around the central axis 44, and/or the wheel 40 and axle 52 are connected together such that the wheel 40 and axle 52 rotate around the central axis 44 in which the axle 52 is coupled to an actuator drive mechanism (not shown) or motor module (not shown).

Preferably the wheel lobes 46 are spaced or positioned around the hub 42 such that their curved surfaces 48 lie substantially on a common ellipsoidal surface, which include spherical surfaces or hemispherical surfaces. As illustrated in FIGS. 4a, 4b, and 4c, each wheel lobe 46 has a symmetrical curved surface and is joined to the hub 42 such that the exterior perimeter 54 of the wheel describes a continuous curve, the exterior perimeter 54 is shown in the side elevation of FIG. 4b. The exterior perimeter 54 describes a continuous curve that provides anti-snagging capabilities as already described with respect to FIG. 1b in relation to the corresponding flat lobed wheel 10. The extremities 56 (or extremity regions) of each of the wheel lobes 46 are shown in FIG. 4b to lie on a circle 58 of a particular radius. The wheel lobes 46 each have a rounded or curved edge around a region 56 of the lobe 46 that is furthest from the hub. In particular, the curved edge is that is tangential to the circle 58 around the extremity regions 56 of the convex lobe surface 48 that is furthest away from the hub 42. For example, FIG. 1b shows the extremity regions 56 being tangential to circle 58 when the wheel 40 is projected parallel to the central axis 44 in a side elevation.

In the preferred embodiment the wheel lobes 46 are positioned around the hub 42 such that their convex surfaces 48 lie substantially on a common ellipsoidal surface. In this case, it is a portion of a spherical surface. When viewed in side elevation, it can be seen that the shape of each wheel lobe 46 is symmetrical about its centreline. It is to be appreciated that the wheel lobes 46 and/or the curved surfaces 48 can describe other shapes and forms.

Figure 6A:
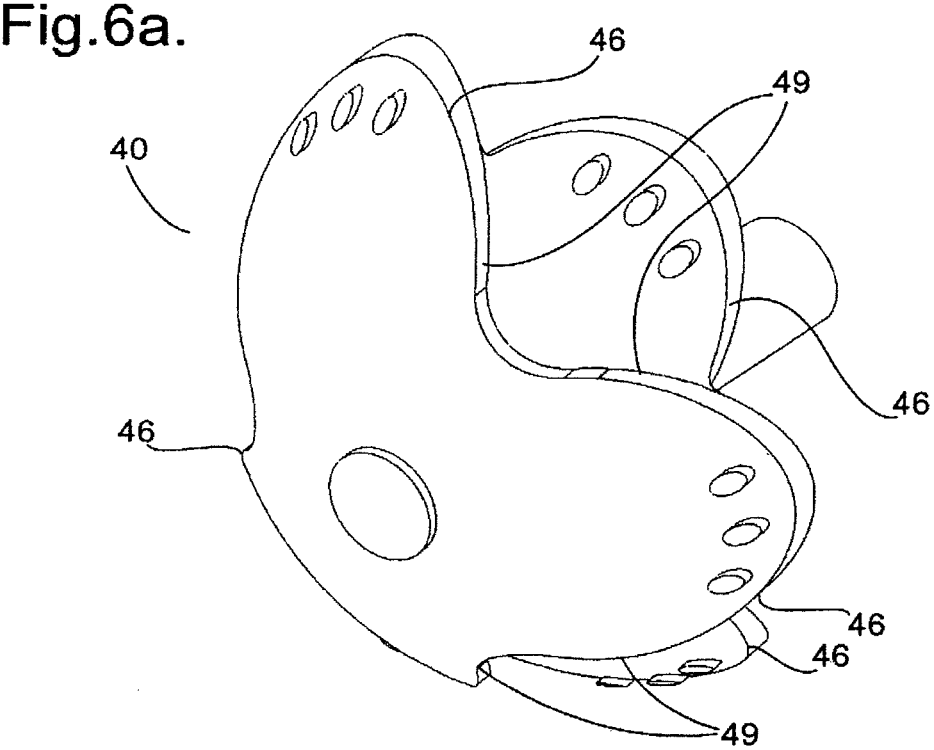
FIG. 6a shows a perspective view of the wheel of FIGS. 4a to 4c with six integral wheel lobes in a flower petal arrangement for enhanced roll and grip.
Figure 6B:
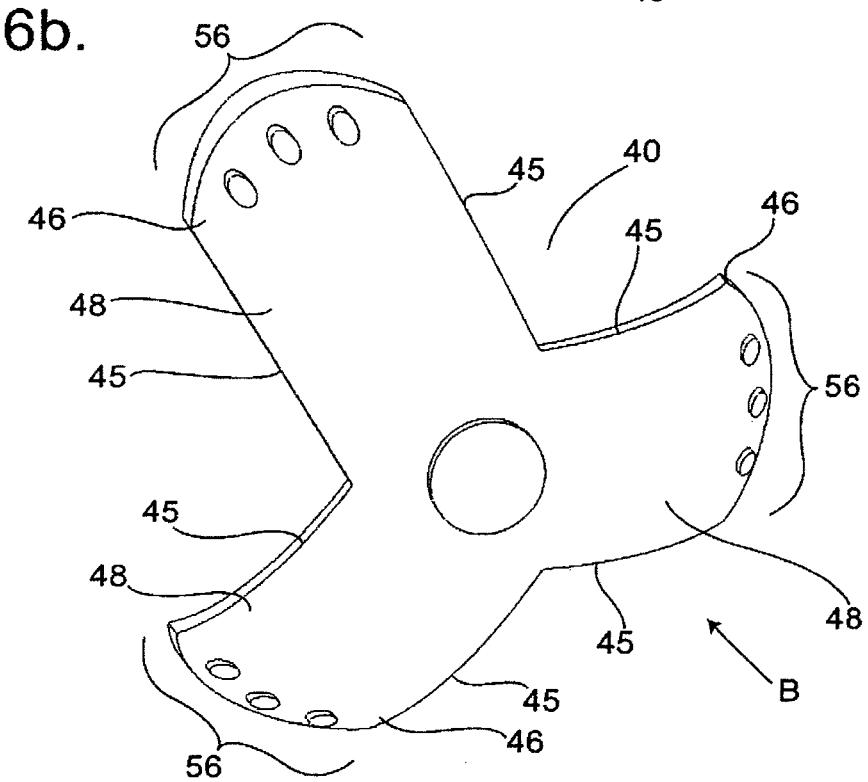
FIG. 6b shows a perspective view of an alternative wheel.

Although the exterior perimeter 54 of the wheel 40 is described as having a continuous curve, it will be appreciated that the exterior perimeter 54 of the wheel 40 can alternatively describe a non-continuous curve, an example of which is shown in FIG. 6b.

In FIGS. 4a, 4b and 4c, the three wheel lobes 46 are illustrated to be equally spaced around the hub 42 at about 120 degree intervals. This produces a wheel-like and/or legged-walking action as the wheel 40 rotates around the central axis 44 of the hub 42. Alternatively, it is envisaged that two wheel lobes equally spaced about the hub 42 (e.g. 180 degrees apart) are sufficient for enhanced climbing capabilities, or alternatively, four or more wheel lobes equally arranged about the hub 42 may be used for enhanced rolling capability across smoothly undulating terrain.

Each of the wheel lobes 46 are provided with studs for providing enhanced grip in slippery, grainy, or muddy terrain. These studs 51 are carbunkle-like studs providing added grip in rough terrain. In addition to studs 51, apertures, cut-outs, or holes can be added to the wheel lobes 46 to reduce mass, to assist the run-off of water and mud, and to augment grip. It will be appreciated that the wheel lobes 46 may have smooth and uninterrupted surfaces, the studs 51 may be dimpled, spikes, or any other shape for enhancing grip of the wheel 40 on varying terrain, and/or include rubber or similar additions for enhancing grip of the wheel 40 on varying terrain.

In operation, with the wheel 40 coupled to a mobile platform, in this example a portion of the chassis 50 of the mobile platform is shown, it is the curvature of the convex surfaces of the wheel lobes 46 and the rounded edges in the extremity or distal regions 56 that allow the wheel 40 to provide an efficient wheel-like motion to the mobile platform over smooth terrain, while the lobed periphery allows the mobile platform to traverse rough terrain or climb over obstacles.

In rough terrain, or terrain with debris such as branches and leaves, the rounded edges in the extremities 56 of the wheel lobes 46 and the continuous curve of the exterior perimeter 54 of the wheel 40 prevents debris from becoming entangled on the wheel 40, while at the same time providing a wheel-like motion. In particular, the wheel lobes 46 have a length that allows the wheel 40 to rotate over obstacles and undulating or rough terrain, in which the obstacles or undulations are less than or equal to the length of the wheel lobes 46. This length can also allow the mobile platform to traverse stairs in a climbing fashion, and but to also traverse irregular terrain efficiently.

It will be appreciated that the three dimensional shape of the wheel, that is to say its curved convex surface (e.g. see FIG. 4a or 4c), helps to provide some of the advantages of the invention. The interplay between the convex form and the three-lobed form allows the wheels 40 to resist snagging. Even though a continuous curve of the outer surface can reduce snagging of the wheel 40, the three dimensional form of the wheel further enhances the resistance to snagging or penetration into cracks and crevices.

In addition, rotating the wheel 40 provides an added dimension of movement to the wheel 40, so instead of the conventional one dimensional motion of a conventional wheel rolling on a surface, the wheel 40 provides a three dimensional motion. Therefore, should a wheel 40 get snagged in a crevice, the three dimensional form of the wheel 40 when rotated in the crevice or crack provides a three dimensional motion that assists extraction. The portion of wheel surface 48 that is in contact with the ground, or surface of the crevice, will vary as the wheel 40 rotates due to the three dimensional form of the wheel 40. This is analogous to having something stuck in an enclosed space, e.g. a key in a lock, and wiggling it to extract it (wiggling involves three dimensional movement).

As the wheel 40 rotates, the curved exterior surface (defined by the wheel lobes 46) of the wheel 40 touches the ground and the footprint of the wheel 40 "transmutes" or changes as it traverses the ground. In particular, as the wheel lobe 46 rotates over the ground the exterior surface touching the ground will continuously change from a narrow profile convex-type surface through to a deep broader profile then back to a narrow profile without abrupt transitions, while at the same time the wheels move along a long axis parallel to the general terrain.

This combination of movement and evolving wheel lobe footprint exerts a high degree of leverage, but with low energy expenditure, due to the fact that the wheel lobe form is rotating around an axle which is itself moving longitudinally in relation to the general terrain surface.

Another aspect of the wheel 40 is that in the event a mobile platform transversally traverses an inclined terrain (e.g. traversing an inclined surface in a direction substantially perpendicular to the incline) the weight of the mobile platform, due to the form of the wheel 40, is directed outwards away from the central axis of the vehicle and is exerted onto the convex surface 48 of the wheel lobes 46 absorbing weight on the downhill side of the incline, yet the relatively "grippy" fine edge of the wheel lobes 46 on the uphill side of the incline will tend to grip terrain like a claw further preventing the vehicle from slipping down the inclined terrain.

Figure 5A:
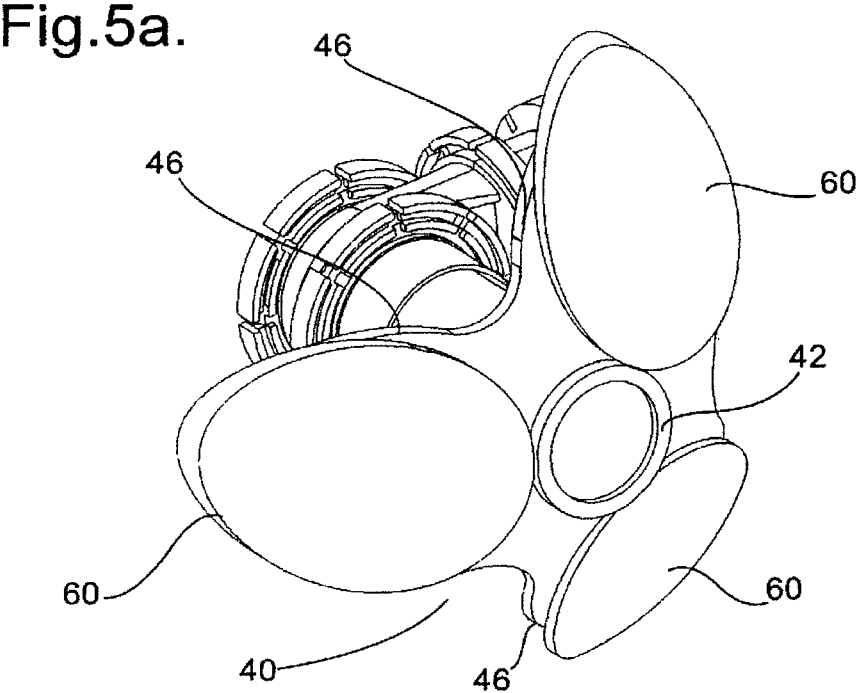
FIG. 5a shows a perspective view of the wheel of FIGS. 4a to 4c including extendable lobes, which are in a non-extended configuration.
Figure 5B:
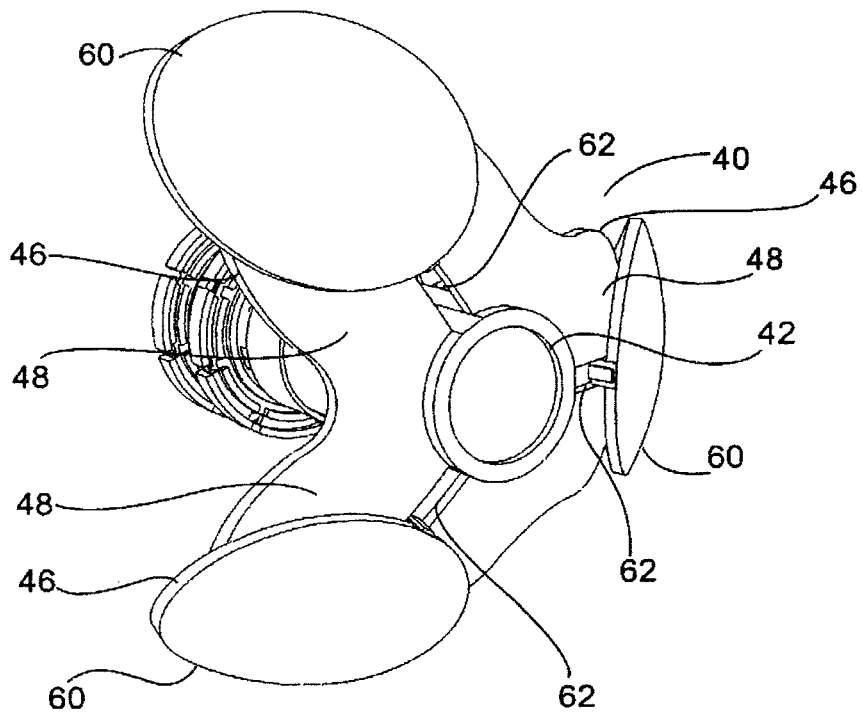
FIG. 5b shows a perspective view of the wheel of FIG. 5a, where the extendable lobes are in an extended configuration for negotiating rougher terrain.

Referring to FIGS. 5a and 5b, perspective views are shown of wheel 40 having movable extendable lobes 60. The numbering of the features of previous figures will be used where applicable. Each of the wheel lobes 46 includes a slot 62 into which is slidably mounted a corresponding curved extension lobe 60.

The extension lobes 60 substantially lie on the convex or exterior surface of each wheel lobe 46. Alternatively, the extension lobes 60 may lie substantially on an interior (concave) surface of wheel lobes 46. In FIG. 5a, the movable extension lobes 60 are positioned such that each curved extendable lobe 60 is slidably movable radially away from hub 42, and follows the corresponding curved surface 48 of each of wheel lobes 46.

The wheel 40 further comprises an extension means or extension mechanism (not shown) for moving all or each of the extension lobes 60 from an unextended state to an extended state. The extension means or mechanism may be adjusted by hand, but preferably the extension lobes 60 are mechanically adjusted or automatically adjusted under the control of an onboard controller in either the mobile platform or within wheel 40.

In operation, with the wheel 40 of the mobile platform in an unextended state or stowed state, the curved extension lobes 60 are in the position as shown in FIG. 4a. In this state, the wheel 40 operates as already described with reference to FIGS. 4a to 4c. When the mobile platform wheel 40 traverses rough terrain containing undulations or obstacles larger than the length of each wheel lobe 46, then the arcuate extension lobes 60 can be extended to increase the length of each wheel lobe 46 allowing the mobile platform to traverse the obstacle or terrain. The wheel lobes 46, when in the extended state, will enable a mobile platform to climb over obstacles greater than the diameter of the wheel 40.

It is to be appreciated that the extension mechanism may extend the extension lobes 60 simultaneously or individually using, among other mechanisms, actuators or hydraulic actuators, servo motors, screw-threads, solenoid devices, and/or coaxial shafts, etc. In addition, it is to be appreciated that the extension lobes 60 could be pivotally mounted to each of the wheel lobes 46, the pivot point being located in the region around the extremities 56 of the wheel lobes 46 such that the extension lobe 60 pivots into an extended or at least partially extended state.

Although each of the wheel lobes 46 includes a slot 62 into which is slidably mounted a corresponding curved extension lobe 60, the wheel lobes 46 may instead include guide rails onto which is slidably mounted the corresponding curved extension lobe 60.

FIG. 6a shows an alternative wheel lobe 46 arrangement for the wheel 40 of FIGS. 4a to 4b. In FIG. 4a, the wheel 40 is illustrated having six integral wheel lobes 46 arranged in a flower-petal configuration. Instead of six integral wheel lobes 46 arranged side-by-side such that they create a smooth convex surface, which would provide smoother rolling capability, the wheel lobes 46 are staggered like the petals of a flower, where three of the wheel lobes 46 are laid over the remaining three wheel lobes 46. This provides a wheel 40 having not only an enhanced rolling capability but also enhanced grip provided by gripping edges or ridges 49.

In operation, the wheel lobes 46 will provide a mobile platform with a smoother wheel-like motion over smooth terrain. However, when the mobile platform traverses rough terrain or obstacles, the gripping edge 49 of the wheel 40 then assists the mobile platform to scramble over debris and obstacles. In soft or absorbent terrain the gripping ridges/edges 49 of wheel 40 will provide an enhanced footprint, i.e. it provides a "horizontal"-like surface that would push down on the soft terrain. This will be enhanced as the depth of the gripping ridge 49 increases. As mentioned previously, it is to be appreciated that the wheel 40 can form other alternative shapes, e.g. the wheel 40 could have four wheel lobes forming a club-shaped disk or wheel, this would provide a smoother wheel-like motion over smooth terrain, but also provides the advantages of traversing relatively rough terrain and with the wheel lobes in a flower petal configuration enhanced grip is also provided.

FIG. 6b shows a perspective view of wheel 40 in which the wheel lobes 46 each form a shape with two straight edges 45, when the wheel 40 is projected parallel to the central axis 44 i.e. in a side elevation view. In particular, the straight edges 45 are straight when the wheel 40 of FIG. 6b is viewed in a side elevation on arrow B. As can be seen, there are still rounded edges in the extremity or distal regions 56 of the wheel lobes 46. For a wheel 40 of the same radius, the convex surfaces 48 of the wheel lobes 46 are narrower than the wheel lobes described in FIGS. 4a to 4c, when the wheel 40 is projected parallel to the central axis 44. This allows the wheel 40 to traverse even taller obstacles or steeper stairs for the same sized wheel radius as that of FIGS. 4a to 4c.

As mentioned previously, it is to be appreciated that the wheel 40 can form other alternative shapes, e.g. the wheel 40 could have four wheel lobes with straight edges forming a cross-shaped disk or wheel, which would provide a smoother wheel-like motion over smooth terrain, but also provide the advantages of traversing relatively rough terrain.

Referring to FIGS. 7a and 7b an alternative wheel 70 is shown in perspective and side elevation along arrow B, respectively, for a mobile platform (not shown). The wheel 70 includes a hub 72 rotatable around a central axis 74, in which three wheel lobes 76 are mounted or coupled to the hub 72 by a corresponding stem member 78, which extend radially from the hub 72 and are spaced around the central axis 74 of the hub 72.

The hub 72 of the wheel 70 connects with an axle 80 (or shaft), where either the wheel 70 rotates on the axle 80 around the central axis 74, and/or the wheel 70 and the axle 80 rotate around the central axis 74 in which the axle 80 is coupled to an actuator drive (not shown) or motor module (not shown).

Figure 7C:
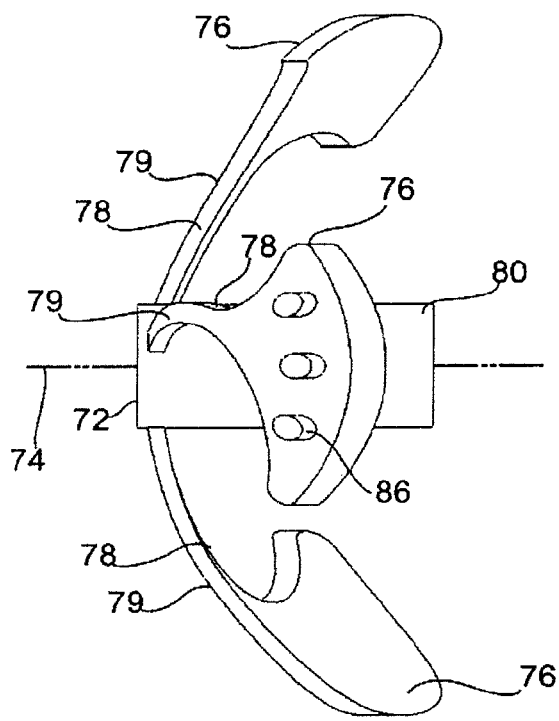

The wheel lobes 76 each include a convex curved or arcuate surface 82 which is convex in the radial direction. When viewed in the side elevation of FIG. 7b, i.e. on arrow B of FIG. 7a, the shape of each wheel lobe 76 is non-symmetrical. As illustrated in FIGS. 7a, 7b and 7c, each wheel lobe 76 has a non-symmetrical curved surface. The extremities or extremity regions 84 (also called distal regions) of each of the wheel lobes 76 are shown in FIG. 7b to lie on a circle 86 of a particular radius. The wheel lobes 76 each have a rounded edge that is at least partially tangential to the circle 86 around the extremity regions 84 of the convex lobe surface 82. It is to be appreciated that the wheel lobes 76 and/or the curved surfaces 82 can describe other shapes and forms, for example, the symmetrical shape of the wheel lobes 46 of the wheel 40 of FIGS. 4a to 6b can be coupled to the stem members 78.

In this case, each of the stem members 78 has a convex curved surface 79 that is also convex in the radial direction, which is more clearly illustrated in the plan view of the wheel 70 in FIG. 7c. Each of the stem members 78 are curved or swept-back in an arc when viewed in the side elevation as illustrated in FIG. 7b. In the side elevation, in which the wheel 70 is projected parallel to the central axis 74, it can be seen that each stem member 78 is narrower than the corresponding wheel lobes 76. In other words, the stem members 78 have a slender profile or fine cross-section relative to that of the wheel lobes 76.

Preferably the stem members 78 and wheel lobes 76 are spaced or positioned around the hub 72 such that their curved surfaces 79 and 82, respectively, lie substantially on a common ellipsoidal surface (which includes spherical surfaces). The wheel lobes 76 and stem members 78 curve towards the axle portion 80 of the mobile platform. In FIGS. 7a, 7b and 7c, the three wheel lobes 76 and corresponding stem members 78 are illustrated to be equally spaced around the hub 72 at about 120 degree intervals. This produces a wheel-like and/or legged-walking action as the wheel 70 rotates around the central axis 74 of the hub 72. Alternatively, it is envisaged that two wheel lobes equally spaced about the hub 72 (e.g. 180 degrees apart) are sufficient for enhanced climbing capabilities, or alternatively, four or more wheel lobes may be used for enhanced rolling capabilities, whilst retaining most of the climbing capabilities.

Each of the wheel lobes 76 are provided with studs 86 for providing enhanced grip in slippery, grainy, or muddy terrain. These studs 86 are carbunkle-like studs providing added grip in rough terrain. In addition to (or in place of) studs 86, apertures, cut-outs, or holes can be added to the wheel lobes 76 to further reduce weight, mass, to assist the run-off of water and mud, and/or to augment grip. It will be appreciated that the wheel lobes 76 may have smooth and uninterrupted surfaces, the studs 86 may be dimpled, spikes, or any other shape for enhancing grip of the wheel 70 on varying terrain, and/or include rubber or similar additions for enhancing grip of the wheel 70 on varying terrain.

In operation, with the wheel 70 coupled to a mobile platform (not shown), it is the curvature of the convex surfaces 82 of the wheel lobes 76 and the rounded edges in the extremity regions 84 that allow the wheel 70 to provide an efficient wheel-like motion to the mobile platform over smooth terrain, while the length of the stems allows the mobile platform to traverse rough terrain or climb over obstacles. In addition, as the mobile platform traverses the terrain, the relatively fine cross-section of the stem members 78 may allow the stem members 78 to flex under load while the distal wheel lobes 76 provide the load bearing characteristics of the wheel lobes 76 of wheel 70.

The wheel lobes 76 and stem members 78 have a length that allows the wheel 70 to rotate over obstacles and undulating or rough terrain, in which the obstacles or undulations are less than or equal to the length of the wheel lobes 76 and the stem members 78. This allows the most prominent portions of obstacles such as rocks or scattered debris to penetrate as far as the hub 72 of wheel 70. The wheel lobes 76 are then able to obtain purchase on obstacles at a greater distance from the central axis 74 of the hub 72 than a wheel 70 of FIGS. 7a to 7c having the same diameter.

The arrangement of the wheel lobes 76 and stem members 78 of wheel 70 enhances the climbing capability of a mobile platform (vehicle or robot). The climbing capability can be measured as the proportion of the diameter of wheel 70 to the obstacle height. When the wheel 70 has three wheel lobes 76 and three stem members 78, as illustrated in FIGS. 7a to 7c, a mobile platform using the wheel 70 can traverse individual obstacles close to or even equalling the exterior diameter of wheel 70. The length and the slender narrow profile of the stem members 78 also allow the mobile platform to traverse stairs in a climbing fashion, and also traverse irregular and/or rocky terrain efficiently.

The common arc or common swept-back arc configuration of the stem members 78 from the hub 72, when viewed in the side elevation of FIG. 7b, provides additional rolling traction with a given terrain or obstacle surface. This arc-form of the stem member 78 assists the turning or rotation of the wheel 70 over terrain or an obstacle that penetrates past the wheel lobe 76 to the stem member 78. This provides the advantage of minimising energy expenditure by attenuating peak torque demands on the motor module or actuator of a mobile platform.

In rough terrain, or terrain with debris such as branches and leaves, the rounded edges in the extremities of the wheel lobes 76 and the curve of the stem members 78 of the wheel 70 prevent debris from becoming entangled on the wheel 70, while at the same time providing a wheel-like motion.

The slender form of the stem members 78 can also provide an amount of flex when the stem member 78 is under load, this will also depend on the material or composite material that it is made from. The flexing of the stem member 78 allows the wheel 70 to absorb mechanical shocks as the mobile platform encounters rocky terrain or obstacles. The transmission of mechanical shocks or sharply defined peaks of mechanical effort is attenuated as the stem member 78 flexes, which will prolong the life of the wheel 70, reduces the mechanical degradation of the mobile platform, and also prevents the mechanical shock from being fully transmitted to sensitive equipment, etc., on the mobile platform.

Mechanical shock is further attenuated by the arc form or swept back profile of the stem members 78 when viewed in a side elevation. The arc form of each of the stem members 78 is swept back in relation to the rotation of the hub 72. The stem member 78 is initially at an at-rest configuration before its wheel lobe 76 contacts an obstacle or the ground. When the wheel lobe 76 contacts the obstacle or the ground the degree or curvature of the arc of the stem member 78 can increase (i.e. the stem member 78 flexes) to absorb or attenuate the mechanical shock. Once the mechanical load is removed, the stem member 78 reverts to its at-rest configuration.

In addition, the flexing of the stem members 78 when contacting the terrain or obstacles reduces the vertical and transversal amplitude variance of the deflection of the mobile platform (or robot) away from the general axis of progression. This provides enhanced stability, improved route-following, and lower energy consumption for a given distance traversed.

The combination of the slender form of the stem members 78 and the wheel lobes 76 reduces the total mass or weight of wheel 70 as compared with the wheel 40 (as illustrated in FIGS. 4a to 4c) having the same diameter and when constructed from the same materials. The low mass characteristic of wheel 70 is useful for applications where weight is one of the critical operational or design criteria. For example, small scale or low mass robots and mobile platforms, or alternatively aerial/mobile platforms having aerial and ground mission profiles where rough terrain traversing capability would be advantageous for the ground portion of the mission profile (once the aerial portion of the mission profile is terminated).

As the wheel 70 rotates, the curved exterior surface (defined by the wheel lobes 76) of the wheel 70 touches the ground and the footprint of the wheel 70 "transmutes" or changes as it traverses the ground. In particular, as the non-symmetrical wheel lobe 76 rotates over the ground the exterior surface touching the ground continuously changes from a narrow profile convex-type surface through to a deep broader profile then back to a narrow profile without abrupt transitions, while at the same time the wheels move along a long axis parallel to the general terrain.

This combination of movement and evolving wheel lobe footprint exerts a high degree of leverage, but with low energy expenditure, due to the fact that the wheel lobe form is rotating around an axle which is itself moving longitudinally in relation to the general terrain surface.

Another aspect of the wheel 70 is that in the event a mobile platform transversally traverses an inclined terrain (e.g. traversing an inclined surface in a direction substantially perpendicular to the incline) the weight of the mobile platform, due to the form of the wheel 70, is directed outwards away from the central axis of the vehicle and is exerted onto convex surface of the wheel lobes 76 absorbing weight on the downhill side of the incline, yet the relatively "grippy" fine edge of the wheel lobes 76 on the uphill side of the incline will tend to grip terrain like a claw further preventing the vehicle from slipping down the inclined terrain.

Figure 7D:
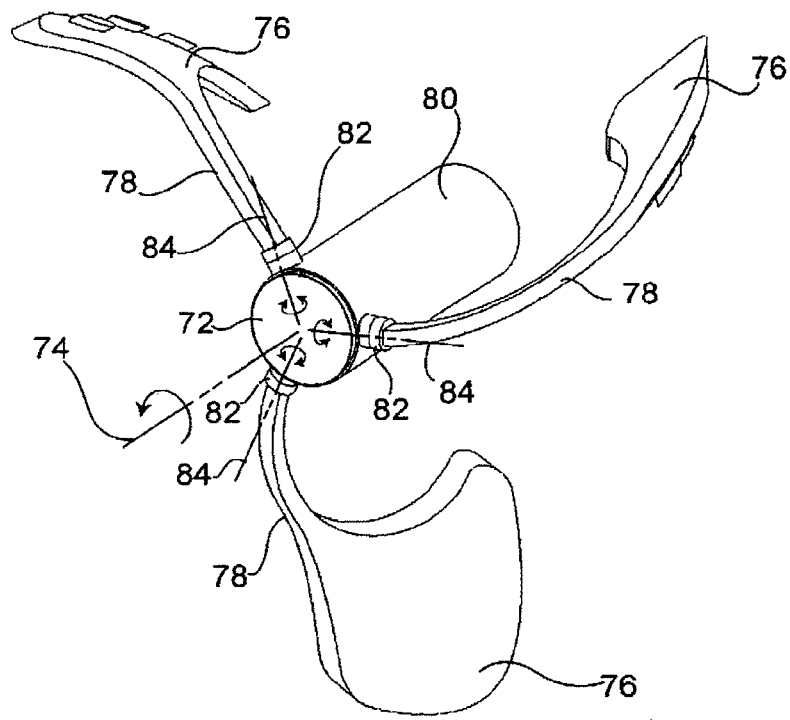
FIG. 7d shows a perspective view of the wheel of FIG. 7a including rotatable stem members.

Referring to FIG. 7d, the wheel 70 is illustrated in which the stem members 78 are each rotatably mounted to the hub 72 by a rotation module 82. The rotation module 82 provides a mounting for the stem member 78 and also a mechanism to enable the stem member 78 to rotate around an axis of rotation 84 that, in this case, is radial from the central axis 74. However, it is to be appreciated that although the axis of rotation 84 is illustrated as being radial to the central axis 74, the axis of rotation 84 can be arranged such that it is merely non-parallel to the central axis 74. Although the axis of rotation 84 is described to be radial from the central axis 74, it is to be appreciated that the axis of rotation 84 does not need to be radial with the central axis 74 nor does it need to intersect the central axis 74 of the hub 72, instead the axis of rotation 84 may be translated or inclined with respect to the central axis 74 such that it does not intersect the central axis 74.

In operation, the rotation module 82 rotates the stem members 78 and hence the corresponding wheel lobes around the axis of rotation 84. This additional rotation of the stem members 78 can be particularly useful when a wheel lobe of the wheel 70 becomes snagged, for example in a crack, hollow, or crevice. Instead of wasting energy by increasing power to the motor to force the wheel 70 out of the crevice (rotating the wheel 70 around the central axis 74), the affected stem member 78 and hence the corresponding wheel lobe 76 could be rotated within the crevice around the axis of rotation 84, which may provide the additional degree of freedom necessary for assisting the wheel 70 from becoming unsnagged from the crevice. Alternatively, a wheel lobe 76 may have become snagged on a branch or other obstacle, therefore rotating the affected wheel lobe 76 may shift the obstruction enough to free the wheel lobe 76.

In another scenario, a mobile platform may encounter a body of water, e.g. a lake or water way, that is too deep for it to traverse when the wheel 70 is configured for terrain traversing capabilities. Should the mobile platform be buoyant enough to float in the water, i.e. it may be amphibious, it may enter the water and re-orient the stem members 78 and hence the corresponding wheel lobes 76 by rotating them around the axis of rotation 84 such that the wheel 70 forms a paddle wheel. The mobile platform can then traverse the water body without requiring further assistance. As the mobile platform enters the water, the stem members 78 may either rotate individually about their corresponding axis of rotation 84 when unloaded, or once the mobile platform begins to float all the stem members 78 may rotate simultaneously.

Alternatively, the stem members 78 and corresponding wheel lobe 76 may be controlled to rotate in a stroke sequence similar to that of a freestyle swimmer, i.e. the stem member 78 rotates the wheel lobe 76 for an energy efficient entry into the water, then further rotates the wheel lobe 76 for an efficient power stroke, then further rotates the wheel lobe 76 for an efficient exit out of the water. It is to be appreciated that the stem members 78 may individually rotate, or some or all of the stem members 78 may simultaneously rotate about their axis of rotation 84.

In addition, a mobile platform or robot may desirably be provided with the ability to detect the need to adapt its terrain traversing or locomotive capability to that of amphibious or aquatic locomotive capability e.g. should the mobile platform encounter a water body such as a water way or a lake. The mobile platform may detect the need to adapt by using, among other things, image analysis, haptic sensing of perpendicular pressure and transversal shear stress, global positioning satellite location detection, electronic maps, or a combination of these and further sensor data. Upon detecting the need to adapt its locomotion in such a manner, the mobile platform may advance into the water (or absorbent medium) such that the foremost wheels 70 and wheel lobes 76 are re-configured once they cease to make contact with a hard or resilient surface, e.g. in the lake this is the lake bed. The rearmost wheels 70 and wheel lobes 76 will continue to drive the mobile platform forward, whilst the foremost wheels 70 with the stem members 78 oriented or rotated about the axis of rotation 84 into a paddle wheel form will obtain traction by "paddling". Once the rearmost wheels 70 cease to make contact with the lake bed, these wheels 70 can be re-configured into a paddle wheel form as well. The mobile platform is then driven forward through the water. Upon detecting the need to re-configure back into terrain traversing capability near the shoreline, or to regain a shoreline, the process of re-configuration can be performed in a reverse sequence to that of entering the lake.

Figure 7E:
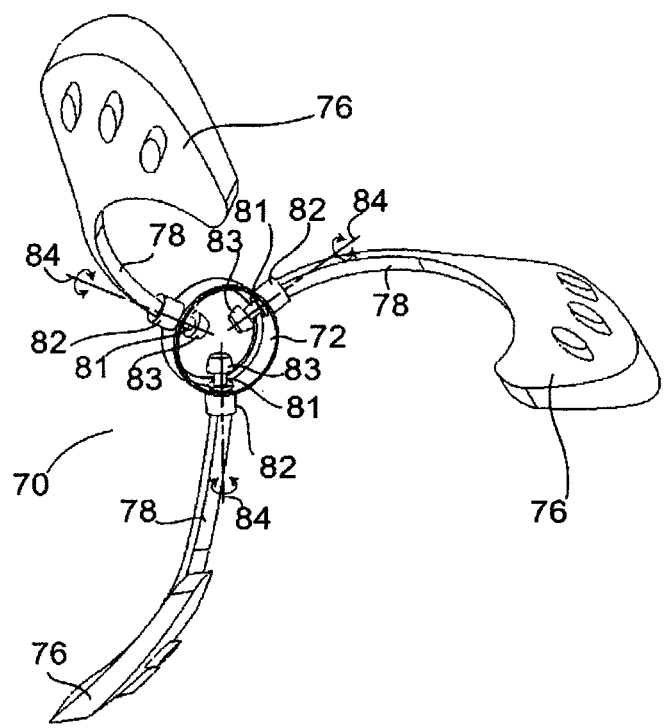
FIGS. 7e and 7f shows a perspective cut-away view of the wheel of FIG. 7d illustrating the mechanisms that rotate the stem members.
Figure 7F:
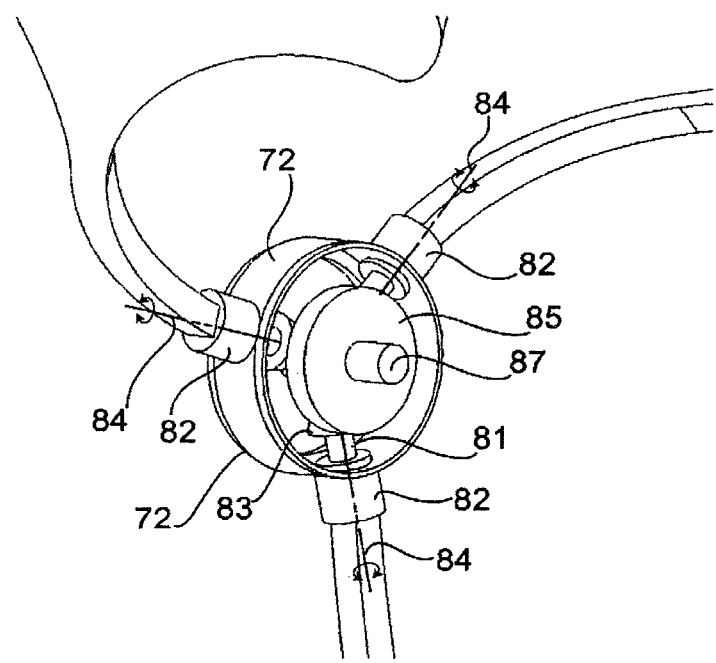

FIG. 7e illustrates a perspective cut-away view of the hub 72 of wheel 70 showing the rotation module 82 and mechanism to enable the stem members 78 to rotate about the axis of rotation 84. FIG. 7f illustrates a close-up perspective view FIG. 7e, with the mechanism of the rotation module 82 coupled to a gearing and shaft. Referring to FIGS. 7e and 7f, the mechanism of the rotation module 82 is illustrated as including a shaft 81 coupled to a conical gearing 83, which can be further coupled to a further gearing 85 and shaft 87 of a motor module (not shown). The motor module may be positioned within the hub 72 or axle 80 of wheel 70. It is to be appreciated that the rotation of the stem members 78 may be achieved through any other arrangement of gears, shafts, actuators, solenoids, motors, electromagnets, and/or similar devices coupled by means of gearing or direct mechanical linkage to the rotation module 82 and/or stem members 78.

Figure 7G:
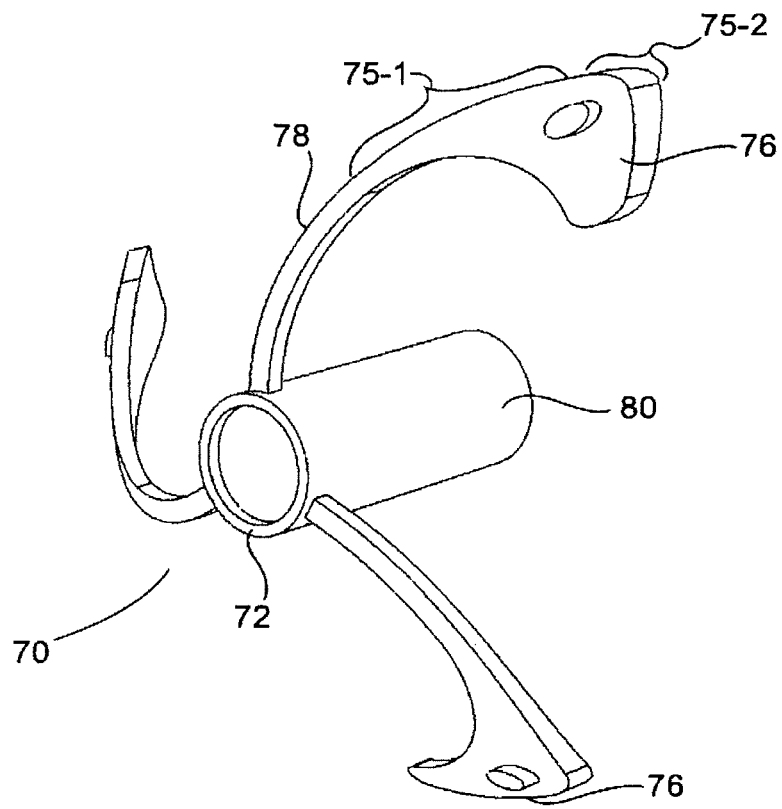
FIG. 7g shows a perspective view of the wheel of 7a including an alternative wheel lobe shape for enhanced anti-snagging capability.

Referring to FIG. 7g, the wheel 70 is illustrated having an alternative wheel lobe 76 shape. In this case, the shape of the wheel lobe 76 is designed to provide an enhanced anti-snagging capability to the wheel 70. This is provided by having the continuous curve of the arc formed by the stem member 78 continues into the continuous curve described by lobe region 76-1 (or leading edge) of the wheel lobe 76 in which the continuous curve 76-1 increases in curvature to round off into a rounded portion or "heel" portion 76-2 of the wheel lobe 76. This shape of wheel lobe 76 still provides the capability of negotiating rough terrain, but it also provides an enhanced anti-snagging capability as compared to the wheel 70 of FIGS. 7a to 7c. For example, the wheel 70 may rotate over a fallen branch, but instead of a wheel lobe 76 picking up the branch as the wheel 70 rotates over it, the continuous curves 75-1 and 75-2 of wheel lobe 76 are such that there is no place for the branch to "rest on" the leading edge or regions 75-1 and/or heel region 75-2 of the wheel lobe 76, hence the branch merely slips off the wheel lobe 76 as it rotates instead of being picked up.

Figure 7H:
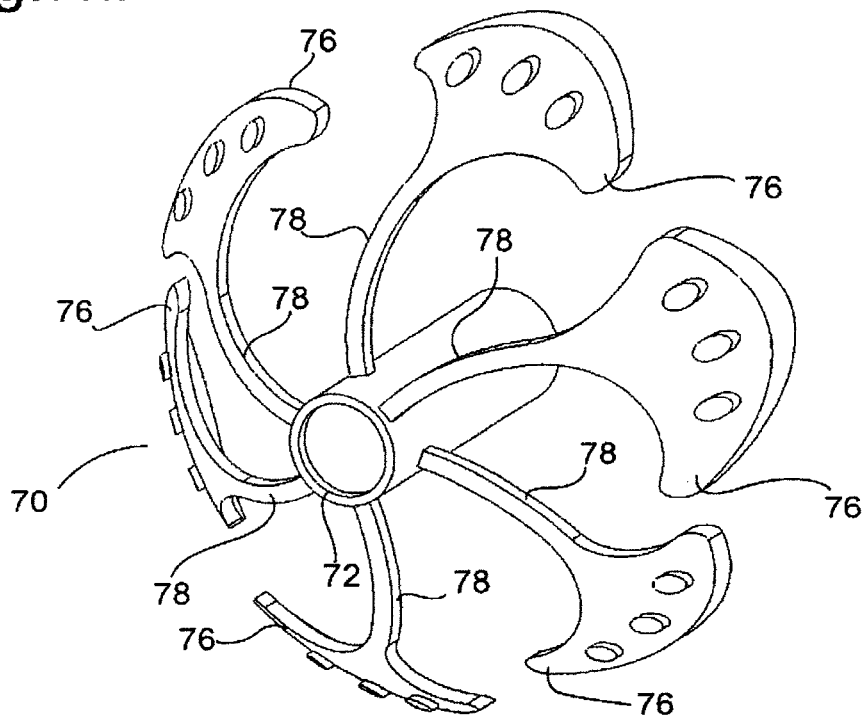
FIG. 7h shows a perspective view of the wheel of FIG. 7a including six wheel lobes and stems staggered around the hub.

Referring to FIG. 7h, the wheel 70 is illustrated having an alternative wheel lobe 76 arrangement, in this case six wheel lobes 76 are mounted or coupled to the hub 72 by six stem members 78 as have been described with reference to FIGS. 7a to 7c. The stem members 78 and wheel lobes 76 are equally spaced or arranged about hub 72. The stem members 78 are mounted in a staggered formation around hub 72, but it is to be appreciated that the stem members 78 can also be mounted in line around the hub 72.

In operation, this alternative wheel 70 provides enhanced rolling capability across smoothly undulating terrain. The staggering of the stem members 78 allows alternating wheel lobes 76 to contact staggered sections of the terrain, which provides an increased likelihood of the wheel 70 finding a suitable "foot hold" or purchase when traversing terrain. In addition, when the stem members 78 are made of resilient material and allowed to flex under load providing relief from mechanical shocks over rocky terrain, the staggering of the stem members 78 prevents the closely spaced wheel lobes 76 from inadvertently interfering, "tangling", or touching each other as they flex or when a stem member 78 flexes as the corresponding wheel lobe 76 hits an obstacle or a portion of the rough terrain.

Referring to FIGS. 8a to 8d a perspective view, two side elevations, and a plan elevation of a wheel assembly 90 is shown that includes a pair of wheels 70 and 70' substantially as described with respect to FIGS. 7a to 7c. In FIG. 8a, the wheel assembly 90 is configured in a non-aligned configuration for negotiating smooth terrain. FIGS. 8b and 8c show a side elevation of the wheel assembly 90 in a semi-aligned and aligned configuration, respectively, for negotiating rougher terrain or obstacles. The numbering of FIGS. 7a to 7c will be used for features that have already been described with duplicate features of different parts having the same numeral but differentiated with an apostrophe, e.g. a first wheel 70 and a second wheel 70'.

In FIGS. 8a to 8d, the wheel assembly 90 includes a first wheel 70 and a second wheel 70', which include the hubs 72 and 72' in which each wheel 70 and 70' has three wheel lobes 76 and 76' with corresponding stem members 78 and 78'. The first wheel 70 is rotatably mounted to the second wheel 70' such that the central axes 74 and 74' of first wheel 70 and the second wheel 70', respectively, are coaxial and so define a common axis 74(74'). As shown in FIG. 8a, the hub 72 of the first wheel 70 is rotatably mounted to the hub 72' of the second wheel 70'. The first and second wheels 70 and 70' are shown to be coupled to an axle 94 of wheel assembly 90.

In FIG. 8a, the wheel assembly 90 further includes means (not shown) (also called a control mechanism or a rotation mechanism) for rotatably adjusting (rotatably adapting or configuring) the wheel assembly 90. The rotational adjustment can be from a non-aligned state through to an aligned state or a semi-aligned state (as described in more detail below) by rotating the first wheel 70 with respect to the second wheel 70' around the common axis 74(74') to a desired angular displacement θ between the two wheels 70 and 70'.

Referring to FIG. 8a, the wheel assembly 70 is shown to be configured in a non-aligned state, in which the wheel assembly 90 allows the mobile platform to efficiently traverse smooth terrain. In the non-aligned state, the first wheel 70 and the second wheel 70' are positioned such that corresponding wheel lobes 76 of the first wheel 70 are midway between the corresponding wheel lobes 76' of the second wheel 70'. As discussed with reference to FIGS. 2a to 2c, with three wheel lobes 76 and 76' on each wheel 70 and 70', the angular displacement between the first wheel 70 and second wheel 70' (or between a wheel lobe 76 of the first wheel 70 and an adjacent wheel lobe 76' of the second wheel 70') is approximately 60 degrees. Alternatively, the wheels 70 and 70' can be considered to be non-aligned when a fictitious point 92 on the first wheel 70 and a corresponding fictitious point 92' on the second wheel 70' do not substantially overlap, as shown in FIG. 8a.

Referring to FIG. 8b, a side elevation of the wheel assembly 90 is shown in which the wheel assembly 90 is configured for negotiating mildly rough terrain. The wheel assembly 90 is configured in a semi-aligned state (or position), in which the wheel assembly 90 allows the mobile platform to efficiently traverse smooth terrain but can also clamber/climb over obstacles or undulating terrain if necessary. The wheel assembly 90 can be configured to any desired angular displacement between the two extreme alignment positions of the first and second wheel 70 and 70'. In this case, the angular displacement of the first wheel 70 with respect to the second wheel 70' is approximately 30 degrees between two adjacent wheel lobes 76-1 and 76-1'. It is to be appreciated that, the angular displacement between the two adjacent wheel lobes 76-1 and 76-1' can vary from a fully aligned position of 0 degrees (when the wheel lobes 76 and 76' are overlapping) through to another fully aligned position of ±120 degrees (when the wheel lobes 76-1 and 76-1' overlap one of the other wheel lobes 76 and 76'. In this case, the semi-aligned state, the first wheel 70 and second wheel 70' are positioned such that a wheel lobe 76-1 of the first wheel 70 at least partially overlaps a corresponding wheel lobe 76-1' of the second wheel 70', as shown in FIG. 8b.

It is to be appreciated that the wheels 70 and 70' or wheel lobes 76 and 76' of the wheel assembly 90 can be rotatably adjusted or configured into any other desired angular displacement θ (or position) within 0 to 360 degrees (or 0 to ±180 degrees).

Referring to FIG. 8c a side elevation of the wheel assembly 90 is shown in which the wheel assembly 90 is configured in an extreme alignment position for negotiating rough terrain or obstacles. The wheel assembly 90 is configured in the aligned state, in which the wheel assembly 90 allows the mobile platform to efficiently traverse rough terrain or clamber/climb over obstacles. In the aligned state, the first wheel 70 and second wheel 70' are positioned such that a wheel lobe 76 of the first wheel 70 is substantially or fully aligned with a corresponding wheel lobe 76' of the second wheel 70', as shown in FIG. 8c. In addition, the stem members 78 of the first wheel 70 are substantially or fully aligned (or overlap) the stem members 78' of the second wheel 70'.

Alternatively, the wheels 70 and 70' can be considered to be aligned when the fictitious point 92 on the first wheel 70 and the corresponding fictitious point 92' on the second wheel 70' substantially overlap, as shown in FIG. 8c. The advantage of having the wheel lobes 76 and 76' and stem members 78 and 78' substantially aligned or fully overlapping for climbing mode is that each overlapping stem member 78 and 78' shares the load of the mobile platform as it climbs or clambers over obstacles or rough terrain. This enhances the robustness of the wheel assembly 90 especially when the stem members 78 and 78' are used to leverage the mobile platform over obstacles or up stairs.

In operation, the wheel assembly 90 is coupled to a mobile platform (not shown) to allow it to traverse smooth and rough terrain depending on the configuration of the first wheel 70 with respect to the second wheel 70'. The alignment of the first wheel 70 with respect to the second wheel 70' is controlled either by hand or by a control or rotation mechanism that enables the wheels 70 and 70' to rotate with respect to each other from an aligned state, through to a semi-aligned state, and/or through to a non-aligned state and vice versa. The control mechanism locks or maintains the relative positions of wheels 70 and 70' once the alignment of the wheels 70 and 70' are in a desired state of alignment.

It is to be appreciated that the mechanisms for rotating and/or locking the first wheel 70 with respect to the second wheel 70' can include, for example, actuators or hydraulic actuators, servo motors, gears, screw-threads, threaded shafts, solenoid devices, and/or more than two coaxial shafts.

As an example, in FIG. 8d a rotation or control mechanism 96 is shown inside axle 94 of wheel assembly 90, the control mechanism 96 includes an actuator drive arrangement that rotates the two wheels 70 and 70' of wheel assembly 90 coaxially. A small motor module 97 is mounted in a portion of axle 94, however, it may also be mounted in a section of the hub 72' or adjacent to hub 72', or even within hub 72 of the first wheel 70. A set of gears 98 and 99 are coupled, via shafts and other gears, etc., to the small motor module 97 providing a reduction drive to hub 72 of the first wheel 70, a toothed gearing 100 in hub 72 is shown to be coupled by gears 99, the toothed gearing 100 may also be a toothed inner surface of hub 72. The first wheel 70 is mounted on a bearing (not shown) which is set into the exterior or distal end of the second wheel 70'. The small motor module 97 may be actuated or operated wirelessly and may be supplied with its own power source (not shown) mounted inside the cylindrical hub 72' of the second wheel 70' or alternatively within axle 94—or any other useful location. Alternatively, it is to be appreciated that the small motor module 97 can be powered by other means, for example, it could be directly powered by the mobile platform's primary power source (not shown).

Alternatively, the control mechanism 96 may include, instead of the small motor module 97, a linear actuator with a linkage to convert linear actuation to revolute actuation. This may provide more sensitive control of adjusting the first and second wheels 70 and 70' with respect to each other. In addition, a degree of compliance for providing a form of shock absorption or method of building torque when climbing obstacles or traversing rough terrain may also be built in. For example, a flexible linkage, spring mechanism, or repelling magnet arrangement may be used, as described below in relation to driving the wheel assembly 90.

In an alternative arrangement, the control mechanism may be within the axle 94 of the wheel assembly 90. It may include an actuator coupled to two coaxial shafts, where each shaft is coupled to one of the wheels 70 and 70'. The actuator enables the coaxial shafts rotate with respect to the other such that the first wheel 70 rotates with respect to the second wheel 70' from an aligned state through to a non-aligned state or a semi-aligned state and vice versa.

Figure 8E:
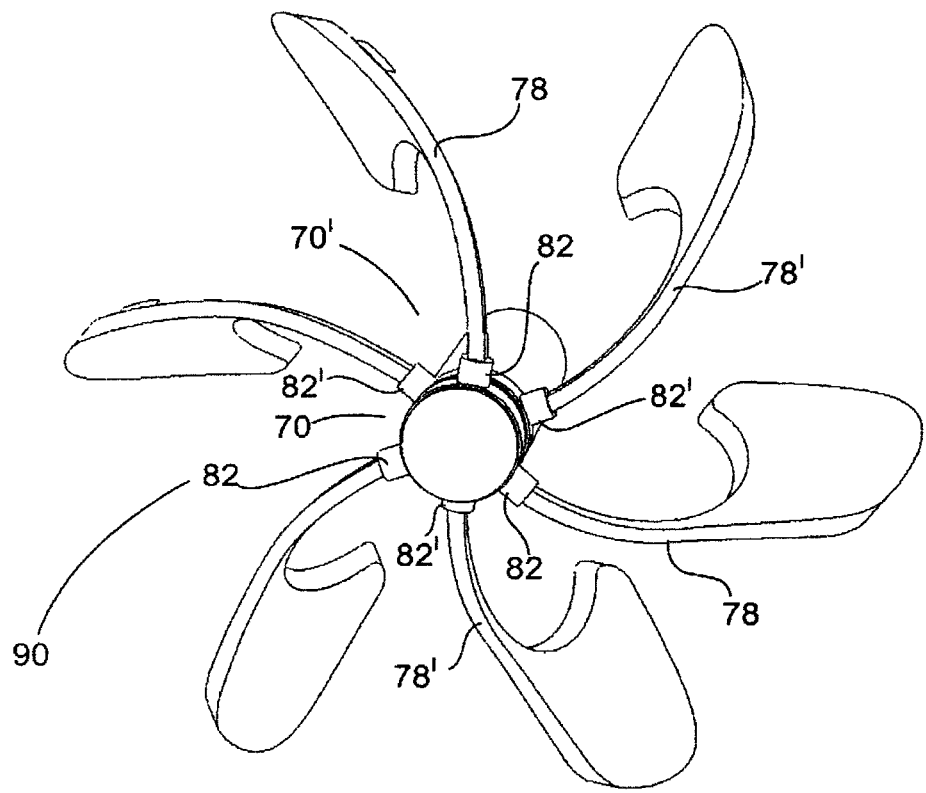
FIG. 8e shows a perspective view of a wheel assembly of FIG. 8a in which the stem members are rotatable.

Referring to FIG. 8e, a perspective view of wheel assembly 90 is illustrated in which the stem members 78 and 78' of the first and second wheels 70 and 70' are rotatably mounted on corresponding rotation modules 82 and 82' as described with reference to FIG. 7d.

In this case, first and second wheels 70 and 70' are in the non-aligned state or have an angular displacement of approximately 60 degrees with respect to each other. The stem members 78 and 78' are illustrated to be rotated into a "swimming" position in which the wheel assembly 90 forms a paddle wheel suitable for enabling a buoyant mobile platform to traverse water ways.

In operation, the rotation modules 82 and 82' rotates the corresponding stem members 78 and 78' of the first and second wheels 70 and 70' around the axis of rotation 84 and 84' (not shown, but as seen in FIGS. 7d to 7f). Although this rotational position of the stem members 78 and 78' is useful for traversing water ways etc., the ability to rotate the stem members 78 and 78' can also be particularly useful when a wheel lobe 76 or 76' of one of the wheels 70 or 70' becomes snagged, for example in a crack, hollow, or crevice. Instead of wasting energy by increasing power to the motor to force the entrapped wheel 70 or 70' out of the crevice (i.e. rotating the wheel 70 or 70' around the common axis 74(74')), the affected stem member 78 or 78' could be rotated providing an additional degree of freedom necessary for assisting the wheel assembly 90 in getting unsnagged.

FIGS. 9a, 9b, 9c and 9d illustrate perspective views of a mobile platform 110 (or robot vehicle) with four wheel assemblies 90 as already described with reference to FIGS. 7a to 8e (reference is made to the numbering of these figures where necessary). The wheel assemblies 90 are coupled to a chassis 112. These wheel assemblies 90 provide the mobile platform 110 with a range of terrain traversing capabilities where each wheel assembly 90 can be reconfigured (or transmuted) by axial rotation about the central axis 74 of each wheel assembly 90. This allows the mobile platform to move efficiently from smooth to rough terrain of extremely varied topography.

Figure 9A:
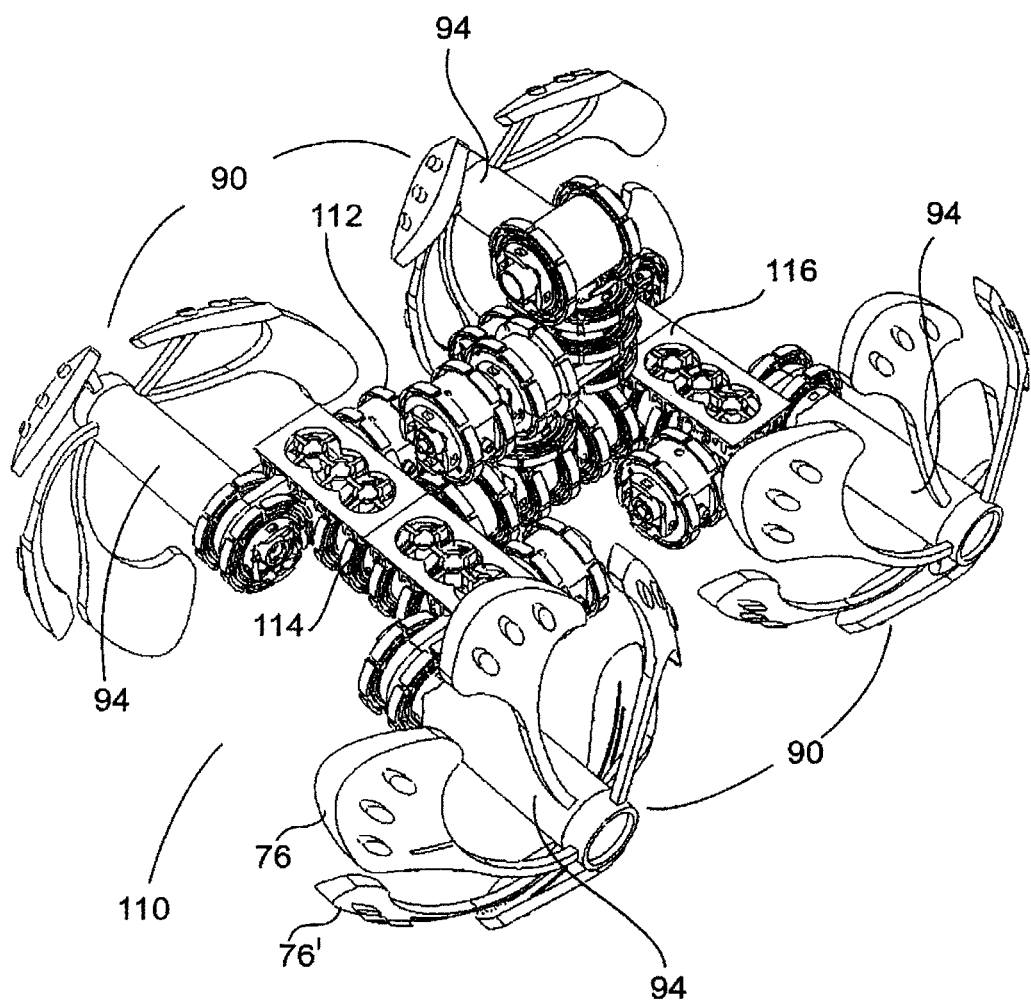
FIGS. 9a, 9b and 9c shows a diagram of a mobile platform including the wheel assembly of FIGS. 8a to 8d in non-aligned, semi-aligned, and aligned configurations, respectively.
Figure 9B:
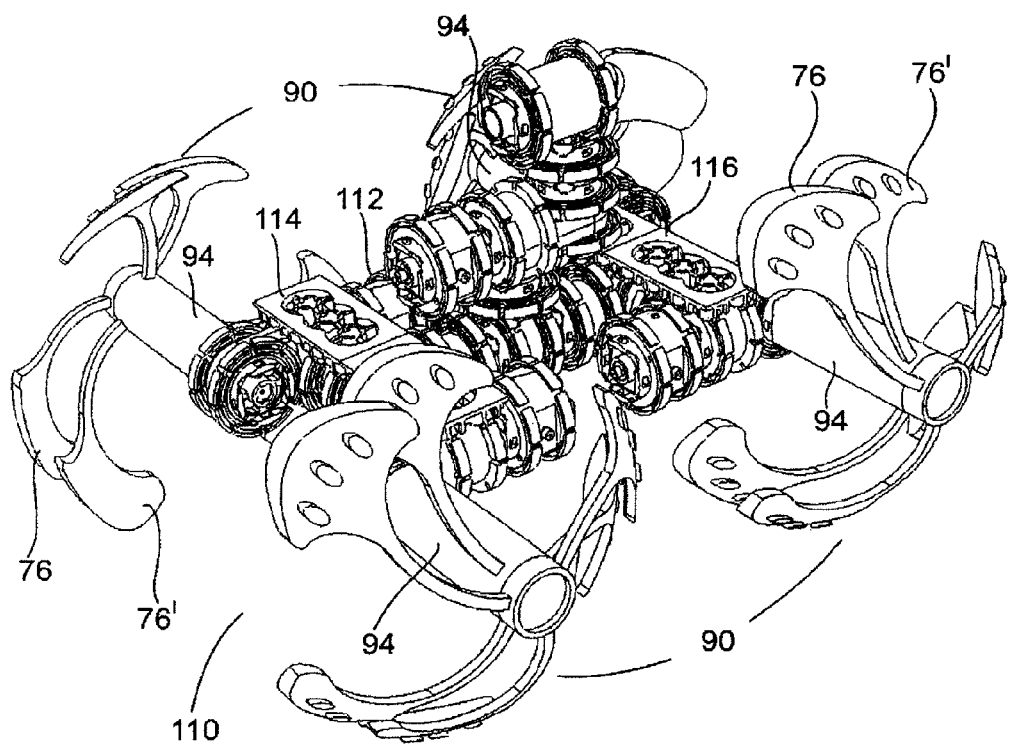
Figure 9C:
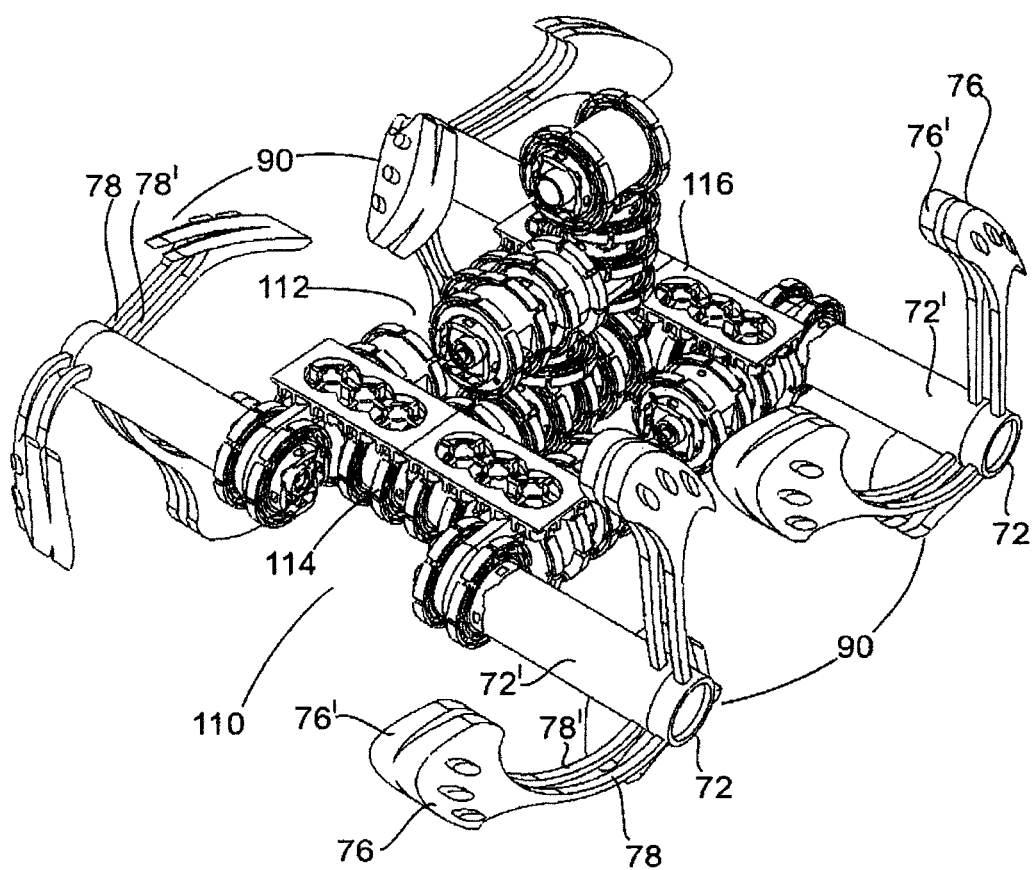
Figure 9D:
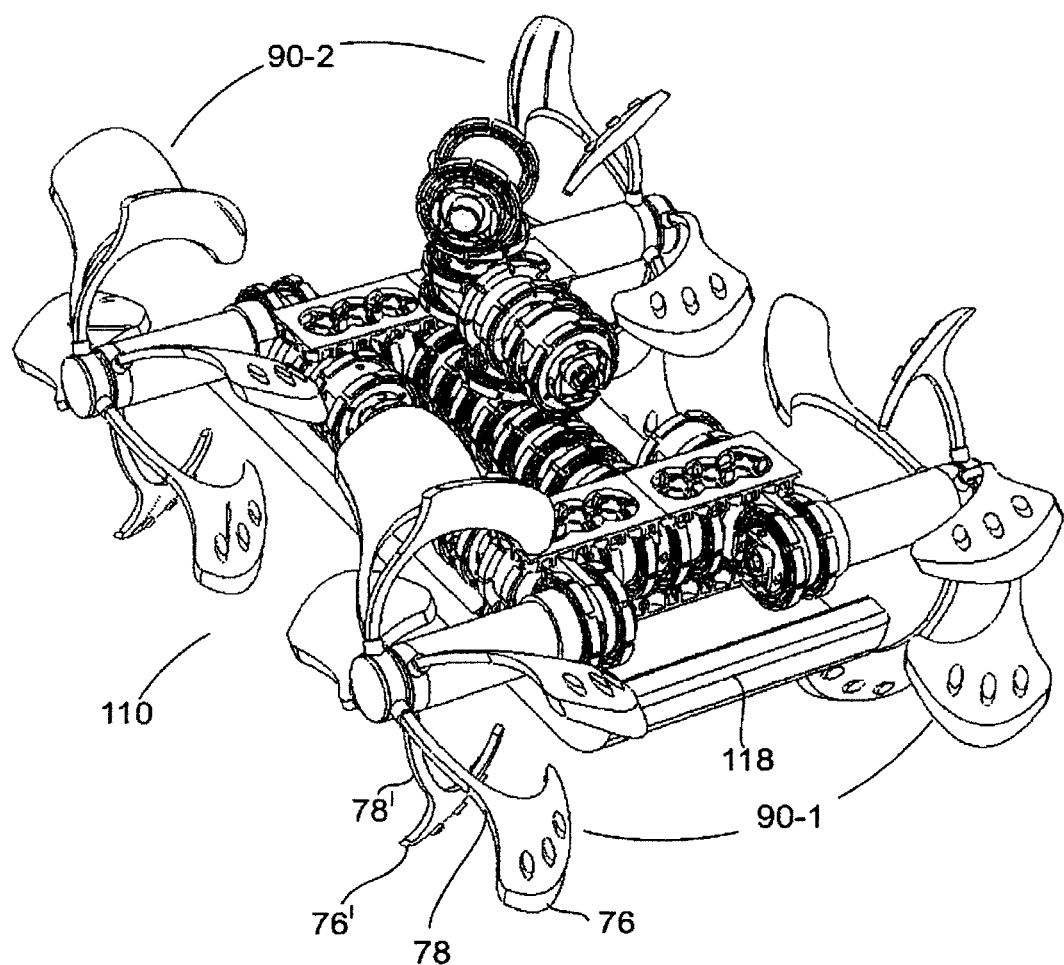
FIG. 9d shows a perspective view of the mobile platform of FIGS. 9a to 9c with the wheel assembly of FIG. 8e configured in a paddle wheel form.

In FIG. 9a, the wheel assemblies 90 of the mobile platform 110 are configured in the non-aligned state to assist the mobile platform 110 in traversing smooth terrain. In FIG. 9b, the wheel assemblies 90 of the mobile platform 110 are configured in the semi-aligned state to assist the mobile platform 110 to traverse rough terrain, while having a large footprint for soft, grainy or absorbent terrain. In FIG. 9c, the wheel assemblies of the mobile platform 110 are configured in the aligned state to assist the mobile platform 110 to traverse rough terrain and climb obstacles. In FIG. 9d, the wheel assemblies 90 of the mobile platform 110 are configured in the non-aligned state in which the stem members 78 and 78' have been rotated such that the wheel assemblies 90 each form a paddle wheel for propelling the mobile platform 110 (with a buoyancy aid) through bodies of water such as water ways, or lakes, etc.

Referring to FIG. 9a, the mobile platform 110 includes a chassis 112 having a front section 114 and a rear section 116. The front and rear sections 114 and 116 are each coupled on opposite sides to two wheel assemblies 90. Each wheel assembly 90 is attached to an axle 94 driven by a motorised module (not shown). Each wheel assembly 90 includes a multiple arcuate stem and petal-like extensions, which include two three stem-lobed wheels 70 and 70' as have been described with reference to FIGS. 7a to 8e. The wheel assemblies 90 are adjustably deployed to provide the mobile platform 110 with a range of terrain traversing capabilities. As has already been described, the wheel assemblies 70 have a range of configurations, ranging from a rotational wheel-like motion or scrambling action to a wheel-like loping motion or rotating tri-legged loping and climbing action.

The mobile platform 110 of FIGS. 9a, 9b, 9c and 9d is illustrated to be made from a modular construction system, which is the subject of the pending application PCT/FR2009/052352 or WO 2008/093028 A1 and assigned to the proprietor of the current application and incorporated herein by reference. The mobile platform chassis 112 can be constructed from the modular construction system which includes many units such as rotatable connector joints and/or articulations, some of which have been motorised by including, for example, an electric motor within the hollow core of a joint or articulation and being positioned to be coaxial with the axis of the connector joint. Although the mobile platform chassis 112 is illustrated as being made from the units of the modular construction system, it is to be appreciated that the mobile platform chassis 112 can be constructed in any other way.

In FIG. 9a, the wheel assemblies 90 are deployed in a six-lobe setting where the wheel lobes 76 and 76' of each wheel 70 and 70', respectively, are non-aligned and/or do not overlap. This allows the mobile platform 110 to advance rapidly on gently uneven and smooth surfaces. In particular, on hard smooth terrain, the mobile platform's footprint is reduced further reducing friction and energy consumption.

In FIG. 9b, the wheel assemblies 90 are deployed in a semi-triple lobe climbing mode or setting in which each of the wheel lobes 76 and 76' of each wheel 70 and 70', respectively, only partially overlap or are in the semi-aligned state. In particular, the mobile platform's footprint in this setting is increased for use over rough and soft terrain and for climbing obstacles, while at the same time still providing a smooth wheel-like motion over undulating terrain.

In FIG. 9c, the wheel assemblies 90 are deployed in a triple lobe extreme climbing mode or setting in which each of the wheel lobes 76 and 76' each wheel 70 and 70', respectively, substantially overlap or are in the aligned state. In particular, the mobile platform's footprint in the triple lobe setting increases for use over soft terrain. As well, the deep intervals between the three aligned wheel lobes 76 and 76' allow the most prominent portions of obstacles such as rocks or scattered debris to penetrate as far as the hubs 72 and 72'. This arrangement increases the climbing capability of the mobile platform, which can be measured in terms of the proportion of the multi-lobed wheel diameter to obstacle height. With the stem members 78 and 78' of corresponding wheel lobes 76 and 76' substantially aligned or fully overlapping, the paired stem members 78 and 78' share the load of the mobile platform 110 as it climbs or clambers over obstacles or rough terrain. The stem members 78 and 78' can be as leverage to lift the mobile platform 110 over obstacles or up stairs. In this configuration, the mobile platform 110 can traverse obstacles close to or equalling the exterior diameter of the wheel assembly 90. The aligned wheel lobes 76 and 76' also provide a "double gripper" effect providing enhanced purchase for rough or absorbent terrain.

In FIG. 9d, the mobile platform 110 includes a buoyancy aid 118 (or hull etc) that provides the necessary buoyancy to enable the mobile platform 110 to traverse bodies of water. The wheel assemblies 90 are deployed in a six-lobe setting where the wheel lobes 76 and 76' of each wheel 70 and 70', respectively, are non-aligned and/or do not overlap. In addition the stem members 78 and 78' are rotationally deployed such that the wheel assemblies 90 and 90' form paddle wheels. This allows the mobile platform 110 to be propelled through water.

In operation, the mobile platform 110 may encounter a body of water, e.g. a lake or water way, that is too deep for it to traverse when the wheel assemblies 90 are deployed in the terrain traversing configuration as described with respect to FIGS. 9a to 9c. With the buoyancy aid 118, the mobile platform 110 will be able to float in the body of water. As it enters the water way or lake the stem members 78 and 78' and wheel assemblies 90 are re-configured to allow the wheel assemblies 90 to form a paddle wheel, by rotating the stem members 78 and 78' around the axis of rotation 84 (and if necessary to rotate the first and second wheels 70 and 70' around the common axis 74). The mobile platform 110 can then traverse the body of water without requiring external assistance or refitting.

As the mobile platform 110 enters the water, the stem members 78 and 78' may either rotate individually about their corresponding axes of rotation 84 or 84' when unloaded, or alternatively as the mobile platform 110 begins to become buoyant (i.e. to float) all the stem members 78 and 78' of each wheel assembly 90 may rotate when appropriate simultaneously. It is to be appreciated that the stem members 78 or 78' may individually rotate, or some or all of the stem members 78 and 78' may simultaneously rotate about their axes of rotation 84 and 84'.

As the mobile platform 110 propels itself through the water, the stem members 78 or 78' and corresponding wheel lobes 76 or 76' may be controlled to rotate in a stroke sequence similar to that of a freestyle swimmer, i.e. a stem member 78 or 78' rotates a wheel lobe 76 or 76' for an energy efficient entry into the water, then further rotates the wheel lobe 76 or 76' for an efficient power stroke, then further rotates the wheel lobe 76 or 76' for an efficient exit out of the water.

In addition, the mobile platform 110 may desirably be provided with the ability to detect the need to adapt its terrain traversing or locomotive capability to that of amphibious or aquatic locomotive capability e.g. as the mobile platform 110 encounters water bodies deep enough for it to float. The mobile platform 110 may detect the need to adapt by using, among other things, image analysis, haptic sensing of perpendicular pressure and transversal shear stress, global positioning satellite location detection, electronic maps, or a combination of these and further sensor data. Upon detecting the need to adapt its locomotion in such a manner, the mobile platform 110 may advance into the water (or absorbent medium) such that the foremost wheels assemblies 90-1 are re-configured once they cease to make contact with a hard or resilient surface, e.g. in a lake this is the lake bed. The rearmost wheels 90-2 will continue to drive the mobile platform forward, whilst the foremost wheels 90-1 have oriented their stem members 78 and 78' into a paddle wheel form and will obtain traction through the water by "paddling". Once the rearmost wheel assemblies 90-2 cease to make contact with the lake bed, these wheel assemblies 90-2 can also be re-configured into a paddle wheel form. The mobile platform 110 can then propel itself through the water. Upon detecting the need to re-configure back into terrain traversing capability near the shoreline, or to regain a shoreline, the process of re-configuration can be performed in the reverse sequence as that used for entering the body of water.

Figure 10A:
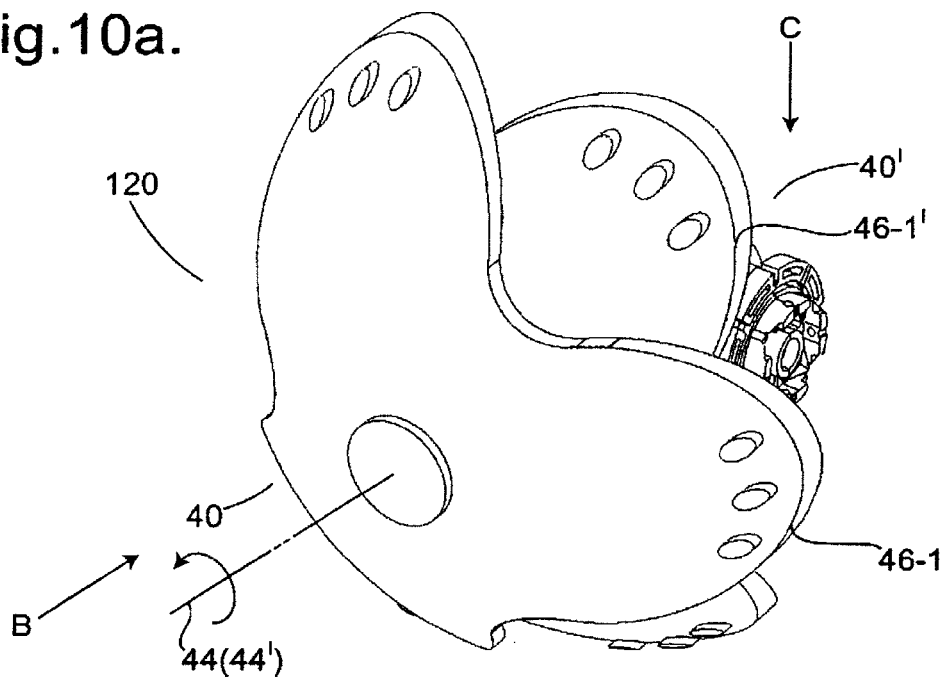
FIG. 10a shows a perspective view of a wheel assembly in an unaligned configuration.
Figure 10B:
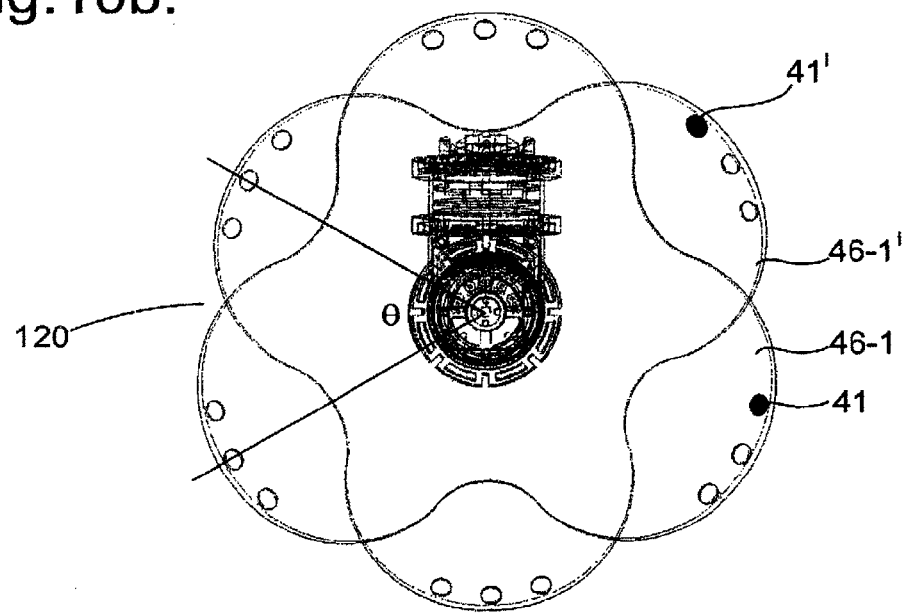
Figure 10C:
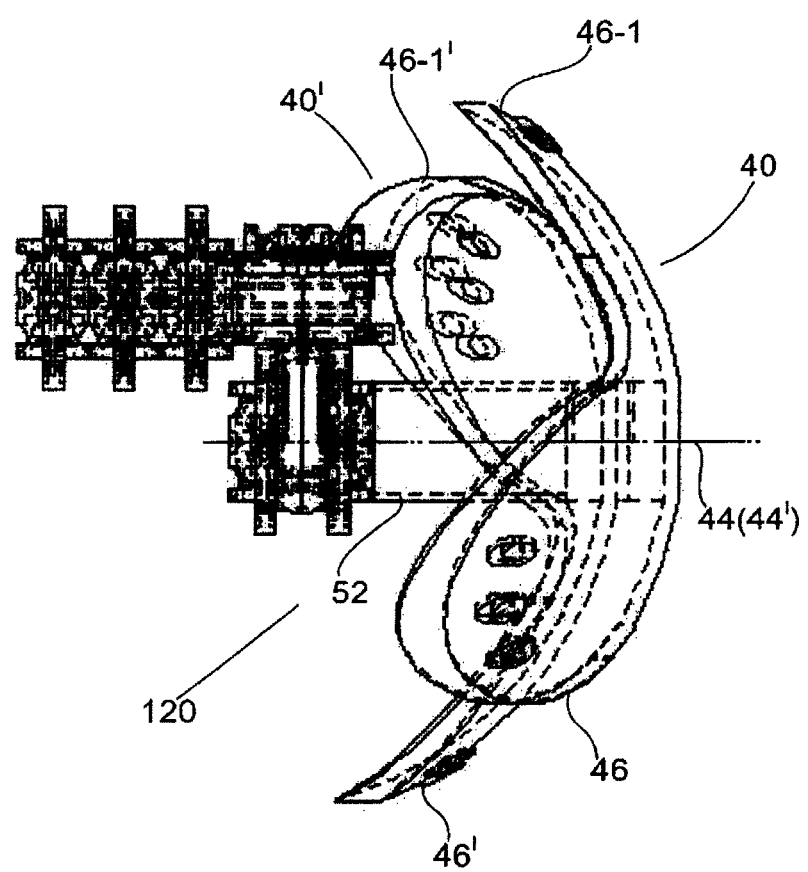

Referring to FIGS. 10a to 10c a perspective view, side elevation and a plan elevation of an alternative wheel assembly 120 is shown that includes a pair of wheels 40 and 40' substantially as described with respect to FIGS. 4a to 4c. In these figures, the wheel assembly 120 is configured for negotiating smooth terrain. The numbering of FIGS. 4a to 4c will be used for features that have already been described with duplicate features of different parts having the same numeral but differentiated with an apostrophe, e.g. a first wheel 40 and a second wheel 40'.

In FIGS. 10a to 10c, the wheel assembly 120 includes a first wheel 40 and a second wheel 40', in which the first wheel 40 is rotatably mounted to the second wheel 40' such that the central axes 44 and 44' of first wheel 40 and the second wheel 40', respectively, are coaxial and so define a common axis 44(44'). The wheel assembly 120 further includes means (not shown) or a control or rotation mechanism (not shown) for rotatably adjusting (rotatably adapting or configuring) the wheel assembly 120 into a desired position or angular displacement. In these examples, the wheel assembly 120 is configured from a non-aligned state through to an aligned state by rotating the first wheel 40 with respect to the second wheel 40' around the common axis 44(44').

Referring to FIGS. 10b and 10c, the wheel assembly 120 is shown to be configured in a non-aligned state, in which the wheel assembly 120 allows the mobile platform to efficiently traverse smooth terrain. In the non-aligned state, the first wheel 40 and the second wheel 40' are positioned such that corresponding wheel lobes 46-1 and 46-1' of the first wheel 10 are midway between the corresponding wheel lobes 16' of the second wheel 10'. That is, in this case in which each wheel 40 and 40' has three lobes, the angular displacement θ between the pair of wheel lobes 46-1 and 46-1', as shown in FIGS. 10a and 10b, is approximately 60 degrees. Alternatively, the wheels 10 and 10' can be considered to be non-aligned when a fictitious point 41 on the first wheel 10 and a corresponding fictitious point 41' on the second wheel 10' do not substantially overlap, as shown in FIG. 10b.

Figure 11A:
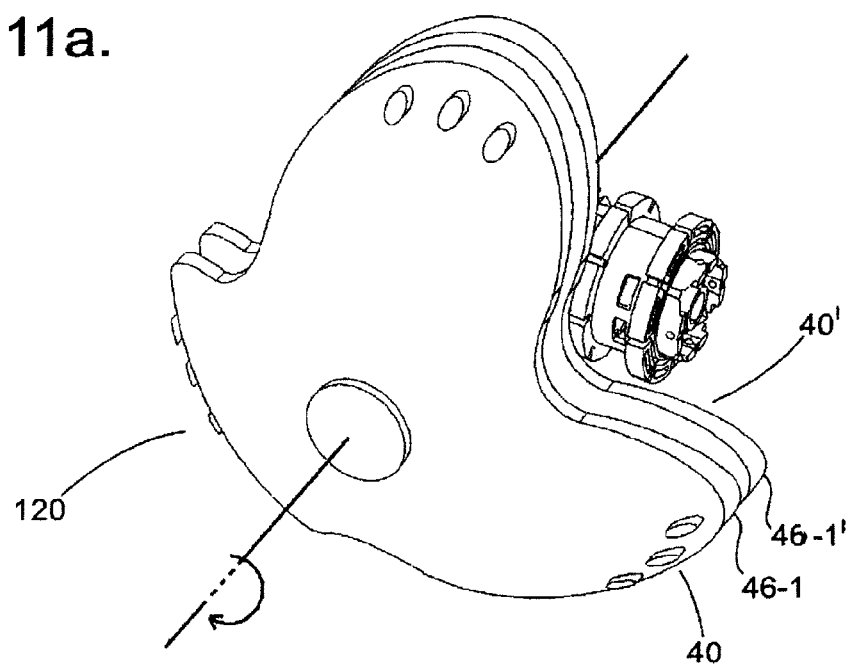
FIG. 11a shows a perspective view of an alternative wheel assembly in an aligned configuration.
Figure 11B:
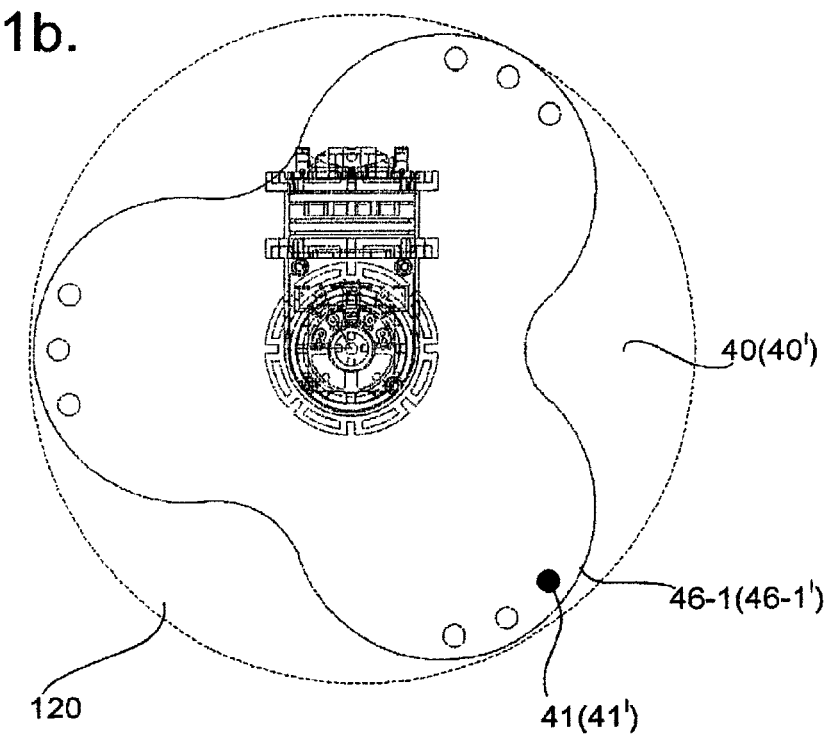
Figure 11C:
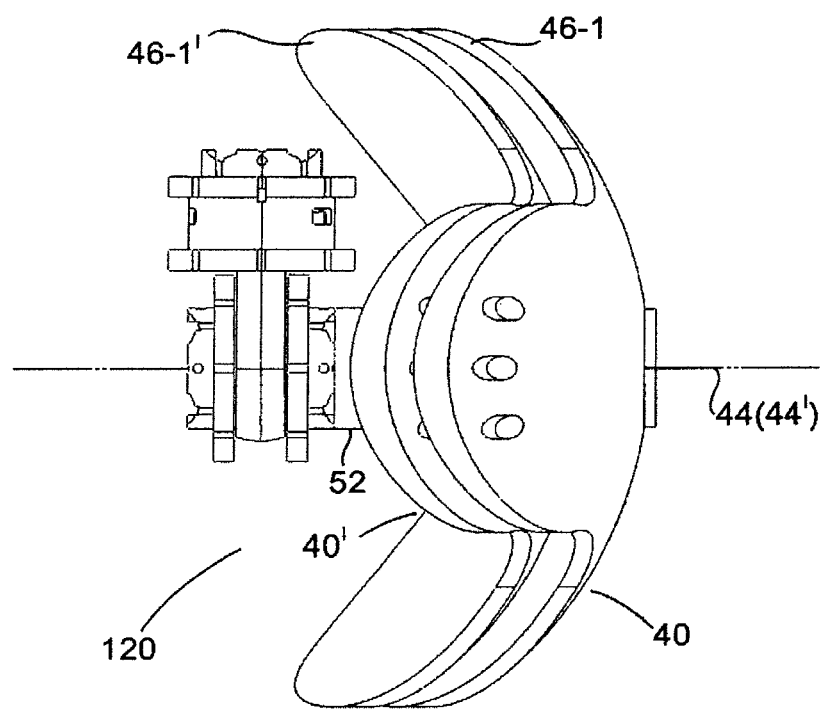

Referring to FIGS. 11a to 11c a perspective view, side elevation and a plan elevation of the wheel assembly 120 is shown in which the wheel assembly 120 is configured for negotiating rough terrain. In these figures, the wheel assembly 120 is rotatably adjusted so that it is configured in the aligned state, in which the wheel assembly 120 allows the mobile platform to efficiently traverse rough terrain or clamber/climb over obstacles. In the aligned state, the first wheel 40 and second wheel 40' are positioned such that a wheel lobe 46-1 of the first wheel 40 is substantially aligned with a corresponding wheel lobe 46-1' of the second wheel 40', as shown in FIGS. 11a and 11b. Alternatively, the wheels 40 and 40' can be considered to be aligned when the fictitious point 41 on the first wheel 40 and the corresponding fictitious point 41' on the second wheel 40' do substantially overlap, as shown in FIG. 11b.

It is to be appreciated that the wheels 40 and 40' or wheel lobes 46-1 and 46-1' of the wheel assembly 120 can be rotatably adjusted or configured into any other desired angular displacement θ (or position) within 0 to 360 degrees (or 0 to ±180 degrees).

In operation, the wheel assembly 120 is coupled to a mobile platform (not shown) to allow it to traverse smooth and rough terrain depending on the configuration of the first wheel 40 with respect to the second wheel 40'. The desired position (or angular displacement) of the first wheel 40 with respect to the second wheel 40' is controlled either by hand or by a control or rotation mechanism (not shown) that enables the wheels 40 and 40' to rotate with respect to each other to the desired position, e.g. from an aligned state through to a non-aligned state and vice versa. The control mechanism locks or maintains the relative positions of wheels 40 and 40' once the angular displacement between wheels 40 and 40' is in the desired position. This ensures that the wheel assembly 120 can be driven or turns freely while the positions of the first and second wheels 40 and 40' are maintained in the desired position (or state).

An example of a reconfiguration or control mechanism is shown in FIG. 8d, which would also be suitable for rotating and/or locking the first wheel 40 with respect to the second wheel 40' in the desired position. For example, from the aligned state to the non-aligned state or partially aligned state and vice versa. The control mechanism can be within axle 52 of the wheel assembly 120. The control mechanism may include an actuator coupled to two coaxial shafts (not shown), where each shaft is coupled to one of the wheels 40 and 40'. The actuator enables the coaxial shafts rotate with respect to the other such that the first wheel 40 rotates with respect to the second wheel 40' from an aligned state to a non-aligned state and vice versa.

It is to be appreciated that the mechanisms for rotating and/or locking the first wheel 40 with respect to the second wheel 40' can include, for example, actuators or hydraulic actuators, servo motors, gears, screw-threads, threaded shafts, solenoid devices, and/or more than two coaxial shafts. For example, the rotation or control mechanism may include the actuator drive and small motor module arrangement as described in relation to the wheel assembly 120 with reference to FIGS. 8a to 8d.

Figure 12:
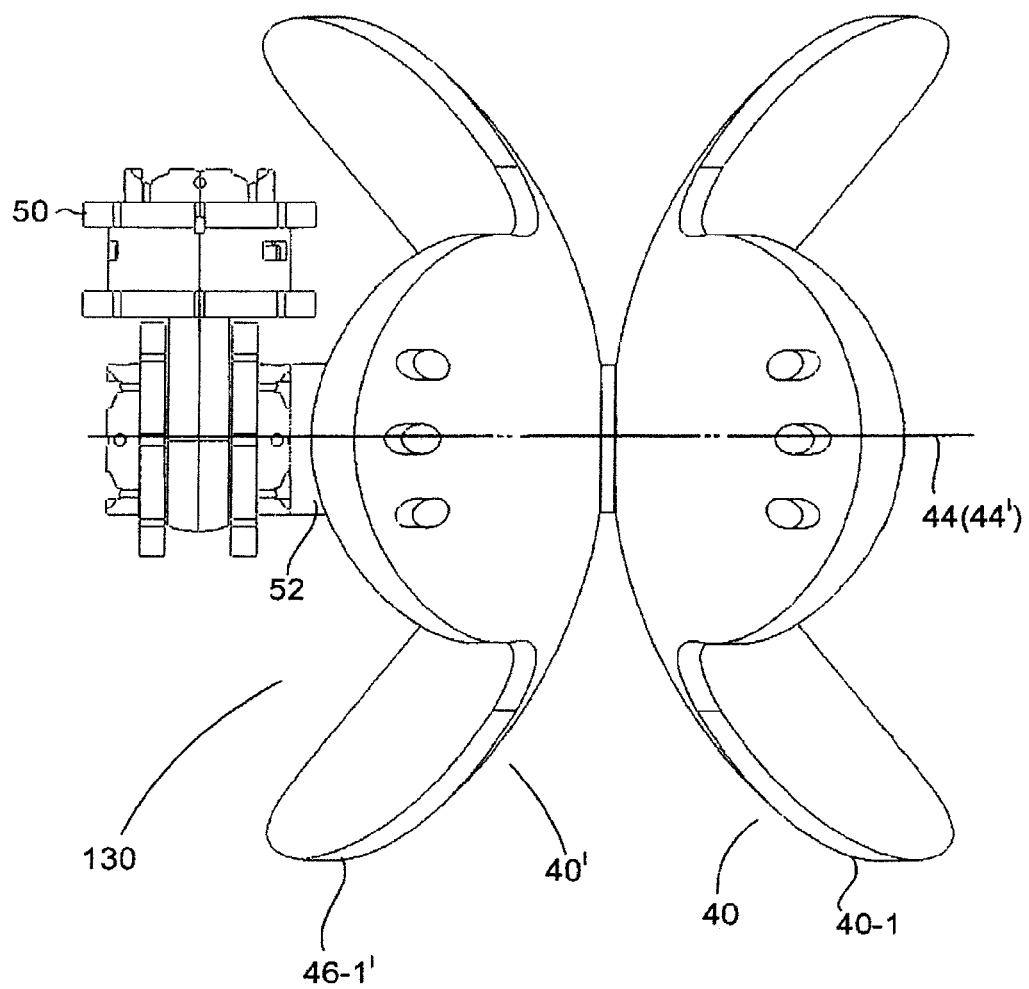
FIG. 12 shows a plan elevation of a modification to the wheel assembly of FIGS. 11a to 11c in an aligned configuration illustrating an enhanced footprint.

Referring to FIG. 12, a plan view of an alternative wheel assembly 130 is shown that includes an opposing pair of wheels 40 and 40', which have been described with reference to FIGS. 4a to 4c. The convex surfaces of the wheels 40 and 40' face each other. In these figures, the wheel assembly 130 is configured for negotiating rough terrain because the wheels 40 and 40' are in an aligned state or position.

It can be seen that the wheel assembly 130 includes a first wheel 40 and a second wheel 40', in which the first wheel 40 is rotatably mounted to the second wheel 40' such that the rotation axes 44 and 44' of first wheel 40 and the second wheel 40' are common. The wheels 40 and 40' are rotatably mounted such that the convex curved surface of each wheel 40 and 40' face each other, i.e. the wheels 40 and 40' oppose each other as compared with the configuration of wheel assembly 120 of FIGS. 10a to 11c. The wheel assembly 130 further includes means (not shown) or a mechanism (not shown) for rotatably adjusting or adapting the wheel assembly 130 to a desired state or configuration. For example, from a non-aligned state through to an aligned state. The mechanism may be arranged based on the control mechanism as has been described with reference to FIGS. 8a to 8d.

In operation, the wheel assembly 130 is coupled to a chassis portion 50 of a mobile platform (not shown) with an axle 52 and allows the mobile platform to traverse smooth and rough terrain depending on the configuration of the first wheel 40 with respect to the second wheel 40'. When the first wheel 40 and second wheel 40' are in an aligned state, i.e. on a side elevation the wheel lobes 46-1 and 46-1' substantially overlap each other, the mobile platform is able to traverse rough terrain. The advantage of the opposing wheel configuration is that it provides a larger footprint providing added grip, e.g. the larger footprint of the wheel assembly 130 decreases the likelihood of the mobile platform becoming immobilised when traversing soft, grainy, or absorbent terrain. In the non-aligned state, i.e. when viewed on a side elevation the wheel lobes 46 of the first wheel 40 are midway between successive lobes 46' of the second wheel 40', the wheel assembly 130 still provides a wheel-like scrambling motion or even a walking-type of motion.

Although the above-mentioned embodiments of wheel assemblies 30, 90, 120, and 130 of FIGS. 2a to 3c, 8a to 9d, 10a to 11c, and 12, respectively have been described with reference to wheels 10, 40, and 70 of FIGS. 1a to 1c, 4a to 6b, 7a to 7h, it will be appreciated that the wheel assembly of the invention may incorporate as the first and/or second wheels any feature, configuration, or combination of these wheels as has already been described herein. In addition, although these wheel assemblies have been described as having a first and second wheel, it will be appreciated that the wheel assembly of the invention can include more than two wheels without departing from the scope of the invention.

Figure 13A:
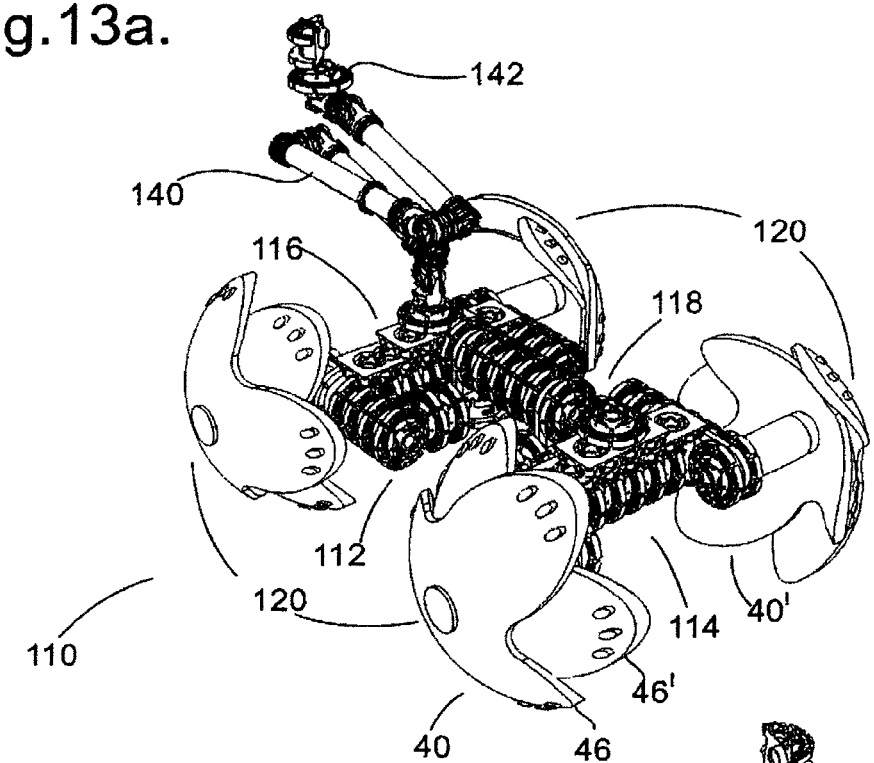
FIG. 13a shows a diagram of a mobile platform including the wheel assembly of FIGS. 10a to 10c configured for negotiating smooth terrain.
Figure 13B:
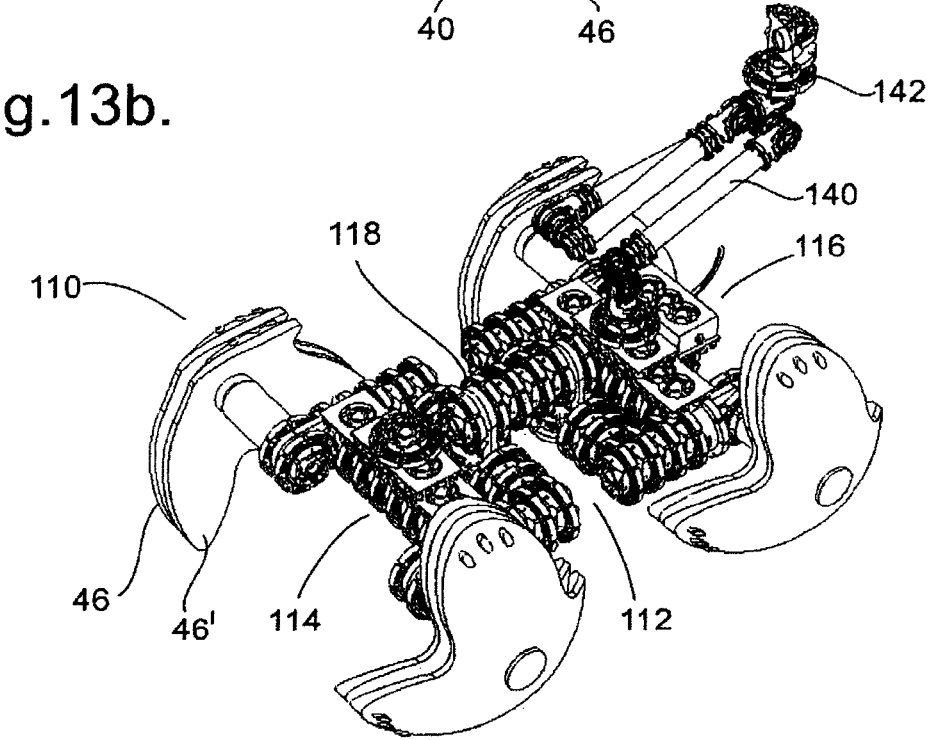
FIG. 13b shows a diagram of the mobile platform including the wheel assembly of FIGS. 10a to 10c configured for negotiating rough terrain.

FIGS. 13a and 13b illustrate perspective views of the mobile platform 110 (or robot vehicle) coupled to four wheel assemblies 120 as described with reference to FIGS. 10a to 11c (reference is made to the numbering of these figures where necessary). The wheel assemblies 120 are coupled to the chassis 112. These wheel assemblies allow the mobile platform 110 to move across smooth and rough terrain of extremely varied topography. In FIG. 13a, the wheel assemblies 120 of the mobile platform 110 are configured in a non-aligned state to assist the mobile platform 110 to traverse smooth terrain. In FIG. 13b, the wheel assemblies 120 of the mobile platform 110 are configured in an aligned state to assist the mobile platform 110 to traverse rough terrain.

The mobile platform 110 includes a chassis 112 having a front section 114 and a rear section 116 coupled to a free-moving or motorised central axial pivot 118, where the rear section 116 includes a mechanical articulated arm 140 with a module 142 for securing grappling hooks, cameras or sensors and the like. The front and rear sections 114 and 116 are each coupled on opposite sides to two wheel assemblies 120. Each wheel assembly 120 is attached to an axle 52 driven by a motorised module (not shown).

In operation, the central axial pivot 118 of the mobile platform 110 allows the front and rear sections 114 and 116 to rotate in relation to one another to assist the climbing or scrambling movement of the mobile platform 110. In this embodiment of the mobile platform 110, each wheel assembly 120 includes a part-spherical, three-lobed double disk like structure, with two three lobed wheels 40 and 40' as described above with reference to FIGS. 4a to 4c and 10a to 11c. The wheel assemblies 120 are adjustably deployed to allow the mobile platform 110 to move across rough terrain of extremely varied topography.

The wheel assemblies have a range of configurations, ranging from a rotational wheel-like motion or scrambling action to a wheel-like loping motion or rotating tri-legged loping and climbing action. In the embodiment of FIG. 13a, the wheel assemblies 120 are deployed in a six-lobe setting where the wheel lobes 46 and 46' of each disk do not substantially overlap each other, i.e. the wheel lobes 46 and 46' of each wheel 40 and 40' in the wheel assembly 120 are non-aligned. This allows the mobile platform 110 to advance rapidly on gently uneven and smooth surfaces. In particular, on hard smooth terrain, the mobile platform's footprint is reduced further reducing friction and energy consumption.

When the wheel assemblies 120 are deployed in a triple lobe setting as shown in FIG. 13b, each of the wheel lobes 46 and 46' of each disk are substantially overlapping or in the aligned state, i.e. the wheel lobes 46 and 46' of each wheel 40 and 40' in the wheel assembly 120 are aligned. In particular, the mobile platform's footprint in the triple lobe setting increases for use over soft terrain. In rough terrain, hard or irregular objects can slide against the continuous exterior curvature of each of the three wheel lobes 46 and 46' allowing the mobile platform 110 to rise and fall successively over irregular terrain and to avoid snagging. The triple lobe setting allows the mobile platform 110 to climb staircases and traverse rough ground such as woodland, rocks, and pavements.

The wheel assembly configuration or wheel lobe setting can be used to control the "gait" or movement of the mobile platform 110 by matching a gait sequence, operated by control software, with the terrain. The matching of gait to terrain may be obtained through the analysis of sensor data gathered on the mobile platform 110, or remotely gathered, triggering the implementation of given elements in a library of control software modules. Gait matching may also be obtained through self-adaptive algorithms using remote sensing and sensor data gathered on the mobile platform 110.

Figure 14:
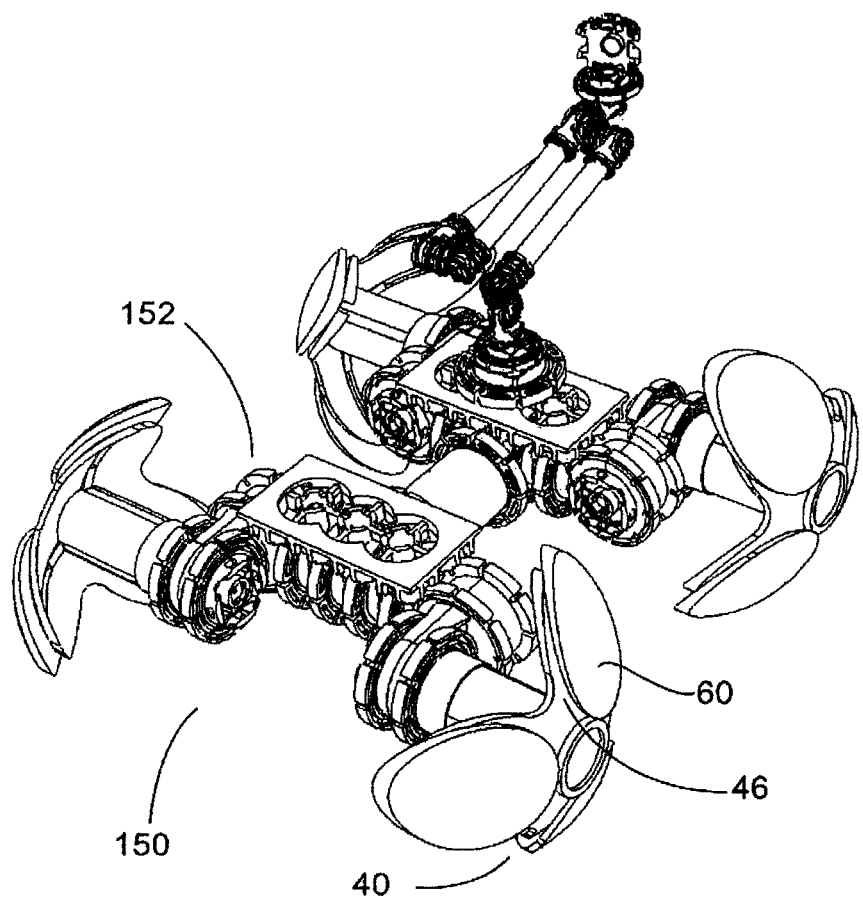
FIG. 14 shows a diagram of a mobile platform including the wheel assembly of FIGS. 5a to 5b configured in an unextended state for negotiating relatively rough terrain.

FIG. 14 illustrates a perspective view of a mobile platform 150 having a similar chassis 152 as the mobile platform 110 as previously described. In this case, the wheels 40 have extension lobes 60 as described with respect to FIGS. 5a and 5b. The wheels 40 with extension lobes 60 allow the mobile platform 150 to move across rough terrain of extremely varied topography. The wheels 40 of the mobile platform 150 are configured in an unextended state for assisting the mobile platform 150 to traverse mildly rough terrain.

In this embodiment of the mobile platform 150, each wheel 40 includes a part-spherical three lobed disk-like structure, with the extension lobes 60 shaped to fit the wheel lobes 46 as already described with reference to FIGS. 4a to 5b. This structure can be adjustably deployed to allow the mobile platform 150 to move across rough terrain of extremely varied topography.

The wheels 40 provide a wheel-like loping motion or rotating tri-legged loping motion and a range of configurations from an unextended state to an extended state for assisting the mobile platform 150 in traversing extremely rough terrain to climbing staircases. In the embodiment of FIG. 14, the wheels are deployed in an unextended setting in which the extension lobes 60 of each wheel 40 are unextended and substantially overlap the wheel lobes 46 of each wheel 40. This allows the mobile platform 150 to advance over mildly uneven or rough terrain.

When the wheels are deployed in an extended setting, each of the extension lobes 60 of each wheel 40 slidably extend radially outward following the contour of their respective wheel lobes 46. This substantially increases the length of the wheel lobes 46 allowing the mobile platform 150 to traverse extremely rough terrain, or climb stairs, or traverse large obstacles that it could not do when in the wheels 40 were in the unextended state. In rough terrain, hard or irregular objects can slide against the continuous exterior curvature of each of the three wheel lobes 46 and the extension lobes 60, allowing the mobile platform 150 to rise and fall successively over irregular terrain and to avoid snagging. The extended lobe setting allows the mobile platform 150 to climb steeper staircases and traverse rougher ground such as woodland and mountainous terrain.

Figure 15A:
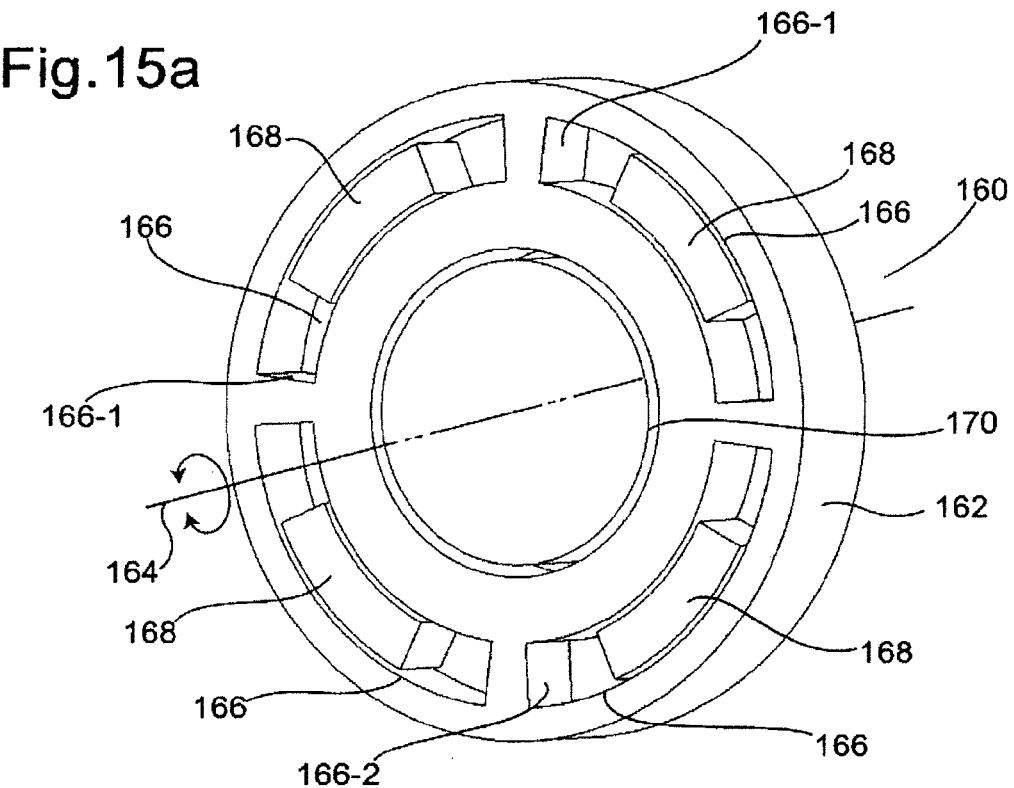
FIG. 15a shows a perspective view of a revolute compliance mechanism for providing mechanical shock absorbing capabilities to a wheel or wheel assembly.
Figure 15B:
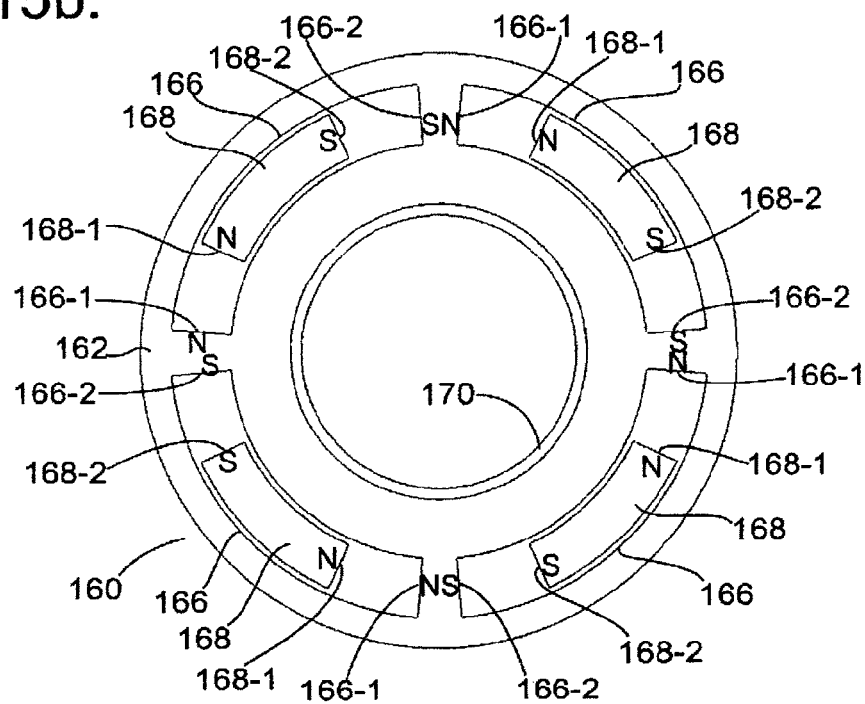
Figure 15C:
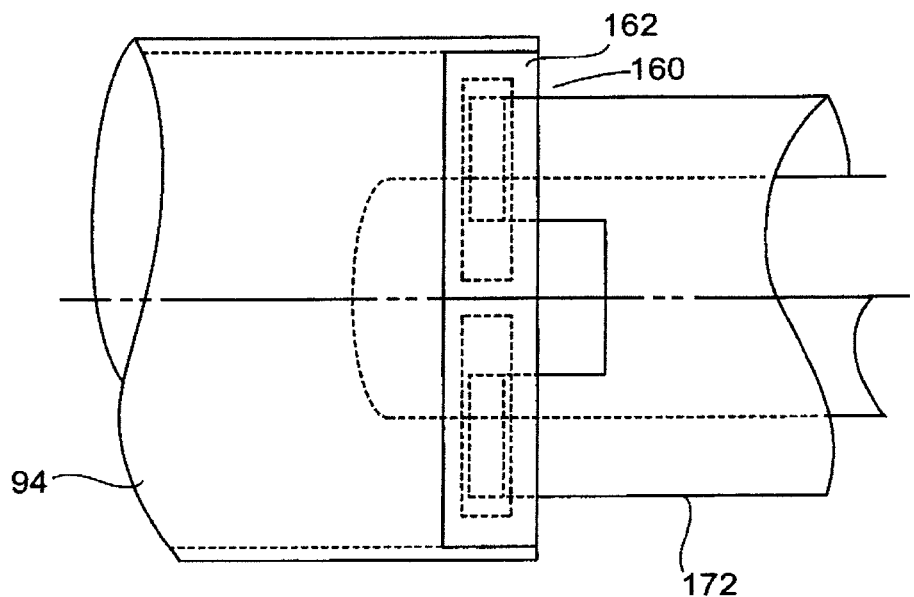
Figure 15D:
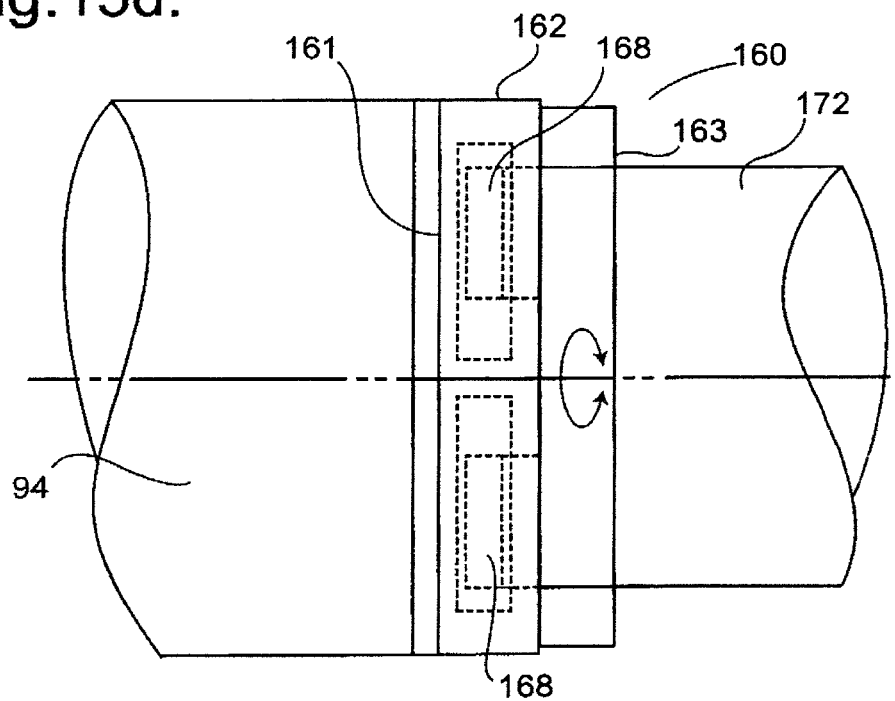
FIG. 15d shows a plan elevation of the revolute compliance mechanism, on arrow C of FIG. 15a, including a different coupling arrangement.
Figure 15E:
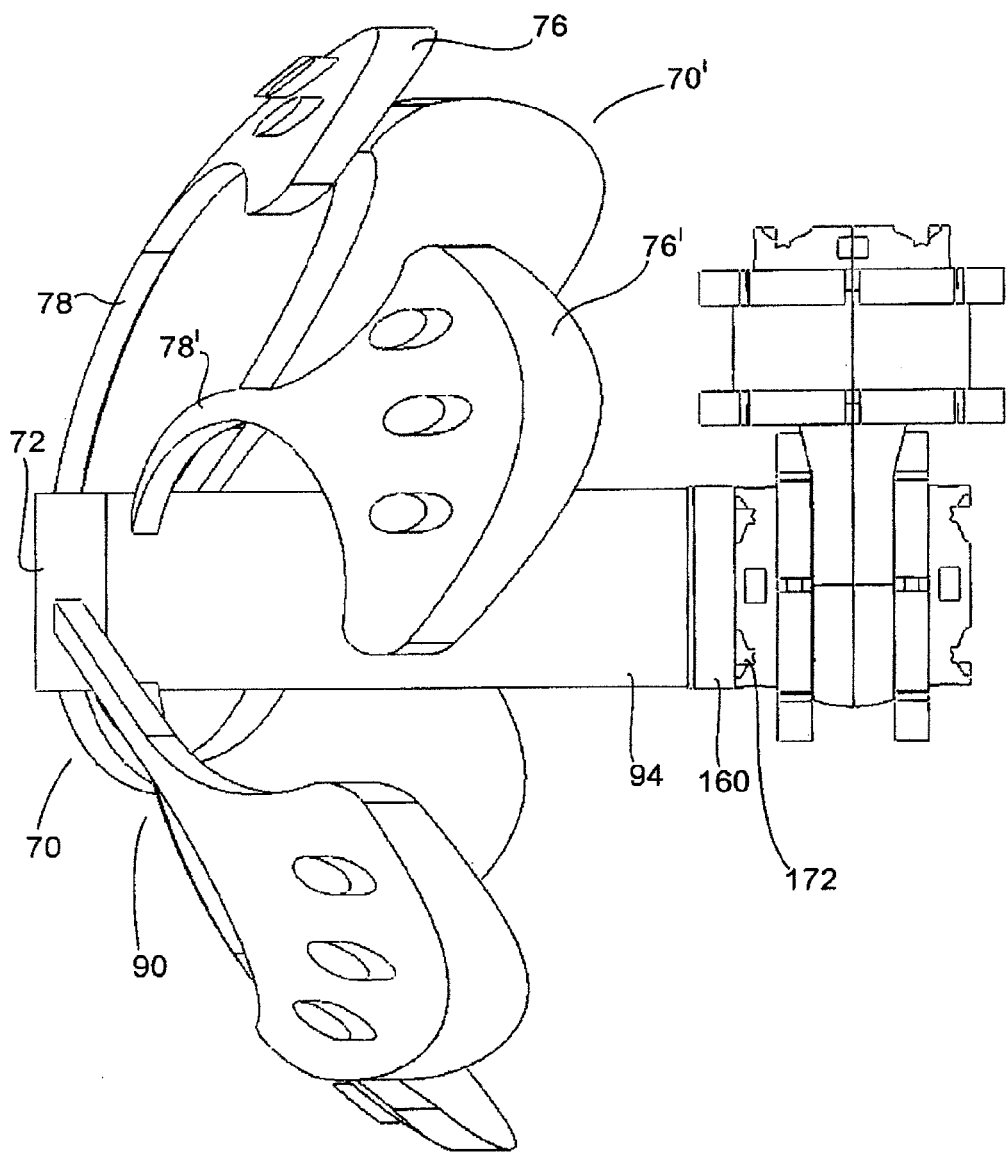
FIG. 15e shows a plan elevation of the wheel assembly on arrow C of FIG. 8a coupled to the revolute compliance mechanism of FIGS. 15a to 15d.

FIGS. 15a to 15e illustrates a perspective view, a plan view, a side elevation of a revolute compliance mechanism (RCM) 160 for use in or coupled to the wheels and wheel assemblies as described herein (e.g. wheels 10 and 40 and/or wheel assemblies 90 and 120). FIG. 15e illustrates a plan elevation of the RCM 160 coupled to the axle 94 of the wheel assembly 90 on arrow C of FIG. 8a, where the wheel assembly 90 has been described with reference to FIGS. 8a to 8e and the numbering of these figures will be used where applicable. It is to be appreciated that the RCM 160 can equally be coupled to the other wheels and/or wheel assemblies and combinations thereof as described herein.

The RCM 160 includes a cylindrical annular housing 162 rotatable about a central axis 164, the annular housing 162 includes four annular sections 166 cut out of the annular housing 162, in which the four annular sections 166 are equally spaced around the central axis 164 of the annular housing 162, and within each annular section 166 is a compliance member 168 that is shaped to be movable within the corresponding annular section 166. The annular housing 162 includes a bearing 170 coaxial with the annular housing 162.

Each annular section 166 and the corresponding compliance member 168 include a biasing mechanism (or biasing means as described below) that biases the compliance member 168 from the end faces of the annular section 166.

Each annular section 166 includes a first end face 166-1 and a second end face 166-2 each positioned at opposing ends of the arc describing the annular section 166. The first and second end faces 166-1 and 166-2 of the annular sections 166 comprise a magnetic material such that the first end face 166-1 of one annular section 166 forms a magnet with the second end face 166-2 of an adjacent annular section 166. In FIG. 15*b* the first end face 166-1 of each annular section is defined to be a north pole (N) and the second end face 166-2 of each annular section is defined to be a south pole (S).

Each of the compliance members 168 include a first end 168-1 and a second end 168-2, and comprise a magnetic material such that each compliance member 168 forms a magnet having a north pole (N) at the first end 168-1 and a south pole (S) at the second end 168-2 as illustrated in FIG. 15*b*. The magnetic repulsive forces of the first end faces 166-1 of the annular sections 166 and the adjacent first ends 168-1 of the compliance members 168 (and of the second end faces 166-2 of the annular sections 166 and the adjacent second ends 168-2 of the compliance members 168) force each compliance member 168 to be substantially centred along the arc of its corresponding annular section 166. This centring will be denoted as the at-rest-position.

Referring to FIG. 15*c*, a plan elevation of the RCM 160 is shown coupled on one side to the axle 94 of the wheel assembly 90 and coupled on the other side to a drive shaft 172. In this embodiment, the annular housing 162 is coupled to the axle 94 of the wheel assembly 90 and the compliance members are coupled to the drive shaft 172. The RCM 160 may be coupled to the axle 94 and drive shaft by clipping, bonding, and/or secured in place with screws, bolts and such like. It is to be appreciated that the annular housing 162 could alternatively be coupled to the drive shaft 172 and the compliance members could be coupled to the axle 94 of the wheel assembly 90.

Referring to FIG. 15*d*, a plan elevation of the RCM 160 is illustrated and constructed in a different manner as the RCM 160 of FIG. 15*c*. The RCM 160 is shown to have a first side end 161 of the RCM 160 is coupled to the annular housing 162, and a second side end 163 of the RCM 160 rotatably coupled to the annular housing 162 on a bearing or other means of rotational coupling, in which the second side end 163 is directly coupled (or clipped etc) to the compliance members 168. The first side end 161 is coupled to the axle 94 and the second side end 163 is coupled to the drive shaft 172. This coupling may be achieved by using parts from the modular construction system as previously described with respect to the mobile platform 110, or by clipping, bonding, and/or securing in place the drive shaft 172 and axle 94 with screws, bolts and such like. It is to be appreciated that the first side end 161 and the second side end 163 could be coupled to the drive shaft 172 and axle 94, respectively.

The RCM 160 is a shock absorbing mechanism for further attenuating mechanical shocks transmitted to the wheel lobes 76 and 76', stem members 78 and 78', wheels 70 and 70', wheel assembly 90, and/or the mobile platform when the wheel lobes 76 and 76' and/or stem members 78 and 78' make contact with the terrain or other obstacles, etc.

The RCM 160 allows the wheel assembly 90 to rotate under load about its central axis (which is coaxial with the RCM) when driven by the drive shaft 172, but at the same time provides a degree of compliance (or shock absorption) between the drive shaft 172 and the rotating wheel assembly 90 as it rotates. This can be used to provide a form of revolute suspension to the wheel assembly 90.

In operation, as a distal portion of the wheel lobes 76 of the wheel assembly 90 contacts an obstacle or rough terrain, the RCM 160 allows the drive shaft 172 to advance in rotation, while the wheel lobe 76 (and wheel assembly 90) momentarily does not advance in rotation, or the drive shaft's 172 rotation advances with respect to the rotation of the wheel lobe 76 (and wheel assembly 90). In any event, assuming that the rotation of the drive shaft 172 is such the first ends 168-1 of the compliance members 168 are forced to rotate in the direction of the corresponding first end faces 166-1 of the annular sections 166, then the repulsive magnetic forces between the first end faces 166-1 of the annular sections 166 and the adjacent first ends 168-1 of the compliance members 168 provide a form of "cushioning" by the repulsive magnetic forces (or revolute suspension) that enables the drive shaft 172 to advance in rotation with respect to the rotation of the wheel assembly 90. Effectively the distance between the first end faces 166-1 and the first ends 168-1 will be reduced.

In other words, the wheel assembly 90 seemingly has a small degree of rotation contrary to the direction of rotation of the drive shaft 172. This small degree of rotation contrary to the direction of rotation provides a form of suspension that in effect reduces the wear and tear on the mechanical structure. In addition, it further reduces the energy required to drive the wheel and/or wheel assembly 90. A mobile platform (or robot) with wheel assemblies 90 fitted with RCMs 160 can optimise energy consumption and/or ground-covering capability by regulating the degree of compliance as the terrain changes.

The RCM 160 can be mounted on the main hub 72 of the wheel assembly 90, or alternatively on the axle 94 of the wheel 70 or wheel assembly 90, as seen in FIG. 15*e*. As the whole wheel assembly 90 rotates, when driven by the drive shaft 172 of a motor module or actuator drive, the wheel assembly 90 can "counter-rotate" to a degree as a load is applied to the wheel lobes 76, e.g. when a wheel lobe 76 contacts the ground or an obstacle. As the mobile platform traverses (or scrambles) over rocks, rubble, fallen branches etc., the wheels or wheel assemblies 90 will still rotate to drive the mobile platform forward, but there will be a degree of compliance built into this rotation so that the wheels and/or wheel assembly 90 can build torque to assist the mobile platform's scrambling.

When a wheel lobe 76 relinquishes traction, i.e. loses contact with the terrain, the whole wheel or wheel assembly 90 will generally revert to its at-rest position before the next wheel lobe 76 contacts the terrain or obstacle. The compliance process starts again as the succeeding wheel lobe 76 is set down and as torque builds.

A mobile platform fitted with wheels or wheel assemblies 90, each coupled to an RCM 160, can progress across a relatively smooth surface where a small degree of compliance or no compliance whatsoever is desirable. That is attenuation of mechanical shock is minimised when the degree of compliance is minimal (or small) or zero. On smooth terrain without obstacles etc., the degree of compliance in the wheel or wheel assembly should be minimal to allow maximum energy efficiency for transferring power from the drive shaft 172 to the wheel assembly 90.

In the event that the mobile platform detects and/or encounters large obstacles or rougher terrain, for example boulders or scattered debris, the degree of compliance can be augmented to increase and/or maximise the attenuation of mechanical shock and/or for building torque to provide added power for traversing rough terrain or obstacles, i.e. by allowing the drive shaft 172 to advance in rotation with respect with the rotation of the wheel assembly 90. Upon returning to a relatively smooth terrain the degree of compliance may revert to minimal or zero.

The regulation of the degree of compliance can be controlled by a system of sensors and control software that conditionally adjusts the compliance as the robot or mobile platform progresses over the terrain. Sensor inputs can include variant acceleration in the vertical and transversal planes, wheel slippage sensors, actuator current draw, vibration indices, and further sensor data, or combinations thereof.

The wheels or wheel assemblies 90 of the mobile platform can be further mounted on a compliant linkage element with the actuator drive, for example a resilient flexible plastic tube, honeycomb or further variant structural forms which desirably allow a momentary deflection of the wheel lobes 76 when obstacles are encountered, where such linkages revert to a primary at-rest position. Such compliance is transversal to the central axis of the actuator drive and wheel and/or wheel assembly 90 will advantageously minimise wear and tear or mechanical degradation of a robot or mobile platform when traversing large obstacles or rough terrain.

The RCM 160 can further include a clutch-plate mechanism that controls the degree of compliance or advance of rotation of the drive shaft 172 with respect to the rotation of the wheel assembly 90. Effectively, the degree of compliance can be controlled over the range of no slippage or no compliance (clutch plate is fully engaged), some slippage a small degree of compliance (clutch plate is partially engaged), maximum slippage or a larger degree of compliance (clutch plate not engaged). With the clutch-plate mechanism combined with the magnetic repulsion arrangement or other arrangements such as spring or biasing arrangements, the RCM 160 can provide a controllable degree of slippage/compliance to the mobile platform.

Alternatively, the degree of compliance may be controlled by rotating the magnetic repulsion or spring assembly to either increase or decrease the degree of compliance in a range going from no compliance to the maximum available around the annular housing 162 the RCM 160.

Although the revolute compliance mechanism 160 has been described to have four annular sections 166 equally spaced within annular housing 162, it is to be appreciated that one or more annular sections may be used to provide the necessary "cushioning" or revolute suspension.

It is to be appreciated that although the annular housing 162 and the compliance members 168 comprise a magnetic material to take advantage of magnetic repulsive forces, the RCM 160 can also include other mechanisms for controlling the degree of compliance such as a clutch-plate type mechanism, a spring arrangement or any other biasing mechanism, or electromagnetic repulsion, or even a magnetic or electromagnetic attraction type arrangements, or a combination of these principles.

FURTHER EXAMPLES

Example 1

A wheel assembly for a mobile platform, the wheel assembly including a first wheel and a second wheel, each wheel comprising a hub having a central axis of rotation, and at least two wheel lobes coupled to the hub, the wheel lobes extending radially from the hub and spaced around the central axis of the hub, where the first wheel is rotatably mounted to the second wheel and the central axes of rotation of the first and second wheels are coaxial and so define a common axis. The wheel assembly further includes a control mechanism for adapting the wheel assembly from a first state to a second state by rotating the first wheel with respect to the second wheel around the common axis, where the first state has the first and second wheels positioned such that a wheel lobe of the first wheel is substantially aligned with a corresponding wheel lobe of the second wheel, and the second state has the first and second wheels positioned such that a wheel lobe of the first wheel and a corresponding wheel lobe of the second wheel are substantially non-aligned.

Example 2

A wheel assembly based on example 1, further including wheel lobes each having a curved edge around a region of the lobe edge furthest away from the hub.

Example 3

A wheel assembly based on examples 1 or 2, where the wheel lobes each define a convex curved surface at one side of the wheel assembly.

Example 4

A wheel assembly based on example 3, where the convex surfaces of the wheel lobes of the first wheel lie substantially on a first common ellipsoidal surface, and the convex surfaces of the wheel lobes of the second wheel lie substantially on a second common ellipsoidal surface.

Example 5

A wheel assembly based on any of examples 1 to 5, further including a stem member mounted to each wheel lobe, wherein the stem member couples the wheel lobe to the hub.

Example 6

A wheel assembly based on example 5, where each stem member is narrower than the corresponding wheel lobe, when projected parallel to the common axis.

Example 7

A wheel assembly based on any of examples 5 or 6, where the stem member is rotatably mounted to the hub, and is rotatable about an axis of rotation that is non-parallel to the common axis.

Example 8

A wheel assembly based on any one of examples 5 to 7, where each stem member comprises a resilient material.

Example 9

A wheel assembly based on any of examples 1 to 8, where each of the wheel lobes comprises a movable extension lobe such that the extension lobe is movable radially from the hub.

Example 10

A wheel assembly based on example 9, further including an extension mechanism for configuring at least one of the wheel lobes from a first extended state to a second extended state.

Example 11

A wheel assembly based on any of examples 1 to 10, further including a revolute mechanism that is coaxially coupled to the hub, the revolute mechanism comprising an annular housing, one or more annular sections within the annular housing, and for each annular section a compliance member movably located therein, wherein the annular section and corresponding compliance member include a biasing mechanism that biases the compliance member away from the end faces of the annular section.

Example 12

A wheel assembly based on any of examples 1 to 11, where the first wheel includes wheel lobes having convex curved surfaces and the second wheel includes wheel lobes having convex curved surfaces, and where the convex curved surfaces of the first wheel substantially faces the direction of the corresponding convex curved surfaces of the second wheel.

Example 13

A wheel assembly based on any of examples 1 to 11, where the first wheel includes wheel lobes having convex curved surfaces and the second wheel includes wheel lobes having convex curved surfaces, and where the convex curved surface of the first wheel faces the convex curved surface of the second wheel.

Example 14

A wheel for a mobile platform, the wheel comprising a hub having a central axis of rotation, and at least two wheel lobes coupled to the hub, the wheel lobes extending radially from the hub and spaced around the central axis of the hub, wherein the wheel lobes each have a curved edge around a region of the wheel lobe edge furthest away from the hub.

Example 15

A wheel for a mobile platform, the wheel comprising a hub having a central axis of rotation, and at least two wheel lobes coupled to the hub, the wheel lobes extending radially from the hub and spaced around the central axis of the hub.

Example 16

A wheel based on examples 14 or 15, where the wheel lobes each define a convex curved surface.

Example 17

A wheel based on example 16, where the convex curved surfaces lie substantially on a common ellipsoidal surface.

Example 18

A wheel based on any of examples 14 to 17, further including a stem member mounted to each wheel lobe, where the stem member couples the wheel lobe to the hub.

Example 19

A wheel based on example 18, where each stem member is narrower than the corresponding wheel lobe, when projected parallel to the common axis.

Example 20

A wheel assembly based on any of examples 18 or 19, where the stem member is rotatably mounted to the hub, and is rotatable about an axis of rotation that is non-parallel to the common axis.

Example 21

A wheel based on any one of examples 18 to 20, where each stem member comprises a resilient material.

Example 22

A wheel based on any of examples 14 to 21, where each of the wheel lobes comprises a movable extension lobe such that the extension lobe is movable radially from the hub.

Example 23

A wheel based on example 22, further including an extension mechanism for configuring at least one of the wheel lobes from a first extended state to a second extended state.

Example 24

A wheel based on any of examples 14 to 23, further including a revolute mechanism that is coaxially coupled to the hub, the revolute mechanism comprising an annular housing, one or more annular sections within the annular housing, and for each annular section a compliance member movably located therein, wherein the annular section and corresponding compliance member include a biasing mechanism that biases the compliance member away from the end faces of the annular section.

Example 25

A mobile platform including a wheel assembly based on any one of the examples 1 to 13.

Example 26

A mobile platform including a wheel based on any of the examples 14 to 24.

Further Modifications or Embodiments

In addition to all of the above embodiments and examples, it will be appreciated that the mobile platform, or robot or any other vehicle using the wheel or wheel assembly, could be autonomous, semi-autonomous, or fully controlled by an operator. The mobile platform employing the wheel assembly or wheel could be fitted with sensors and a processing or a computing system for sensing and/or detecting the changing terrain in real-time allowing the wheels or wheel assembly to be deployed, adapted, or reconfigured according to the changing terrain.

Alternatively it will be appreciated that the mobile platform could be configured to carry a camera and/or other terrain detecting sensors such that a remote computer system or an operator (whom could be remotely controlling the mobile platform) can view and/or process the terrain, determine the terrain type, and provide the mobile platform with commands or instructions to reconfigure each of (or all of) the wheels and/or wheel assemblies according to the determined terrain.

In any event, adapting the wheels or wheel assemblies in accordance with the terrain type will optimise the terrain traversing capability and/or energy efficiency of the mobile platform.

Although the shape of each wheel lobe has been described having a symmetrical shape about its centre line or even a non-symmetrical shape, it will be appreciated that other lobe shapes (e.g. when viewed from the side elevation of the wheel) can be used, for example, the lobes could describe a clover-leaf shape, heart-shape, spoon-like, tear drop shape, "T"-like, or any other symmetrical shape providing at least one of the above-mentioned advantages. Alternatively the lobes may have a non-symmetrical shape e.g. a lobe may have a spiral-like appearance, a non-symmetrical leaf-like shape, a "J" or hockey-stick type shape, or any other non-symmetrical shape that provides at least one of the above-mentioned advantages.

Although the wheel lobes in the above described embodiments are described to be attached to the hub or the wheels or stem members, it is to be appreciated that the wheel lobes may be coupled to the hub or stem members by a detachable mounting, allowing the wheel lobe to be replaced or a different shaped wheel lobe to be attached depending on the terrain that the wheel will be traversing, e.g. in snow conditions there could be special "snow shoe" shaped wheel lobes or even wheel lobe attachments to provide traction in powder snow or icy conditions, or different paddle shaped lobes for enhanced propulsion through water. Alternatively, the wheels and wheel assemblies may be used with wheel lobes (which may be detachable) that mimic animals, for example, the wheel lobes could be shaped as paws or feet of wild animals, such as claws, duck feet or chicken feet, or fish or beaver flipper-like wheel lobes.

Although in the above described embodiments the wheel lobes are described to be spaced or positioned around the hub such that their curved surfaces lie substantially on a common ellipsoidal (which includes spherical or hemi-spherical surfaces), it will be appreciated that the curved surface of the wheel lobes could lie on any other common convex surface or common substantially convex curved surface such as a common parabolic, conical, cup-shaped, spoon shaped, or egg-shaped surface, or even a combination of these and other surfaces.

Although in the above described embodiments the wheel lobes all lie on a common ellipsoidal (or spherical surface), it will be appreciated that each individual wheel lobe may comprise a curved surface that lies substantially on a convex surface such as an ellipsoidal, spherical, parabolic, conical, cup-shaped, spoon shaped, or an egg-shaped surface, or a combination of these and other curved surfaces. Individually shaping the wheel lobes provides the advantage of enhancing the structural strength of the wheel and thus the robustness of the wheel and/or wheel assemblies.

It will be appreciated that the individual wheel lobes can be spaced or positioned around the hub of the wheel such that at least a portion of their surfaces lie on a common convex surface such as a common ellipsoidal, spherical, parabolic, conical, cup-shaped, spoon-shaped, or egg-shaped surface or a combination of these and other curved surfaces.

In any event, the curved surfaces of the wheel lobes provide increased structural strength by being able to spread the forces provided by the weight of the vehicle with the terrain (or ground) around the curved surface of the wheel lobes. This is similar to the egg-shell principle in which the forces pressing down on an egg from its "top tip" spread around the egg-shell to its "bottom tip" preventing it from easily breaking.

In the above embodiments, examples, and/or modifications of the invention, it will be appreciated that the wheel, wheel assemblies, and/or wheel lobes can be, depending on the application (e.g. for robots or small vehicles), manufactured from various materials or combinations thereof, such as plastics materials, composite materials, resilient-type materials, metals such as aluminium or titanium or other light-weight metal-alloy, resins, or light-weight materials. It will also be appreciated that the wheel, wheel assemblies, and/or wheel lobes, can be manufactured at low cost by injection moulding in plastics, composites or in metal.

In the above embodiments, examples, and/or modifications of the invention, it will be appreciated that the wheel and/or wheel lobes can have a partially solid form or a solid form providing added strength and robustness to wear and tear over smooth or rough terrain. Alternatively, the wheel and/or wheel lobes can have a form of a relatively thin surface providing resilient, shock absorbing, or springy properties useful for absorbing, to some degree, mechanical shocks transmitted from the terrain into the mobile platform or vehicle.

It will be appreciated that depending on the application, the structural strength of the wheel, wheel assemblies and/or wheel lobes could be further increased by adhering or fixing additional materials to the outer or inner surfaces of the wheel, wheel assemblies and/or wheel lobes. Such strengthening materials may be, but are not limited to, plastics, resins, foam-resin composites, composites, and/or metal alloys, and/or a strong light weight material. It will be appreciated that manufacturing the wheel, wheel assemblies, and/or wheel lobes from light weight materials, some of which are mentioned above, provide the advantage of improving fuel efficiency and operational endurance for mobile platforms such as semi-autonomous or autonomous mobile platforms.

Although individual embodiments, examples, and/or modifications of the invention are discussed, it is to be understood that combinations of the above-mentioned features, examples, modifications, and/or individual embodiments also fall within the scope of the invention as claimed and described.

The invention claimed is:

1. A wheel assembly for a mobile platform, the wheel assembly comprising:
    a first wheel and a second wheel, each wheel comprising a hub having a central axis of rotation, and at least two wheel lobes coupled to the hub, the wheel lobes extending radially from the hub and spaced around the central axis of the hub,
    wherein the first wheel is rotatably mounted to the second wheel at the same end of an axle, and the central axes of rotation of the first and second wheels are coaxial and so define a common axis;
    a control mechanism for adapting the wheel assembly by rotating the first wheel with respect to the second wheel around the common axis.

2. The wheel assembly of claim 1, wherein the wheel lobes each have a curved edge around a region of the lobe edge furthest away from the hub.

3. The wheel assembly of claim 1, wherein the wheel lobes each define a convex curved surface at one side of the wheel assembly.

4. The wheel assembly of claim 3, wherein the convex surfaces of the wheel lobes of the first wheel lie substantially on a first common ellipsoidal surface, and the convex surfaces of the wheel lobes of the second wheel lie substantially on a second common ellipsoidal surface.

5. The wheel assembly of claim 3, wherein the convex curved surfaces of the first wheel substantially faces the direction of the corresponding convex curved surfaces of the second wheel.

6. The wheel assembly of claim 3, wherein the convex curved surface of the first wheel faces the convex curved surface of the second wheel.

7. The wheel assembly of claim 1 further comprising a stem member mounted to each wheel lobe, wherein the stem member couples the wheel lobe to the hub.

8. The wheel assembly of claim 7, wherein the stem member is rotatably mounted to the hub, and is rotatable about an axis of rotation that is non-parallel to the common axis.

9. The wheel assembly of claim 7, wherein each stem member is narrower than the corresponding wheel lobe, when projected parallel to the common axis.

10. The wheel assembly of claim 7, wherein each stem member comprises a resilient material.

11. The wheel assembly of claim 1, wherein each of the wheel lobes comprises a movable extension lobe such that the extension lobe is movable radially from the hub.

12. The wheel assembly according to claim 1, further comprising a revolute mechanism that is coaxially coupled to the hub, the revolute mechanism comprising an annular housing, one or more annular sections within the annular housing, and for each annular section a compliance member movably located therein, wherein the annular section and corresponding compliance member include a biasing mechanism that biases the compliance member away from end faces of the annular section.

13. A mobile platform including the wheel assembly according to claim 1.

14. A wheel for a mobile platform, the wheel comprising a hub having a central axis of rotation, and at least two wheel lobes coupled to the hub, the wheel lobes extending radially from the hub and spaced around the central axis of the hub, wherein the wheel lobes each have a curved edge around a region of the wheel lobe edge furthest away from the hub, further comprising a revolute mechanism that is coaxially coupled to the hub;
   further comprising a stem member mounted to each wheel lobe, wherein the stem member couples the wheel lobe to the hub;
   wherein the stem member is rotatably mounted to the hub, and is rotatable about an axis of rotation that is non-parallel to a common axis.

15. A wheel for a mobile platform, the wheel comprising a hub having a central axis of rotation, and at least two wheel lobes coupled to the hub, the wheel lobes extending radially from the hub and spaced around the central axis of the hub, wherein the wheel lobes each have a curved edge around a region of the wheel lobe edge furthest away from the hub, further comprising a revolute mechanism that is coaxially coupled to the hub;
   further comprising a stem member mounted to each wheel lobe, wherein the stem member couples the wheel lobe to the hub;
   wherein each stem member is narrower than the corresponding wheel lobe, when projected parallel to a common axis.

16. A wheel for a mobile platform, the wheel comprising a hub having a central axis of rotation and at least two wheel lobes coupled to the hub, the wheel lobes extending radially from the hub and spaced around the central axis of the hub, wherein the wheel lobes each have a curved edge around a region of the wheel lobe edge furthest away from the hub, further comprising a revolute mechanism that is coaxially coupled to the hub;
   wherein the revolute mechanism comprising an annular housing, one or more annular sections within the annular housing, and for each annular section a compliance member movably located therein, wherein the annular section and corresponding compliance member include a biasing mechanism that biases the compliance member away from end faces of the annular section.

\* \* \* \* \*